(12) United States Patent
Martin et al.

(10) Patent No.: US 9,946,518 B2
(45) Date of Patent: **\*Apr. 17, 2018**

(54) SYSTEM AND METHOD FOR EXTENDING A VISUALIZATION PLATFORM

(71) Applicant: iRise, El Segundo, CA (US)

(72) Inventors: Maurice Martin, Marina Del Ray, CA (US); Steven Yamanaka, Torrance, CA (US); Daniel Akiva, Laguna Niguel, CA (US); Norman Basham, Santa Monica, CA (US); Bryan Lipson, Redondo Beach, CA (US)

(73) Assignee: iRise, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,878

(22) Filed: Oct. 6, 2016

(65) Prior Publication Data

US 2017/0235551 A1  Aug. 17, 2017

Related U.S. Application Data

(63) Continuation of application No. 14/591,870, filed on Jan. 7, 2015, now Pat. No. 9,465,527, which is a
(Continued)

(51) Int. Cl.
G06F 3/048  (2013.01)
G06F 9/44  (2006.01)
G06F 3/0484  (2013.01)

(52) U.S. Cl.
CPC ............. G06F 8/38 (2013.01); G06F 9/4443 (2013.01); *G06F 3/04847* (2013.01)

(58) Field of Classification Search
CPC ............. G06F 3/0484; G06F 8/38; G06F 9/44
See application file for complete search history.

(56) References Cited

U.S. PATENT DOCUMENTS 4,347,565 A   8/1982 Kaneda et al.
4,730,258 A   3/1988 Takeda et al.
(Continued)

FOREIGN PATENT DOCUMENTS

EP   0 476 533 A2   3/1992
EP   0622729 A2   11/1994
(Continued)

OTHER PUBLICATIONS

Product Datasheet authored by www.justinmind.com and downloaded from www.justinmind.com website (accessed via archive.org's wayback machine Sep. 2010).
(Continued)

*Primary Examiner* — Scott Baderman
*Assistant Examiner* — Mario M Velez-Lopez
(74) *Attorney, Agent, or Firm* — Knobbe, Martens, Olson & Bear LLP

(57) ABSTRACT

Systems and methods for extending a visualization platform are disclosed. A user may create a visualization project created. One or more properties for a non-native widget established by a developer of the non-native widget may be received from the project. Such properties may designate a name or a type of data that the non-native widget is capable of processing. Responsive to an instruction received from the user of the visualization authoring environment, a source of data to be processed by the non-native widget or a destination of data produced by the non-native widget to be processed by other widgets may be established. The appearance or behavior of the non-native widget may be rendered based at least in part on a value available from the source of the data or the appearance or behavior of one or more other widgets may be rendered based at least in part on data produced by the non-native widget.

22 Claims, 30 Drawing Sheets

Related U.S. Application Data continuation of application No. 13/267,650, filed on Oct. 6, 2011, now Pat. No. 8,954,870.

(60) Provisional application No. 61/391,300, filed on Oct. 8, 2010.

(56) References Cited

U.S. PATENT DOCUMENTS

| | | | |
|---|---|---|---|
| 5,008,853 A | 4/1991 | Bly et al. | |
| 5,019,961 A | 5/1991 | Addesso et al. | |
| 5,041,992 A | 8/1991 | Cunningham et al. | |
| 5,187,788 A | 2/1993 | Marmelstein | |
| 5,247,650 A | 9/1993 | Judd et al. | |
| 5,247,651 A | 9/1993 | Clarisse | |
| 5,255,360 A | 10/1993 | Peaslee et al. | |
| 5,261,100 A | 11/1993 | Fujinami | |
| 5,265,254 A | 11/1993 | Blasciak et al. | |
| 5,269,014 A | 12/1993 | Ogino | |
| 5,297,238 A | 3/1994 | Wang et al. | |
| 5,301,301 A | 4/1994 | Kodosky et al. | |
| 5,313,575 A | 5/1994 | Beethe | |
| 5,323,452 A | 6/1994 | Dickman et al. | |
| 5,325,534 A | 6/1994 | Galy et al. | |
| 5,416,900 A | 5/1995 | Blanchard et al. | |
| 5,420,978 A | 5/1995 | Tozawa et al. | |
| 5,428,729 A | 6/1995 | Chang et al. | |
| 5,446,842 A | 8/1995 | Schaeffer et al. | |
| 5,560,014 A | 9/1996 | Imamura | |
| 5,564,048 A | 10/1996 | Eick et al. | |
| 5,566,291 A | 10/1996 | Boulton et al. | |
| 5,572,430 A | 11/1996 | Akasaka et al. | |
| 5,581,677 A | 12/1996 | Myers et al. | |
| 5,589,856 A | 12/1996 | Stein et al. | |
| 5,598,359 A | 1/1997 | Montag et al. | |
| 5,610,828 A | 3/1997 | Kodosky et al. | |
| 5,630,081 A | 5/1997 | Rybicki | |
| 5,675,753 A | 10/1997 | Hansen et al. | |
| 5,689,286 A | 11/1997 | Wugofski | |
| 5,715,432 A | 2/1998 | Xu et al. | |
| 5,734,915 A | 3/1998 | Roewer | |
| 5,745,712 A | 4/1998 | Turpin et al. | |
| 5,745,738 A | 4/1998 | Ricard | |
| 5,748,188 A | 5/1998 | Hu et al. | |
| 5,754,738 A | 5/1998 | Saucedo | |
| 5,764,992 A | 6/1998 | Kullick et al. | |
| 5,771,370 A | 6/1998 | Klein | |
| 5,793,368 A | 11/1998 | Beer | |
| 5,838,948 A | 11/1998 | Bunza | |
| 5,860,004 A | 1/1999 | Fowlow et al. | |
| 5,911,059 A | 6/1999 | Profit, Jr. | |
| 5,917,730 A | 6/1999 | Rittie et al. | |
| 5,926,176 A | 7/1999 | McMillan et al. | |
| 5,949,999 A | 9/1999 | Song et al. | |
| 5,960,182 A | 9/1999 | Matsuoka et al. | |
| 5,960,411 A | 9/1999 | Hartman et al. | |
| 5,978,811 A | 11/1999 | Smiley | |
| 5,986,654 A | 11/1999 | Alexander et al. | |
| 5,991,533 A | 11/1999 | Sano et al. | |
| 5,991,535 A | 11/1999 | Fowlow et al. | |
| 6,034,681 A | 3/2000 | Miller et al. | |
| 6,038,567 A | 3/2000 | Young | |
| 6,046,740 A | 4/2000 | LaRoche et al. | |
| 6,047,314 A | 4/2000 | Pommier et al. | |
| 6,063,128 A | 5/2000 | Bentley et al. | |
| 6,071,316 A | 6/2000 | Goossen et al. | |
| 6,167,395 A | 12/2000 | Beck et al. | |
| 6,167,564 A | 12/2000 | Fontana et al. | |
| 6,177,942 B1 | 1/2001 | Keong et al. | |
| 6,182,116 B1 | 1/2001 | Namma et al. | |
| 6,188,400 B1 | 2/2001 | House et al. | |
| 6,189,142 B1 | 2/2001 | Johnston et al. | |
| 6,199,193 B1 | 3/2001 | Oyagi et al. | |
| 6,205,412 B1 | 3/2001 | Barskiy et al. | |
| 6,212,672 B1 | 4/2001 | Keller et al. | |
| 6,215,502 B1 | 4/2001 | Ferguson | |
| 6,219,065 B1 | 4/2001 | Mashita et al. | |
| 6,225,998 B1 | 5/2001 | Okita et al. | |
| 6,237,004 B1 | 5/2001 | Dodson et al. | |
| 6,243,092 B1 | 6/2001 | Okita et al. | |
| 6,247,032 B1 | 6/2001 | Bernardo et al. | |
| 6,259,445 B1 | 7/2001 | Hennum et al. | |
| 6,275,223 B1 | 8/2001 | Hughes | |
| 6,289,502 B1 | 9/2001 | Garland et al. | |
| 6,292,187 B1 | 9/2001 | Gibbs et al. | |
| 6,330,007 B1 * | 12/2001 | Isreal | G06F 3/0481 715/207 |
| 6,385,765 B1 | 5/2002 | Cleaveland | |
| 6,397,117 B1 | 5/2002 | Burrows et al. | |
| 6,405,364 B1 | 6/2002 | Bowman-Amuah | |
| 6,408,263 B1 | 6/2002 | Summers | |
| 6,434,607 B1 | 8/2002 | Haverstock et al. | |
| 6,463,460 B1 | 10/2002 | Simonoff | |
| 6,502,233 B1 | 12/2002 | Vaidyanathan et al. | |
| 6,507,848 B1 | 1/2003 | Crosby et al. | |
| 6,518,979 B1 | 2/2003 | Spertus et al. | |
| 6,564,368 B1 | 5/2003 | Beckett et al. | |
| 6,591,271 B1 | 7/2003 | Ceri et al. | |
| 6,604,068 B1 | 8/2003 | Bukowski et al. | |
| 6,634,008 B1 | 10/2003 | Dole | |
| 6,668,369 B1 | 12/2003 | Krebs et al. | |
| 6,681,383 B1 | 1/2004 | Pastor et al. | |
| 6,715,130 B1 | 3/2004 | Eiche et al. | |
| 6,725,399 B1 | 4/2004 | Bowman | |
| 6,741,265 B2 | 5/2004 | Ghosh et al. | |
| 6,762,777 B2 | 7/2004 | Carroll | |
| 6,792,608 B1 | 9/2004 | Theeten | |
| 6,802,055 B2 | 10/2004 | Jade et al. | |
| 6,816,914 B1 | 11/2004 | Heinzman et al. | |
| 6,832,270 B2 | 12/2004 | Das Sharma et al. | |
| 6,859,451 B1 | 2/2005 | Pasternack et al. | |
| 6,868,370 B1 | 3/2005 | Burbridge et al. | |
| 6,880,126 B1 | 4/2005 | Bahrs et al. | |
| 6,907,546 B1 | 6/2005 | Haswell et al. | |
| 6,944,584 B1 | 9/2005 | Tenney et al. | |
| 6,945,780 B2 | 9/2005 | Perry | |
| 6,959,268 B1 | 10/2005 | Myers, Jr. et al. | |
| 6,965,800 B2 | 11/2005 | Schmit et al. | |
| 6,966,049 B2 | 11/2005 | Lepejian et al. | |
| 6,968,539 B1 | 11/2005 | Huang et al. | |
| 6,970,813 B1 | 11/2005 | Houlding et al. | |
| 6,971,065 B2 | 11/2005 | Austin | |
| 6,975,976 B1 | 12/2005 | Casavant et al. | |
| 6,983,227 B1 | 1/2006 | Thalhammer-Reyero | |
| 7,000,220 B1 | 2/2006 | Booth | |
| 7,139,686 B1 | 11/2006 | Critz et al. | |
| 7,146,615 B1 | 12/2006 | Hervet et al. | |
| 7,174,286 B2 | 2/2007 | Martin et al. | |
| 7,194,489 B2 | 3/2007 | Bentley et al. | |
| 7,194,679 B1 | 3/2007 | Green | |
| 7,349,837 B2 | 3/2008 | Martin et al. | |
| 7,451,403 B1 | 11/2008 | Srinivasan et al. | |
| 7,546,543 B2 | 6/2009 | Louch et al. | |
| 7,577,907 B2 | 8/2009 | Vishnia-Shabtai et al. | |
| 7,594,181 B2 * | 9/2009 | Rothwein | G06F 8/38 715/747 |
| 7,694,271 B2 | 4/2010 | Becker et al. | |
| 7,757,207 B2 | 7/2010 | Van | |
| 7,788,647 B2 | 8/2010 | Martin et al. | |
| 7,861,158 B2 | 12/2010 | Martin et al. | |
| 7,873,591 B2 * | 1/2011 | Mital | G06F 8/34 706/52 |
| 8,209,378 B2 * | 6/2012 | Allen | H04L 67/1095 709/201 |
| 8,352,966 B2 | 1/2013 | Clayton et al. | |
| 8,418,070 B2 * | 4/2013 | Mayer-Ullmann | G06F 8/38 715/235 |
| 2001/0002834 A1 | 6/2001 | Mashita et al. | |
| 2001/0024211 A1 | 9/2001 | Kudukoli et al. | |
| 2001/0027456 A1 | 10/2001 | Lancaster et al. | |
| 2001/0035879 A1 * | 11/2001 | Washington | G06F 8/34 715/763 |
| 2002/0010739 A1 | 1/2002 | Ferris et al. | |
| 2002/0032699 A1 | 3/2002 | Edwards et al. | |
| 2002/0032900 A1 | 3/2002 | Charisius et al. | |

(56) References Cited

U.S. PATENT DOCUMENTS

| | | | |
|---|---|---|---|
| 2002/0049787 A1 | 4/2002 | Keely et al. | |
| 2002/0054051 A1 | 5/2002 | Ladd | |
| 2002/0059054 A1 | 5/2002 | Bade et al. | |
| 2002/0060566 A1 | 5/2002 | Debbins et al. | |
| 2002/0065645 A1 | 5/2002 | Wall et al. | |
| 2002/0066073 A1 | 5/2002 | Lienhard et al. | |
| 2002/0083413 A1 | 6/2002 | Kodosky et al. | |
| 2002/0085020 A1 | 7/2002 | Carroll | |
| 2002/0108101 A1 | 8/2002 | Charisius et al. | |
| 2002/0109717 A1 | 8/2002 | Li et al. | |
| 2002/0112225 A1 | 8/2002 | Charisius et al. | |
| 2002/0120921 A1 | 8/2002 | Coburn et al. | |
| 2002/0130834 A1 | 9/2002 | Madarasz et al. | |
| 2002/0145627 A1* | 10/2002 | Whitmarsh | G06F 8/38 715/745 |
| 2002/0149629 A1 | 10/2002 | Craycroft et al. | |
| 2002/0163535 A1 | 11/2002 | Mitchell et al. | |
| 2002/0180783 A1 | 12/2002 | Broussard | |
| 2002/0180784 A1 | 12/2002 | Broussard | |
| 2002/0191027 A1 | 12/2002 | Morrow et al. | |
| 2002/0196282 A1 | 12/2002 | Washington et al. | |
| 2002/0196283 A1* | 12/2002 | Petruk | G06F 8/34 715/763 |
| 2003/0023527 A1 | 1/2003 | Wilce et al. | |
| 2003/0035005 A1* | 2/2003 | Kodosky | G05B 19/0426 715/763 |
| 2003/0035009 A1 | 2/2003 | Kodosky et al. | |
| 2003/0038842 A1* | 2/2003 | Peck | G06F 11/263 715/763 |
| 2003/0184585 A1* | 10/2003 | Lin | G06F 8/38 715/763 |
| 2004/0015849 A1* | 1/2004 | Sanchez, II | G06F 9/443 717/116 |
| 2004/0021679 A1 | 2/2004 | Chapman et al. | |
| 2004/0030516 A1 | 2/2004 | Dunhill et al. | |
| 2004/0117759 A1 | 6/2004 | Rippert et al. | |
| 2004/0123272 A1 | 6/2004 | Bailey et al. | |
| 2004/0133596 A1 | 7/2004 | Fujita et al. | |
| 2004/0221238 A1* | 11/2004 | Cifra | G05B 19/0426 715/762 |
| 2005/0004789 A1 | 1/2005 | Summers | |
| 2005/0075966 A1* | 4/2005 | Duka | G06Q 40/00 705/37 |
| 2005/0102632 A1* | 5/2005 | Klinger | G06F 8/38 715/789 |
| 2007/0038934 A1 | 2/2007 | Fellman | |
| 2007/0168931 A1 | 7/2007 | Martin et al. | |
| 2007/0283243 A1 | 12/2007 | Beiser et al. | |
| 2008/0082627 A1* | 4/2008 | Allen | G06Q 10/10 709/217 |
| 2008/0235602 A1 | 9/2008 | Strauss et al. | |
| 2009/0217160 A1 | 8/2009 | Drukman et al. | |
| 2010/0257196 A1* | 10/2010 | Waters | G06F 3/0481 707/769 |
| 2011/0214078 A1* | 9/2011 | Klask | G06F 8/38 715/763 |

FOREIGN PATENT DOCUMENTS

| | | |
|---|---|---|
| EP | 0 909 070 A2 | 4/1999 |
| JP | 06-083936 | 3/1994 |
| JP | 08-171484 | 7/1996 |
| JP | 10-260961 | 9/1998 |
| WO | WO 85/05204 | 11/1985 |
| WO | WO 92/11724 | 7/1992 |
| WO | WO 96/16379 | 5/1996 |
| WO | WO 99/08182 | 2/1999 |
| WO | WO 99/27443 | 6/1999 |
| WO | WO 00/28397 | 5/2000 |
| WO | WO 2001/033344 | 5/2001 |
| WO | WO 2001/044932 | 6/2001 |

OTHER PUBLICATIONS

Kirmani, Product Review: Justinmind Prototyper, Jan. 4, 2010.
"iRise Build the Right Software," 2005 in 3 pages.
"Microsoft Computer Dictionary" 4$^{th}$ Edition; Microsoft Press, Redmond, WA; 1999; 4 pages.
ACM Digital Library; information regarding Robbins, Jason Elliot; http://dl.acm.org/citation.cfm?id=929838&preflayout=flat; 1999; 3 pages.
Alison Balter; *Mastering Microsoft Access 2000 Development* (Sams Publishing, 1999), pp. 21-29, 118-169, 275-281, 430-496, 592, and 1100-1106.
Axure Software Solutions, Inc., Defendant Axure Software's Preliminary Invalidity Contentions for U.S. Pat. No. 7,349,837, Feb. 24, 2009, Case No. 2:08-cv-03601 SJO (JWJx), United State District Court, Central District of California, Western Division, Hon. S. James Otero; pp. 1-9.
Axure Software Solutions, Inc., Preliminary Invalidity Contentions Exhibit A; pp. 1-54.
Axure Software Solutions, Inc., Preliminary Invalidity Contentions Exhibit B; pp. 1-58.
Axure Software Solutions, Inc., Preliminary Invalidity Contentions Exhibit C; pp. 1-59.
Axure Software Solutions, Inc., Preliminary Invalidity Contentions Exhibit D; pp. 1-20.
Boy, G., "Active design documents," *Proceedings of the Conference on Designing Interactive Systems Processes, Practices, Methods, and Techniques*, DIS '97, Jan. 1997, pp. 31-36.
Canadian Intellectual Property Office; Office Action dated Aug. 3, 2010, from related Canadian application No. 2,704,080.
Canadian Intellectual Property Office; Office Action dated Dec. 6, 2011 from related Canadian application No. 2,704,294.
Canadian Intellectual Property Office; Office Action dated Jul. 30, 2010, from related Canadian application No. 2,704,252.
Canadian Intellectual Property Office; Office Action dated Nov. 22, 2010 from related Canadian application No. 2,704,294.
Danny Goodman, Dynamic HTML: The Definitive Reference, Jul. 1998, O'Reilly, Chapter 8.
David A. Edson, Visio 2000 Technical Articles: Using Visio as a Forms Tool: Checkbook Example [online], Dec. 1999 [retrieved on Feb. 24, 2009], Microsoft Corporation, Retrieved from the Internet: <http://msdn.microsoft.com/en-us/library/aa140249(office.10,printer).aspx>, pp. 1-6.
Decision on Appeal; U.S. Appl. No. 10/484541; Appeal 2009-013355; Decided Apr. 21, 2010; 11 pages.
Declaration of Nenad Medvidovic Under 37 C.F.R. §1.68; Axure Software Solutions, Inc.; U.S. Pat. No. 7,862,158; Feb. 18, 2015; 136 pages.
Declaration of Nenad Medvidovic Under 37 C.F.R. §1.68; Axure Software Solutions, Inc.; Feb. 18, 2015; U.S. Pat. No. 7,861,158; 120 pages.
Declaration of Nenad Medvidovic Under 37 C.F.R. §1.68; Axure Software Solutions, Inc.; Petition for Covered Business Method Review; U.S. Pat. No. 7,349,837; Feb. 18, 2015; 124 pages.
Declaration of Nenad Medvidovic Under 37 C.F.R. §1.68; Axure Software Solutions, Inc.; Petition for Covered Business Method Review; U.S. Pat. No. 7,349,837; Feb. 18, 2015; 114 pages.
Ed Bott and Ron Person, Special Edition Using Windows 95 with Internet Explorer 4.0, Feb. 17, 1998, Que, Chapter 22.
Elderbrock, David et al.; Microsoft Front Page 2000 Bible; IDG Books Worldwide; 3313-4; 1999; 852 pages.
European Office Action dated Apr. 2, 2015 regarding Application No. 10010666.5.
European Office Action for Application No. 10 010 665.7, dated Apr. 8, 2015.
Extended European Search Report dated Oct. 27, 2014 for European Patent Application No. 11831638.9.
File History of U.S. Appl. No. 10/484541; "System and Process for Gathering, Recording and Validating Requirements for Computer Applications"; filed Jan. 22, 2004 1,071 pages.
File History of U.S. Appl. No. 10/762428; "Systems and Methods for a Programming Environment for a Simulation of a Computer Application"; filed Jan. 22, 2004; 587 pages.

(56) References Cited

OTHER PUBLICATIONS

Gregg Keizer; *Demo It Without Being There*; PC Magazine; vol. 14, No. 7 (Apr. 11, 1995), pp. 46.
Grundy, J., Engineering Component-Based, User-Configurable Collaborative Editing Systems; *Proceedings of the IFIP TC2/TC13 WG2.7/WG13.4 Seventh Working Conference on Engineering for Human-Computer Interaction*; 1999; pp. 111-128.
Grundy, J., Human Interaction Issues for User-Configurable Collaborative Editing Components; *Computer Human Interaction*, 1998. Proceedings. 3rd Asia Pacific Shonan Village Center, Japan Jul. 15-17, 1998.
HTML 4.01 Specification—Forms in HTML Documents, World Wide Web Consortium, available at http://web.archive.org/web/20000816154958/http://www.w3.org/TR/html4/interactlforms.html (archived Aug. 16, 2000).
HTML 4.01 Specification—Forms in HTML Documents, World Wide Web Consortium, available at http://web.archive.org/web/20000816154958/http://www.w3.org/TR/html4/interactlforms.html (archived Aug. 16, 2000).
International Search Report and Written Opinion in PCT Application No. PCT/US2011/055170 dated May 4, 2012.
iRise v. Axure; Redacted Memorandum of Points and Authorities in Support of Motion of Plaintiff iRise for Partial Summary Judgment of Infringement of U.S. Pat. No. 7,349,837; Jun. 15, 2009; 31 pages.
John Hedtke and Elisabeth Knottingham; *Visio 2000: The Official Guide* (California, McGraw-Hill, 2000), pp. vi-xii, 293-296, 326-331, 354-356, and 358-359.
John L. Viescas; *Running Microsoft Access 2000* (Washington, Microsoft Press, 1999), pp. 81-82.
Johnson, Jeff; "Selectors: going beyond user-interface widgets"; 1992; CHI '92 Proceedings of the SIGCHI Conference on Human Factors in Computing Systems; pp. 273-279 (abstract only).
Koshizuka, et al.; "Windows Real-Objects: A Distributed Shared Memory for Distributed Implementations of GUI Applications"; ACM; 1993.
Leu, et al; X Window Based Group Collaborative Editing System; Information and Software Technology, Elsevier, Amsterdam; vol. 35, No. 11-12, pp. 639-646; Nov. 1, 1993.
Microsoft Corporation, Visio 2000 in Large Organization [online], Apr. 1, 2000 [retrieved on Feb. 24, 2009], Microsoft Corporation, Retrieved from the Internet<http://technet.microsoft.com/en-US/library/cc751331(printer).aspx>, pp. 1-9.
Microsoft Corporation, Visio 2000 Technical Articles: Basic Shapes Development [online], Oct. 2000 [retrieved on Feb. 24, 2009], Microsoft Corporation, Retrieved from the Internet: <http://msdn.microsoft.com/en-us/library/aa140248(office.10,printer).aspx>, pp. 1-13.
Microsoft Corporation; *Building Applications for Microsoft Access* (Washington, Microsoft Corporation, 1994), pp. 58.
Microsoft Corporation; *Microsoft Access User's Guide* (Washington, Microsoft Corporation, 1994), pp. iii-x, 325-327, 342, 353-361, 369-370, 372, 390-391, 404-405, 792-793, 802, and 807.
Microsoft Corporation; *Step by Step Microsoft Access 2000* (Washington, Microsoft Press, 1999) pp. iii-x, 81-86, and 291-292.
Microsoft® Word 2010 Bible, John Wiley & Sons, Jun. 21, 2010, pp. 1-5.
Minor, S., et al.; A Model for Semi-(a)Synchronous Collaborative Editing; Proceedings of the Third European Conference on Computer-Supported Cooperative Work Sep. 13-17, 1993; vol. 14, pp. 219-231.
Miyashita, Ken et al.: "Interactive Generation of Graphical User Interfaces by Multiple Visual Examples"; 1994; UIST '94 Proceedings of the 7th annual ACM symposium on User interface software and technology, pp. 85-94 (abstract only).
Myers, Brad A. et al.; "Garnet, Comprehensive Support for Graphical, Highly Interactive User Interfaces"; Carnegie Mellon University; Nov. 1990; 15 pages.
Nabavi, R.; "APL Windowing Systems—Where Next?"; ACM; 1989.
Nystrom M. et al., "A method for specification of graphical user interfaces by prototyping (Master Thesis, Lu Iea University of Technology)", Examensarbete, Nov. 1995 (Nov. 1995 ), pp, 1-42.
Nystrom M. et al., "A method for specification of graphical user interfaces by prototyping (Master Thesis, Lulea University of Technology)", Examensarbete, Nov. 1995 (Nov. 1995), 42 pages.
Order Granting in Part, Denying in Part Motion of Plaintiff iRise for Partial Summary Judgment of Infringement of U.S. Pat. No. 7,349,837; Irise v. Axure Software Solutions, Inc., No. CV 08-03601; Denying Axure's Motion for Summary Judgment of Non-Infringement and Invalidity; Sep. 11, 2009; F.Supp.2d(2009); pp. 1-38.
PCT International Search Report dated Nov. 29, 2002 in Application No. PCT/US2002/023816.
Petition for Covered Business Methods Review of U.S. Pat. No. 7,349,837; Feb. 20, 2015; 83 pages.
Petition for Covered Business Methods Review of U.S. Pat. No. 7,349,837; Feb. 20, 2015; 85 pages.
Petition for Inter Partes Review of U.S. Pat. No. 7,861,158; *Axure Software Solutions, Inc. v. iRise, Inc.*; Feb. 19, 2015; 62 pages.
Petition for Inter Partes Review of U.S. Pat. No. 7,861,158; *Axure Software Solutions, Inc. v. iRise, Inc.*; Feb. 19, 2015; 63 pages.
Plomp, C.J. et al.; "A Generic Widget Vocabulary for the Generation of Graphical and Speech-Driven User Interfaces"; Jan. 1, 2002; International Journal Speech Technology, v. 5, issue 1, pp. 39-47 (abstract only).
Prague, Cary, and Irwin, Michael, Access 2002 Bible, Wiley, pp. i, ii, xvi, xvii, 3-7, 23-25, 42- 48, 55-60, 64, 65, 241, 249-267, 393-421, 429-443, 483, 484, 512, 519-522, 531-533, 696-714, 818, 819, 909-939, 941-947, 970-972, 1024, 1025, 1179-1271 (2001).
U.S. Appl. No. 60/308,052; "An Automated Process for Formally Describing and Validating Requirements of Computer-Based Applications"; filed Jul. 26, 2001; 38 pages.
Robbins, Jason Elliot; "Dissertation re: Cognitive Support Features for Software Development Tools"; 1999; UMI Microform 9942715; 252 pages.
Ron Bel Bruno; *Captivating presentations* (*Lifeboat Publishing's Dan Bricklin's demo-it presentation software*); Windows Magazine; vol. 6, No. 5 (May 1995), pp. 150.
Software Prototyping, Feb. 2010, pp. 1-12, http://en.wikipedia.org/wiki/Software_prototyping.
Sung, et al.; "A Top-Down Approach to Teaching Introductory Computer Graphics"; ACM; 2003.
University of California, Irvine Libraries; information regarding Robbins, Jason Elliot; copyright 2004; http://antpac.lib.uci.edu/search~S7?/.b2699349/.b2699349/1%2C1%2C1%2CB/marc~b2699349; 1 page.
Unknown, Cover Art for Dan Bricklin's demo-it! Version 2.0 software; Lifeboat Publishing; Shrewsbury, New Jersey; date unknown.
USPTO, Advisory Action dated Apr. 21, 2008, from related application U.S. Appl. No. 10/763,012, filed Jan. 22, 2004.
USPTO, Office Action dated Aug. 29, 2006, from related application U.S. Appl. No. 10/763,080, filed Jan. 22, 2004.
USPTO, Office Action dated Jan. 12, 2007, from related application U.S. Appl. No. 10/484,541, filed Jan. 22, 2004.
USPTO, Office Action dated Jun. 28, 2006, from related application U.S. Appl. No. 10/484,541, filed Jan. 22, 2004.
USPTO, Office Action dated May 17, 2007, from related application U.S. Appl. No. 10/763,012, filed Jan. 22, 2004.
USPTO, Office Action dated May 23, 2007, from related application U.S. Appl. No. 10/762,428, filed Jan. 22, 2004.
USPTO, Office Action dated Sep. 29, 2008, from related application U.S. Appl. No. 10/763,012, filed Jan. 22, 2004.
USPTO, Supplemental Notice of Allowability dated Feb. 13, 2008, from related application U.S. Appl. No. 10/762,428, filed Jan. 22, 2004.
USPTO; Examiner's Answer in U.S. Appl. No. 10/484,541, filed Jan. 22, 2004; dated Aug. 10, 2007.
USPTO; Notice of Allowance dated Nov. 13, 2007, from related application U.S. Appl. No. 10/762,428, filed Jan. 22, 2004.
USPTO; Office Action dated Nov. 1, 2007, from related application U.S. Appl. No. 10/763,012, filed Jan. 22, 2004.

(56) References Cited

OTHER PUBLICATIONS

Virginia Andersen; Access 2000: *The Complete Reference* (California, McGraw-Hill, 2000), pp. v-xviii, 370-371, 374-379, 396-402, 464-471, 474-479, 1112, and 1314-1317.

Visio Corporation; *Developing Visio Solutions, Visio 2000* (Washington, Visio Corporation, 1999), pp. iii-xiv, 61-82, 139-144, 270-272, 505-519, and 556-557.

Visio Corporation; *Visio 2000 User Guide* (Washington, Visio Corporation, 1999), pp. iii-x, 1-44, 61-65, 92-101, 104-147, 164-176, 189-202, 258-279, and 302-303.

W3C, Tables, Aug. 25, 2000, W3C, Chapter 11—Section 11: pp. 1-3, http://web.archive.org/web/20000815093932/http://www.w3.org/TR/html4/struc/tables.html.

Wallace Wang; *Visual Basic 6 for Dummies* (California, IDG Books Worldwide, 1998), pp. 9-14, 18-34, 60-125, 140-142, 210-220, 293-296, 404-406, and 417-432.

Webster's Unabridged Dictionary of the English Language; 2001 by Random House, Inc, NY; 3 pages.

White, Michael et al.; "Exemplars: A Practical, Extensible Framework for Dynamic Text Generation"; 1998; pp. 1-10.

White, Michael; "Designing Dynamic Hypertext"; Proceedings of the $2^{nd}$ Workshop on Adaptive Hypertext and Hypermedia, Hypertext'98; Pittsburgh, USA, Jun. 20-24 1998; 3 pages.

Widgetbox.com, "What's a Widget?", Aug. 31, 2010, pp. 1, http://docs.widgetbox.com/using-widgets/about-widgets/whats-a-widget/

\* cited by examiner

FIG. 13A
FIG. 13B iRise
VISUALIZE. INNOVATE. DELIVER.

● Why iRise? | Download Center ◉ News & Events | Blog | Contact Us | Log In

[Search]

Company | Solutions | Products | Services | Customers | Alliances | Support

Share this Page

July 2006
Sun–Mon–Tue–Wed–Thu–Fri–Sat
            1
2  3  4  5  6  7  8
9  10 11 12 13 14 15
16 17 18 19 20 21 22
23 24 25 26 27 28 29
30 31

Download Center  Downloads»
  Software          iBloc Library
  Web Seminars
    iDocs           Featured iBloc
    iBlocs          Desktop Calendar Widget
    Videos
  White Papers      Lorem ipsumdolor sit amet, consectur adipiscing elit. Fusc sed vulpu-
                    tate mauris. Praesent finicidunt tortor quis quam bibendum vel auctor
  Brochure & Data Sheets  purus egestas. Donec consectetur urna vitae augue iaculis eu convallis
                    nulla malesuada. Lorem issum dolor sit amet, consectetur adipiscing
                    elit. Fusce sed vulputate mauris. more about this iBlock

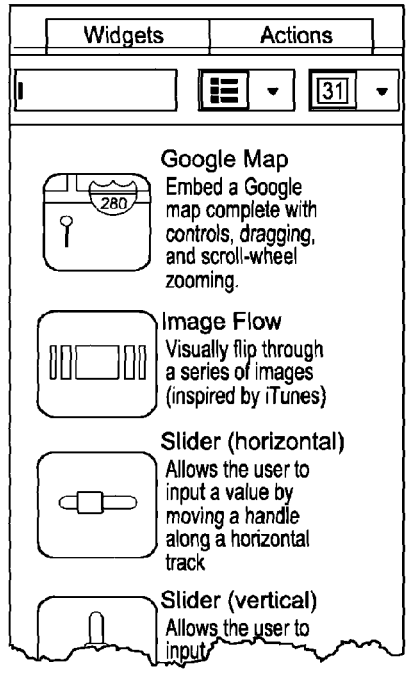

FIG. 14

| Use the Widgets/Actions toggle | Custom widgets and actions are grouped together in the Widget Panel. You can toggle between these two groupings by clicking the two buttons across the top of the Widget Panel. |
|---|---|
| Use the Search feature | In the search field in the upper left corner of the Widget Panel, type the first letters of the name of the widget or action. With each new letter you type, the list of widgets/actions displayed in the panel will shrink. |
| Adjust the list format | Three formats are available for the widgets/actions displayed in the Widget Panel: Details, List or Thumbnails. Choosing List or Thumbnails will increase the number of widgets/actions that are visible in the panel. |
| Sort by ... | You can sort the widgets/actions that are currently displayed in the panel by any of three categories: Frequently used, Recently used, or Name. |

| FIG. 15A |
|----------|
| FIG. 15B |

| FIG. 16A |
| FIG. 16B |

FIG. 18

SYSTEM AND METHOD FOR EXTENDING A VISUALIZATION PLATFORM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND OF THE INVENTION

Field of the Invention

The present invention relates to software visualization systems, and in particular, to methods and systems for visualizing software applications and the like.

Description of the Related Art

With the increasing complexity involved in the development of computer programs, it has become increasingly expensive, time consuming, and risky to develop software applications. Often, after a given software application has been coded and deployed, actual use by the intended users reveals many defects in the application. Correction of such defects after the application is deployed results in customer dissatisfaction and further significant costs.

While software tools have been developed to simulate software applications, such tools tend to have limited extensibility. For example, it may not be possible to utilize widgets that are not included in the tools to develop visualizations of a proposed software application using conventional methods.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Described herein are methods and systems for visualizing software applications and the like, and for extending environments for creating and rendering such visualizations. For example, certain embodiments enable a user to define a visualization for a prospective software application to be simulated using non-native and/or native widgets.

Further disclosed herein is an example method for extending a visualization platform, the method comprising: providing a visualization authoring environment configured to enable a developer to define a user interface appearance and behavior of a prospective software application or a prospective modification to an existing software application at least in part by incorporating native widgets; storing such definitions on computer readable media in a format that can be utilized by one or more other instances of the visualization authoring environment and/or one or more instances of a visualization rendering environment; providing in the visualization authoring environment a facility to enable a user to incorporate one or more non-native widgets into the visualization authoring environment without requiring acquisition or installation of a new version of the visualization authoring environment; providing in the visualization authoring environment a facility to enable the user to incorporate non-native widgets into a visualization project; encapsulating computer readable instructions for an appearance and/or behavior of one or more non-native widgets into the visualization project at least partly in response to a user action; providing in the visualization authoring environment a facility to enable the user to modify one or more of the following attributes of an instance of a non-native widget: size, position, connections between the non-native widget and other widgets; and providing in a visualization rendering environment a facility to exhibit the desired visual rendering and/or interactive behavior during rendering of the visualization project to thereby simulate the proposed software application.

Disclosed herein is an example method for extending a visualization platform, the method comprising: receiving from a visualization project created by a user one or more properties for a non-native widget established by a developer of the non-native widget, such properties designating one or more of a name and/or a type of data that the non-native widget is capable of processing; at least partly in response to an instruction received from the user of the visualization authoring environment, establishing a source of data to be processed by the non-native widget and/or a destination of data produced by the non-native widget to be processed by other one or more other widgets; and rendering the appearance and/or behavior of the non-native widget based at least in part on a value available from the source of the data and/or rendering the appearance and/or behavior of one or more other widgets based at least in part on data produced by the non-native widget.

Disclosed herein is an example method for extending a visualization platform, the method comprising: receiving from a visualization project created by a user one or more event definitions for a non-native widget established by a developer of the non-native widget, such event definitions designating one or more of the name and/or type of event that the non-native widget is capable of processing or producing; at least partly in response to an instruction received from the user of the visualization authoring environment, establishing a source of the event to be processed by the non-native widget and/or the destination of events produced by the non-native widget to be processed by other one or more other widgets; and rendering the appearance and/or behavior of the non-native widget based at least in part on an event received from the source of the event and/or rendering the appearance and/or behavior of one or more other widgets based at least in part on the event produced by the non-native widget.

Disclosed herein is an example system comprising: a computing system, including one or more processing devices; one or more modules stored in non-transitory memory configured to cause the computing system to perform operations comprising: providing a visualization authoring environment configured to enable a coder to define a user interface appearance and behavior of a prospective software application or a prospective modification to an existing software application at least in part by incorporating native widgets; storing such definitions on computer readable media in a format that can be utilized by one or more other instances of the visualization authoring environment and/or one or more instances of a visualization rendering environment; providing in the visualization authoring environment a facility to enable a user to incorporate one or more non-native widgets into the visualization authoring environment without requiring acquisition or installation of a new version of the visualization authoring environment;

providing in the visualization authoring environment a facility to enable the user to incorporate non-native widgets into a visualization project; encapsulating computer readable instructions for an appearance and/or behavior of one or more non-native widgets into the visualization project at least partly in response to a user action; providing in the visualization authoring environment a facility to enable the user to modify one or more of the following attributes of an instance of a non-native widget: size, position, connections between the non-native widget and other widgets; and providing in a visualization rendering environment a facility to exhibit the desired visual rendering and/or interactive behavior during rendering of the visualization project to thereby simulate the proposed software application.

Disclosed herein is at least one module stored in non-transitory memory configured to cause a computing system to perform operations comprising: providing a visualization authoring environment configured to enable a coder to define a user interface appearance and behavior of a prospective software application or a prospective modification to an existing software application at least in part by incorporating native widgets; storing such definitions on computer readable media in a format that can be utilized by one or more other instances of the visualization authoring environment and/or one or more instances of a visualization rendering environment; providing in the visualization authoring environment a facility to enable a user to incorporate one or more non-native widgets into the visualization authoring environment without requiring acquisition or installation of a new version of the visualization authoring environment;

providing in the visualization authoring environment a facility to enable the user to incorporate non-native widgets into a visualization project; encapsulating computer readable instructions for an appearance and/or behavior of one or more non-native widgets into the visualization project at least partly in response to a user action; providing in the visualization authoring environment a facility to enable the user to modify one or more of the following attributes of an instance of a non-native widget: size, position, connections between the non-native widget and other widgets; and providing in a visualization rendering environment a facility to exhibit the desired visual rendering and/or interactive behavior during rendering of the visualization project to thereby simulate the proposed software application.

Disclosed herein is an example system comprising: a computing system, including one or more processing devices; one or more modules stored in non-transitory memory configured to cause the computing system to perform operations comprising: receiving from a visualization project created by a user one or more properties for a non-native widget established by a developer of the non-native widget, such properties designating one or more of a name and/or a type of data that the non-native widget is capable of processing; at least partly in response to an instruction received from the user of the visualization authoring environment, establishing a source of data to be processed by the non-native widget and/or a destination of data produced by the non-native widget to be processed by other one or more other widgets; and rendering the appearance and/or behavior of the non-native widget based at least in part on a value available from the source of the data and/or rendering the appearance and/or behavior of one or more other widgets based at least in part on data produced by the non-native widget.

Disclosed herein is at least one module stored in non-transitory memory configured to cause the computing system to perform operations comprising: receiving from a visualization project created by a user one or more properties for a non-native widget established by a developer of the non-native widget, such properties designating one or more of a name and/or a type of data that the non-native widget is capable of processing; at least partly in response to an instruction received from the user of the visualization authoring environment, establishing a source of data to be processed by the non-native widget and/or a destination of data produced by the non-native widget to be processed by other one or more other widgets; and rendering the appearance and/or behavior of the non-native widget based at least in part on a value available from the source of the data and/or rendering the appearance and/or behavior of one or more other widgets based at least in part on data produced by the non-native widget.

Disclosed herein is an example system comprising: a computing system, including one or more processing devices; one or more modules stored in non-transitory memory configured to cause the computing system to perform operations comprising: receiving from a visualization project created by a user one or more event definitions for a non-native widget established by a developer of the non-native widget, such event definitions designating one or more of the name and/or type of event that the non-native widget is capable of processing or producing; at least partly in response to an instruction received from the user of the visualization authoring environment, establishing a source of the event to be processed by the non-native widget and/or the destination of events produced by the non-native widget to be processed by other one or more other widgets; and rendering the appearance and/or behavior of the non-native widget based at least in part on an event received from the source of the event and/or rendering the appearance and/or behavior of one or more other widgets based at least in part on the event produced by the non-native widget.

Disclosed herein is at least one module stored in non-transitory memory configured to cause the computing system to perform operations comprising: receiving from a visualization project created by a user one or more event definitions for a non-native widget established by a developer of the non-native widget, such event definitions designating one or more of the name and/or type of event that the non-native widget is capable of processing or producing; at least partly in response to an instruction received from the user of the visualization authoring environment, establishing a source of the event to be processed by the non-native widget and/or the destination of events produced by the non-native widget to be processed by other one or more other widgets; and rendering the appearance and/or behavior of the non-native widget based at least in part on an event received from the source of the event and/or rendering the appearance and/or behavior of one or more other widgets based at least in part on the event produced by the non-native widget.

BRIEF DESCRIPTION OF THE DRAWINGS

The disclosed aspects will hereinafter be described in conjunction with the appended drawings, provided to illustrate and not to limit the disclosed aspects.

FIGS. 5A-12, 15A-B, 16A-B, 17, 18, 20, 21, and 23-26 depict user interface elements of a visualization authoring environment in an example embodiment.

FIG. 14 depicts example non-native widgets in an example user interface of an example visualization authoring environment as well as various optional features thereof.

DETAILED DESCRIPTION PREFERRED EMBODIMENTS

Figure 1:
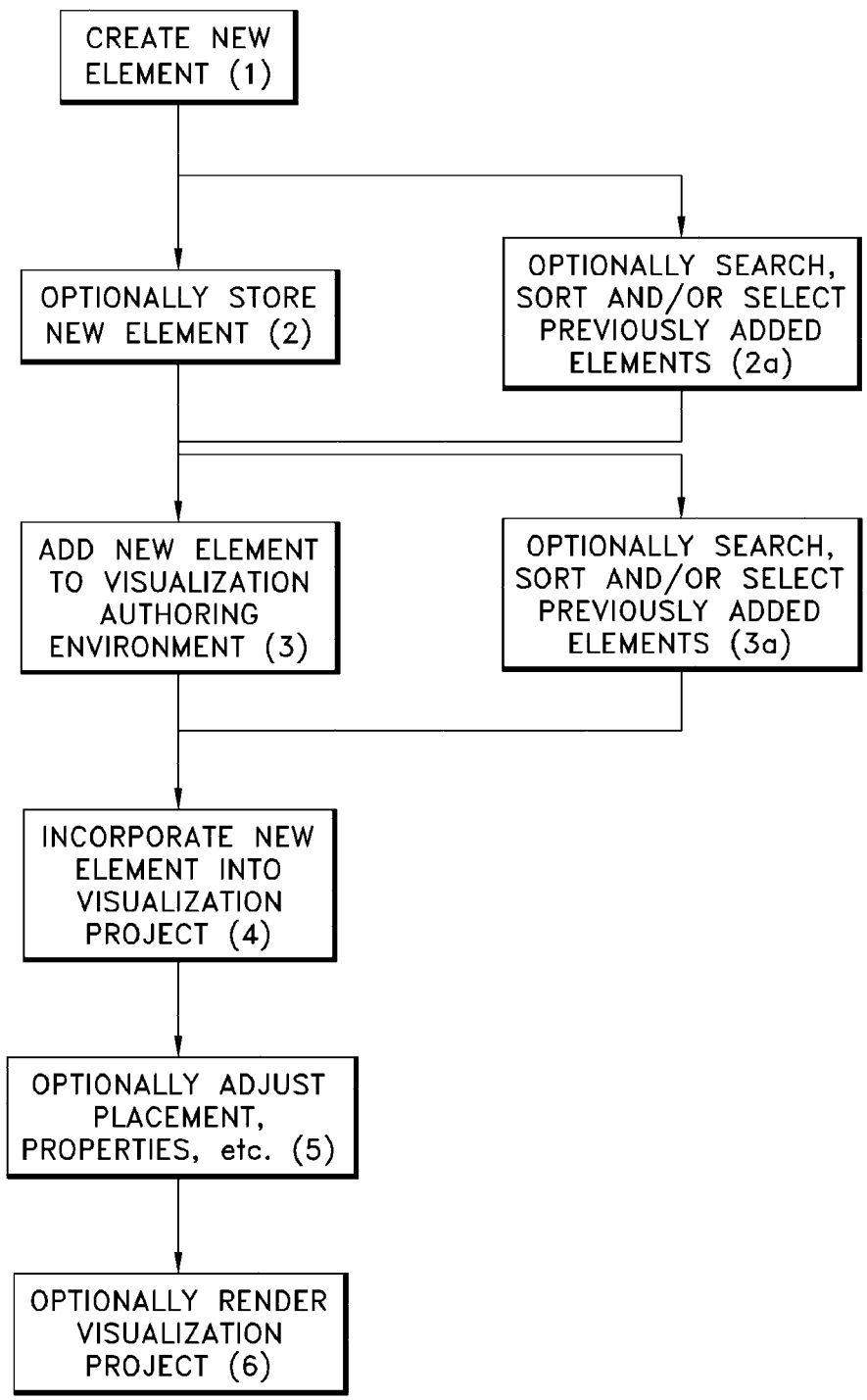
FIG. 1 depicts the overall process of an example embodiment.

Example embodiments are described with reference to certain figures.

The term "Web site" or "web-site", as used herein, is used to refer to a user-accessible network site that may implement the basic World Wide Web standards for the coding and transmission of hypertextual documents. These standards currently include HTML (the Hypertext Markup Language) and HTTP (the Hypertext Transfer Protocol), although other standards may be used, or the Web site may be implemented without complying with certain World Wide Web standards. It should be understood that the term "site" is not intended to imply a single geographic location, as a Web or other network site can, for example, include multiple geographically distributed computer systems that are appropriately linked together. Furthermore, while the descriptions herein relates to an embodiment utilizing the Internet and related protocols, other networks, such as networks of interactive televisions or of telephones, and other protocols may be used as well.

Similarly, while certain examples herein may refer to a personal computer system or terminal, other terminals, including other computer or electronic systems, can be used as well, such as, without limitation, an interactive television, a networked-enabled personal digital assistant (PDA), other IP (Internet Protocol) device, a cellular telephone or other wireless terminal, a networked game console, a networked MP3 or other audio device, a networked entertainment. Further, the description herein may refer to a user pressing or clicking a key, button, or mouse to provide a user input or response, the user input can also be provided using other apparatus and techniques, such as, without limitation, voice input, touch screen input, light pen input, touch pad input, and so on. Similarly, while the description herein may refer to certain messages or questions being presented visually to a user via a computer screen or graphical user interface, the messages or questions can be provided using other techniques, such as via audible or spoken prompts. While the description and example user interfaces may utilize phrases such as "requires", "must", and the like, it is understood that in certain embodiments, such required element may be optional. While certain examples may include text strings in the form of links or file paths, it is understood these links and file paths are provided by way of illustration to elucidate certain embodiments and are not intended to limit a particular embodiment to use with the example link or file path.

Further, while certain embodiment may enumerate certain elements or features, it is understood that embodiments may include fewer or additional elements or features. In one or more example embodiments, the functions, methods, algorithms, and techniques described herein may be implemented in hardware, software, firmware, or any combination thereof. If implemented in software, the functions may be stored as one or more instructions or code on a non-transitory computer-readable medium. Tables, data structures, formulas, and so forth may be stored on a non-transitory computer-readable medium. A storage medium may be any medium that can be accessed by a general purpose or special purpose computer or processing device. By way of example, and not limitation, such non-transitory computer-readable media can comprise RAM, ROM, EEPROM, DVD, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

For a hardware implementation, one or more processing units may be implemented within one or more computing devices including, but not limited to, microprocessors, micro-controllers, application specific integrated circuits (ASICs), programmable logic devices (PLDs), field programmable gate arrays (FPGAs), controllers, electronic devices, other electronic units designed to perform the functions described herein, or a combination thereof. For a software implementation, the techniques described herein may be implemented with code segments (e.g., modules) that perform the functions described herein. The software codes may be stored in memory units and executed by processors. The memory unit may be implemented within the processor or external to the processor, in which case it can be communicatively coupled to the processor. A code segment may represent a procedure, a function, a subprogram, a program, a routine, a subroutine, a module, a software package, a class, or any combination of instructions, data structures, or program statements.

Although certain embodiments and examples are discussed herein, it is understood that the inventive subject matter extends beyond the specifically disclosed embodiments and examples to other embodiments and uses and to obvious modifications and equivalents thereof. Thus, it is intended that the scope of the disclosure should not be limited by the particular disclosed embodiments and examples. For example, in any method or process disclosed herein, the acts, steps, or operations making up the method/process may be performed in any suitable sequence and are not necessarily limited to any particular disclosed sequence. Also, acts, steps, or operations may be added, removed, combined, or rearranged in other method/process embodiments. In systems and devices disclosed herein, components may be added, removed, combined, and/or arranged differently than described herein.

Various aspects and advantages or benefits of the embodiments have been described where appropriate. It is to be understood that not necessarily all such aspects, advantages, or benefits. may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein.

Descriptions and examples herein may refer to utilization of certain embodiments with example commercially available products, such as: iRise Studio (or just Studio or client)—a visualization authoring environment that enables users to create and define (e.g., via a drag and drop interface and other interfaces) appearance, workflow and behavior of proposed applications, and which can import simulated data from production systems to make the final result realistic; iRise Definition Center (or just DC or server)—a visualization rendering environment and visualization repository and which provides an electronic meeting place where users, such as business analysts, usability professionals and project managers, may collaborate to visually define applications, and when used in combination with a visualization authoring environment, such as iRise Studio, provides a secure, shared workspace for members on a project team; and iRise Reader (or Reader or iDoc Reader) a visualization rendering environment which enables a user to access and view interactive visualizations (such as those created using iRise Studio) that users can use to interact with to experience proposed software before coding of the software, and via which users can comment on the interactive visualizations, where the comments can then be transmitted to and/or accessed by an author of the interactive visualizations; and iDoc which refers to a visualization repository and/or a visualization project. However, it is understood that embodiments described herein may be used with other such tools and applications, and are not limited to use with the example products described herein. Unless the context indicates otherwise, the phrase "visualization" corresponds to "simulation," and vice versa. Either term, unless context indicates otherwise, may also refer to a visualization project. Similarly, unless the context indicates otherwise, the phrase "simulation platform" corresponds to "visualization platform," and vice versa, and the phrase "simulator" corresponds to "visualization rendering environment," and vice versa.

As used herein, terms that are further qualified with adjectives but also used without qualification are intended to encompass, separately and collectively, the qualified terms unless the context indicates otherwise. For example, the term "widget" may be further qualified with the adjectives "native" and "custom". The use of the term "widget", when used without qualification is intended to refer to both "native widgets" and "custom widgets" or either "native widgets" or "custom widgets" unless the context indicates otherwise.

As used herein "you" and "your" are intended to refer to a user of visualization platform unless the context indicates otherwise.

The state of the art of software development has evolved to include processes and systems for visualization (sometimes referred to as simulation) of such software prior to its assembly, testing and deployment using traditional methods. Unlike systems and methods used to assemble actual working software, visualization processes and systems produce a facsimile of actual working software with greatly reduced investment of time and resources and these processes and systems can be operated by individuals not skilled in actual software application development.

These visualization processes and systems are typically utilized to provide an interactive representation of a prospective software application and such interactive representation is used to support diverse activities in the software development lifecycle, including optionally validation of designs and requirements for the prospective software application, testing of design concepts with eventual end users of the prospective software application, assessing the feasibility of the prospective software application and communicating the desired behavior and appearance of the prospective application to individuals participating in the software development lifecycle. Such a prospective software application might include a web-site, a smart-phone application, a standalone application, an application accessible by a browser or one or more of many other types of applications that involve receiving inputs from an individual using the application. In addition, these visualization processes and systems may be used to provide an interactive representation of prospective modifications to an existing software application.

These visualization processes and systems typically employ authoring environments for creation of visualizations (sometimes referred to as visualization authoring environments), in which the users of such systems assemble such visualizations, at least in part by adding instances of various user interface elements (sometimes referred to as widgets) and behavioral elements (sometimes referred to as events or actions) to a data file that can be transferred to other installations of a visualization authoring environment or visualization rendering environment (sometimes referred to as a visualization project or iDoc). These visualization processes and systems may also employ visualization repositories which provide for storage or distribution of visualization projects and other data relevant to the visualization processes and systems in a computer readable medium. These visualization processes and systems may also employ visualization rendering environments which, based at least in part on utilizing a visualization authoring environment or a visualization repository, produce an interactive representation of a prospective software application. The combination of one or more of a visualization authoring environment, visualization repository and visualization rendering environment is sometimes referred to as a visualization platform.

Visualization authoring environments and visualization rendering environments typically contain computer readable instructions that govern the appearance and behavior of a limited set of user interface elements and behavioral elements, while the data files contain information that modifies the appearance or behavior of the user interface elements and behavioral elements. For example, a visualization rendering environment may contain computer readable instructions on how to play a video file, the visualization project would contain the actual video content to be played and specify the size of the window in the user interface in which the video would be played.

Because visualization authoring environments utilize a limited set of user interface elements and behavioral elements encoded into a visualization authoring environment by the developer of such environment the visualizations that can be produced from them are similarly limited. are The user interface elements and behavioral elements available encoded by the developer of a visualization platform into that platform are sometimes referred to as "native" elements (for example "native widgets" or "native actions").

For example, a visualization author may be creating a visualization of a prospective software application in which a movie player window is desired to appear. If the visualization authoring environment does not offer a user interface element corresponding to a movie player window as a native widget, or does not offer behavioral elements corresponding to those common in the context of a movie player window (for example, pause, play or fast forward) as a native action, the visualization author may not be able to include these elements in the visualization of a prospective software application.

As software applications become more complex and sophisticated with respect to the variety of user interface elements and behavioral elements, requirements for prospective software applications become similarly more complex and sophisticated. Developers of visualization platforms have therefore incorporated new native widgets and actions into their platforms to permit the end users of such applications to simulate an ever-growing universe of user interface elements and behaviors, further necessitating the end users of visualization platform to acquire and install new versions of these platforms that contain the new native widgets and actions. Because there are significantly more companies and individuals developing new user interface and behavioral elements in software applications and relatively fewer companies and individuals developing analogous native widgets and actions for visualization platforms, visualization platforms frequently do not contain the native widgets and actions desired by end users of visualization platforms. Furthermore, since some developers of new user interface and behavioral elements for software applications consider such elements to be of a proprietary nature, visualization platform developers may not have sufficient information to incorporate analogous native widgets and actions into their visualization platforms.

Systems and methods are described herein that reduce these restrictions by providing a process by which visualization authoring environments can be easily extended to encompass additional user interface elements and behavioral elements sometimes referred to as "non-native" elements, widgets or actions. Such additional user interface elements are also referred to herein as custom widgets (or simply widgets) and such additional behavioral elements are referred to herein as custom actions (or simply actions), and in some cases custom events (or simply events). For convenience custom widgets, custom actions and custom events may be referred to simply as custom widgets or iBlocs. In certain embodiments, such non-native elements or widgets may be non-integral to the visualization authoring environment while native widgets may be integral to the visualization authoring environment.

Additionally and optionally, the systems and methods described herein provide a process by which altering the appearance and behavior of a visualization platform can be accomplished (in addition to the introduction of additional user interface elements and behavioral elements). For example, a visualization rendering environment could be altered to provide a palette of annotation tools for collecting feedback on a prospective software application. As another example, a visualization platform could be altered to collect and analyze user interactions (for example, usability metrics) based on users interacting with the visualization rendering environment.

A benefit of the systems and methods described herein is that a wide variety of software developers can create new widgets and actions for a visualization platform, rather than relying on the developer of the visualization platform. These new widgets and actions can then be used by still wider group of end users of a visualization platform without necessitating acquisition or installation of new versions of such platforms. Furthermore, since the systems and methods herein provide for inclusion of all of the necessary information required by a visualization platform utilize new widgets and actions within visualization projects, end users of a visualization platform do not need to independently incorporate such elements into their visualization platform or take additional related steps, for example validating that their visualization platform has all of the elements necessary to process a particular visualization project.

Another benefit of the systems and methods described herein is that developers of custom widgets do not need to have access to or learn the structure of the source code for a visualization platform. Such source code is typically considered proprietary information of the developer of the visualization platform and not widely distributed, and is frequently very complex and difficult for a developer to modify or extend.

With reference to FIG. 1, the process begins by creation of a new user interface element or new behavioral element (1) by way of activities that will be described in more detail herein. The new element may then be temporarily stored locally in computer readable media (2) or optionally, may be stored in one or more facilities provided by public or private web-sites. Optionally, since more than one new element may be temporarily stored in such media or facilities, these media or facilities may be searched or sorted to further enable selection of an appropriate element (2a). The new element is then added to an instance (or several instances) of a visualization authoring environment (3), permitting the operator of such an environment to incorporate the new element into a visualization of a prospective software application (4). Optionally, the process may continue with an additional step wherein the operator of the visualization authoring environment may adjust one or more of the placement, orientation, configuration, properties or connections to (or from) the new element (5). Further, the process may optionally continue with an additional step wherein the visualization of the prospective software application that includes the new element is rendered or interacted with (6). Further, since more than one new element may be created at (1) and incorporated into the visualization authoring environment (3), an additional step may be included in the process by which the operator of the visualization authoring environment selects one or more additional previously added user interface elements or behavioral elements by searching or sorting through the previously added user interface elements and behavioral elements (3a).

(1) Creation of a New User Interface Element or New Behavioral Element.

Depending on the needs of the person creating such an element, the new element may be intended to appear or behave similarly to a known element or behavior present in an existing software program or may be intended to appear or behave in a way not previously realized in an existing software program. In yet another case, such an element may be based on a previously created element, with one or more modifications or improvements.

Figure 2:
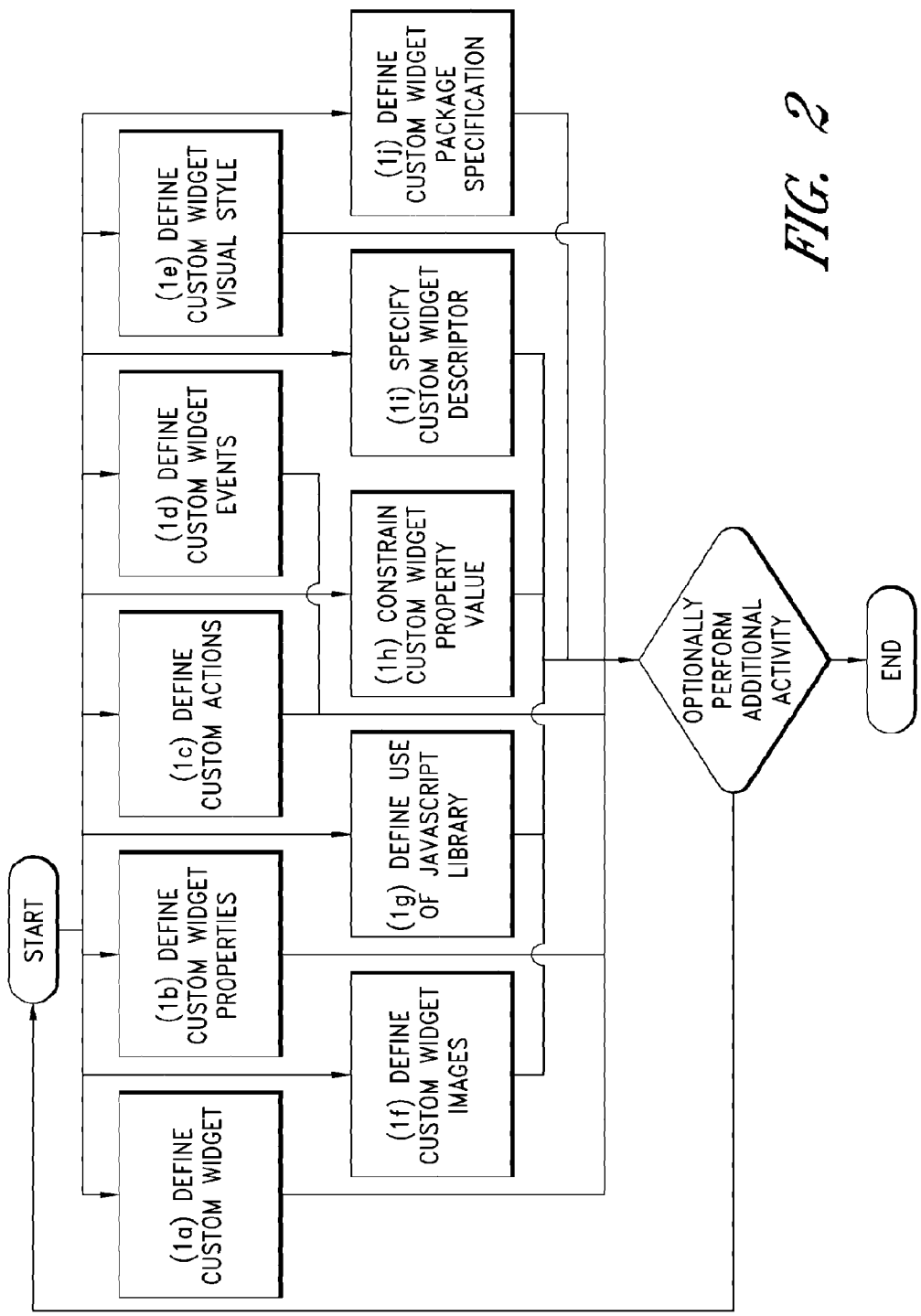
FIG. 2 depicts a new widget creation process of an example embodiment.

One of several embodiments of the process of creating a new user interface element or new behavioral element includes at least a subset of the following activities which are depicted in the FIG. 2: (1a) define a custom widget, (1b) define custom widget properties, (1c) define custom actions, (1d) define custom widget events, (1e) define custom widget visual style, (1f) define custom widget images, (1g) define use of a javascript library, (1h) constrain custom widget property values, (1i) specify custom widget descriptor, and (1j) define custom widget package specification. Each of these optional activities may occur in a sequence different than discussed herein in a different embodiment.

Each of these optional activities are described by way of illustration below using the example of a new custom widget called "colorbox" or in some cases "mycolorbox", however the same activities would generally apply regardless of the name or nature of the new custom widget (e.g., a new custom widget corresponding to a movie player window named "movieplayer".)

The present embodiment of activities related to the process of creating new user interface element or new behavioral element are described further below. By way of example, computer readable declarations and instructions may be presented below utilizing Extensible Markup Language (sometimes referred to as XML), JavaScript, Cascading Style Sheets (sometimes referred to as CSS), jQuery and JSON. In different embodiments, one or more other languages, libraries, conventions or technologies could be employed to the same effect.

(1a) Define Custom Widget.

The first step in defining a custom widget is defining an identifier (ID) that is unique to the widget. In the present embodiment, a component of a computer system is employed to acquire this identifier by way of a graphical user interface; however different embodiments may utilize other approaches common in the software industry (e.g., via a textural command line) or not typically used in the software industry. A widget can be uniquely identifiable by a compound ID that consists of three pieces of information: group, name and version, although other optional information may be included. This information may be used by other processes and components of the present embodiment that are described further herein and may or may not be presented in the visualization authoring environment. The group component of the compound ID provides name spacing, and as would be understood by an individual skilled in the art, name spacing helps avoid naming conflicts (e.g. if two companies have a widget with the same name). This is typically a representation of a company name, usually proceeded by 'com.' (e.g. if your company name is My Company Inc., you might choose com.mycompany). The name component of the compound ID may be a representation for the name of this widget (e.g. colorbox, movieplayer, imagebutton, box, map, etc.). The version component of the compound ID may be a designation used to delineate different variants of the custom widget, as would be understood by an individual skilled in the art. In addition other optional data elements may be part of the definition of a custom widget, for example display name, which may be presented in the context of a graphical user interface to the operator of the visualization authoring environment and the name of the author of the custom widget.

Figures 3A, 3B:
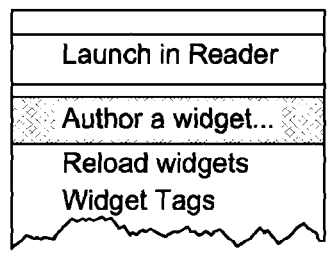
FIG. 3 (including FIGS. 3A-3B) depicts user interface elements an example embodiment.

FIG. 3A and FIG. 3B represent one embodiment of the elements of a graphical user interface component of a computer system configured to define a custom widget. In this case, the activities related to the process of creating new user interface elements or new behavioral elements are supported by the same visualization authoring environment as is used in other steps in the overall process, but different embodiments may employ separate computer systems for creating new elements and using them (e.g., adding them to) visualization authoring environments or visualizations.

Figure 4:
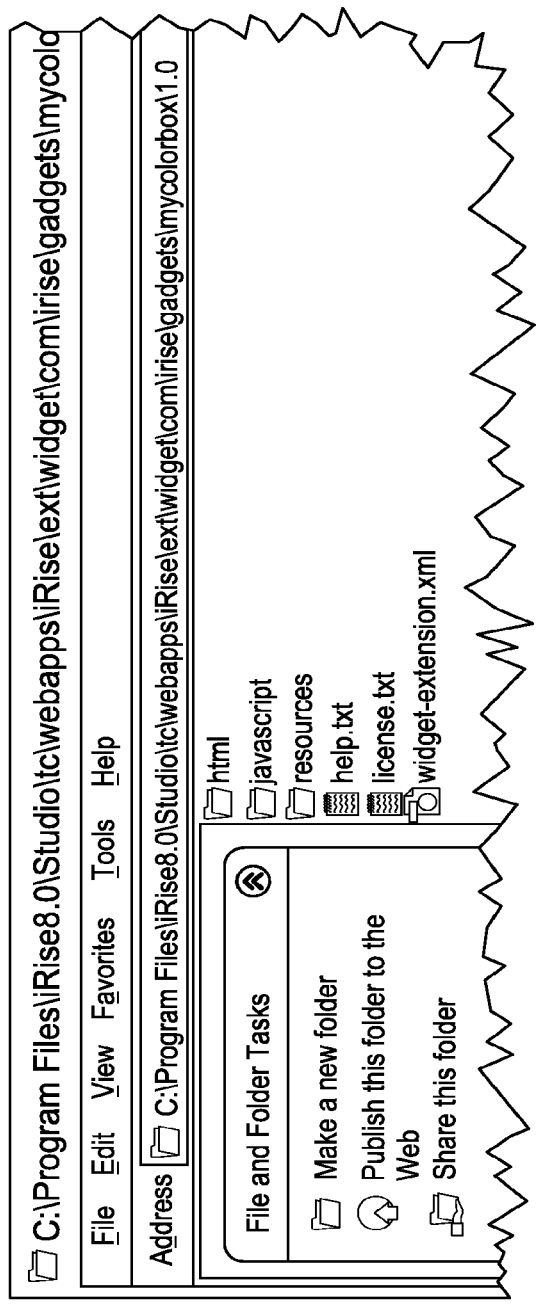
FIG. 4 depicts files used in an example embodiment.

In the present embodiment, operation of the graphical user interface elements depicted in FIG. 3A and FIG. 3B cause a component of a computer system to persist the information to computer readable storage media, in this case the file system, using common techniques that would be apparent to an individual skilled in the art. Again in this case, the stored information is depicted as the file widget-extension.xml in FIG. 4.

(1b) Define Custom Widget Properties.

An optional and optionally repeated step in the activities related to the process of creating new user interface element or new behavioral element is defining custom widget properties. In the present embodiment this is accomplished by editing the aforementioned widget-extension.xml file (also sometimes referred to as a "Descriptor"). By way of example, the following edits to the file establishes a custom widget property of "color".

| XML |
|---|
| <p:propertyDescriptor><br><p:id>color</p:id><br><p:displayName>Color</p:displayName><br><p:type>string</p:type><br><p:defaultValue>yellow</p:defaultValue><br></p:propertyDescriptor> |

Editing of the file in the current embodiment may be accomplished using one of many commonly available file editors (e.g., Microsoft Notepad) but in different embodiments may be accomplished using a computers system component configured to provide a specialized graphical user interface for editing the file.

Figure 5A:
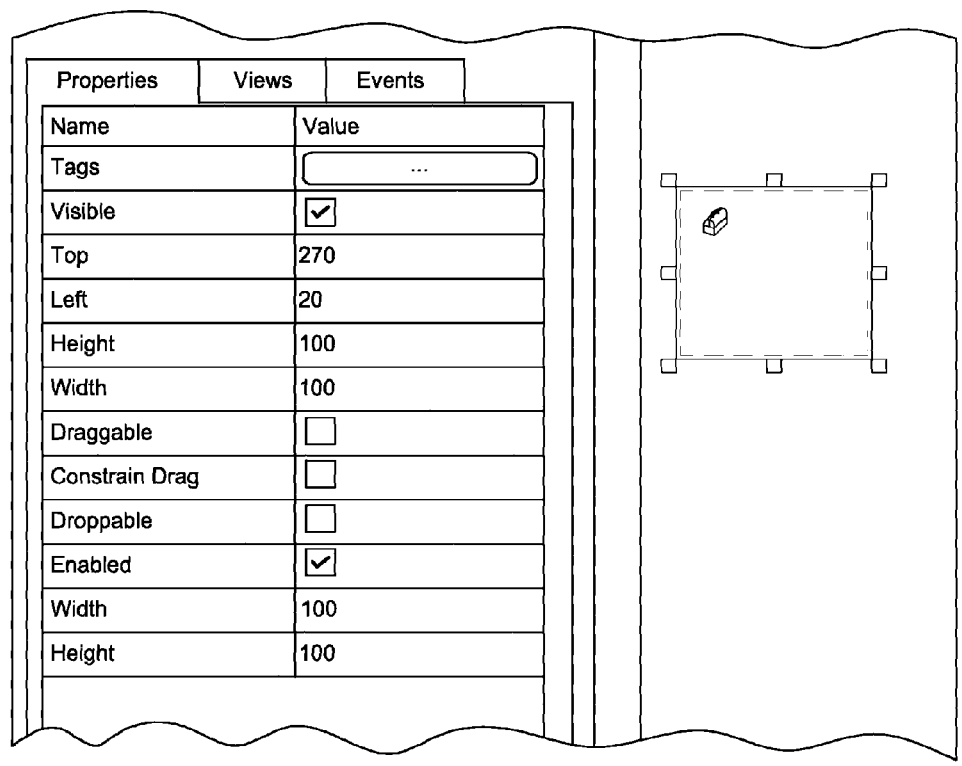
Figure 5B:
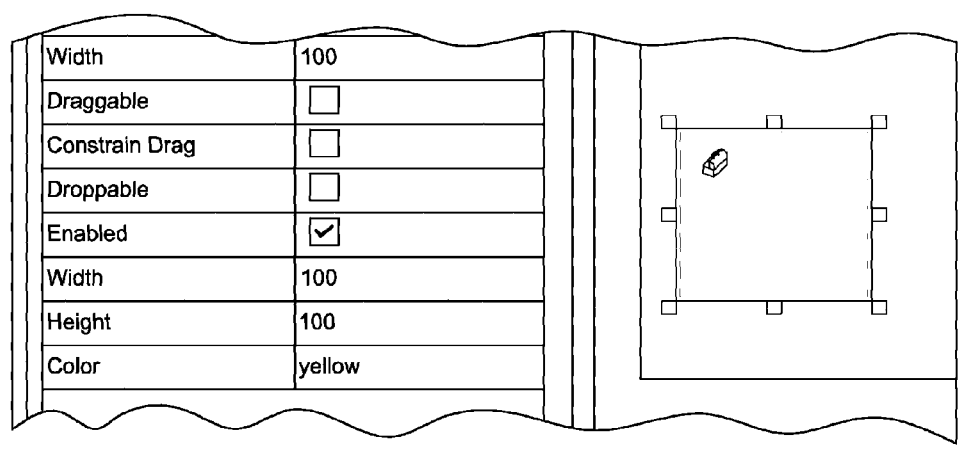

In the present embodiment, the visualization authoring environment (which, as previously discussed, is also utilized to support the process of defining new elements) reads the file that was edited previously and presents the information using a graphical user interface depicted in FIG. 5A (before the addition of the "color" property) and in FIG. 5B (after the addition of the "color" Property).

The preceding editing of the file may not yet complete the step referred to as define custom widget properties. Optionally, the individual creating the custom element may further edit the file to incorporate computer readable instructions to cause the representation or behavior of the custom widget in the visualization authoring environment or the visualization produced from it to vary based on the value (in this example "yellow") optionally set by the operator of the visualization authoring environment. By way of example, the following edits establish this behavior:

```
return {
    init : function( ) {
        var color = properties.color;
        document.getElementById(id).style.backgroundColor = color;
    }
};
```

In addition to or instead and by way of example, the instructions above could also be implemented in a more generalized format that accomplishes the same purpose when combined with optional enablement of other behaviors described herein.

| JavaScript |
|---|
| ```
if(!com) var com={ };
if(!com.irise) com.irise={ };
if(!com.irise.samples) com.irise.samples={ };
if(!com.irise.samples.mycolorbox) com.irise.samples.mycolorbox =
function(parameters) {
    var selector = parameters.selector;
    var id = parameters.id;
    var properties = parameters.properties;
    var $ = parameters.$;
    function setBoxColor(color) {
        $('.' + selector).css("background-color", color);
    }
    return {
        init : function( ) {
            var color = properties.color;
            setBoxColor(color);
        }
    };
};
``` |

In this example, each instance of a custom widget has its own JavaScript object that is automatically created when the object is rendered as part of visualization. When the object is instantiated, it is passed the following parameters: selector (which is a unique class id, e.g. <div class='unique Selector' ... >), ID (which is the instance of the custom widget's HTML element id, e.g. <div id='uniqueId' ... >), properties (which are the values set in the graphical user interface of the visualization authoring environment and defined in the aforementioned widget-xtensions.xml file) and $ (which is a reference to a jQuery object.)

Further and by way of example, the instructions described above may be contained in the same file as the XML instructions or they may be segregated into a separate file. In different embodiments, the flexibility to comingle or segregate different types of instructions may not be included.

(1c) Define Custom Actions.

Optionally, the individual creating the custom element may further edit the file to incorporate computer readable instructions to cause the representation or behavior of the custom widget in the visualization authoring environment or the visualization produced from it to vary based on the optional execution of a custom action, optionally configured by the operator of the visualization authoring environment. By way of example, the following edits to the previously presented example of a widget-extension.xml file establish this behavior. In this example, a setRandomColor custom action is used and a standard Button widget (as might be provided by a visualization authoring environment) is used to active the custom action.

| XML |
|---|
| ```
<p:actionDescriptor>
<p:id>setRandomColor</p:id>
<p:displayName>Set the box's color to a random value.</p:displayName>
<p:description></p:description>
<p:javascriptFunction>setRandomColor</p:javascriptFunction>
</p:actionDescriptor>
``` |

Similar to defining a custom widget property, defining a custom action has two parts: exposing it through XML (or other technology), which was described previously, and optionally further defining the behavior using JavaScript (or other technology). By way of example, the following edits to the previously presented example of a widget-extension-.xml file further define this behavior.

| JavaScript |
|---|
| ```
if(!com) var com={ };
if(!com.irise) com.irise={ };
if(!com.irise.samples) com.irise.samples={ };
if(!com.irise.samples.mycolorbox) com.irise.samples.mycolorbox =
function(parameters) {
    var selector = parameters.selector;
    var id = parameters.id;
    var properties = parameters.properties;
    var $ = parameters.$;
    var colorArray = "Azure,Coral,Lime,Plum,Teal".split(',');
    function setBoxColor(color) {
        $('.' + selector).css("background-color", color);
    }
    return {
        init : function( ) {
            var color = properties.color;
            setBoxColor(color);
        },
        setRandomColor : function( ) {
            var randomnumber =
Math.floor(Math.random( )*colorArray.length);
            var color = colorArray[randomnumber];
            setBoxColor(color);
        }
    };
};
``` |

Figure 6:
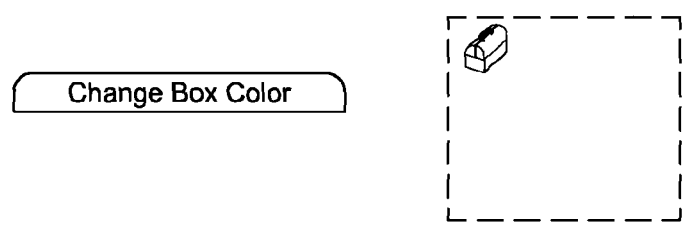
Figure 7:
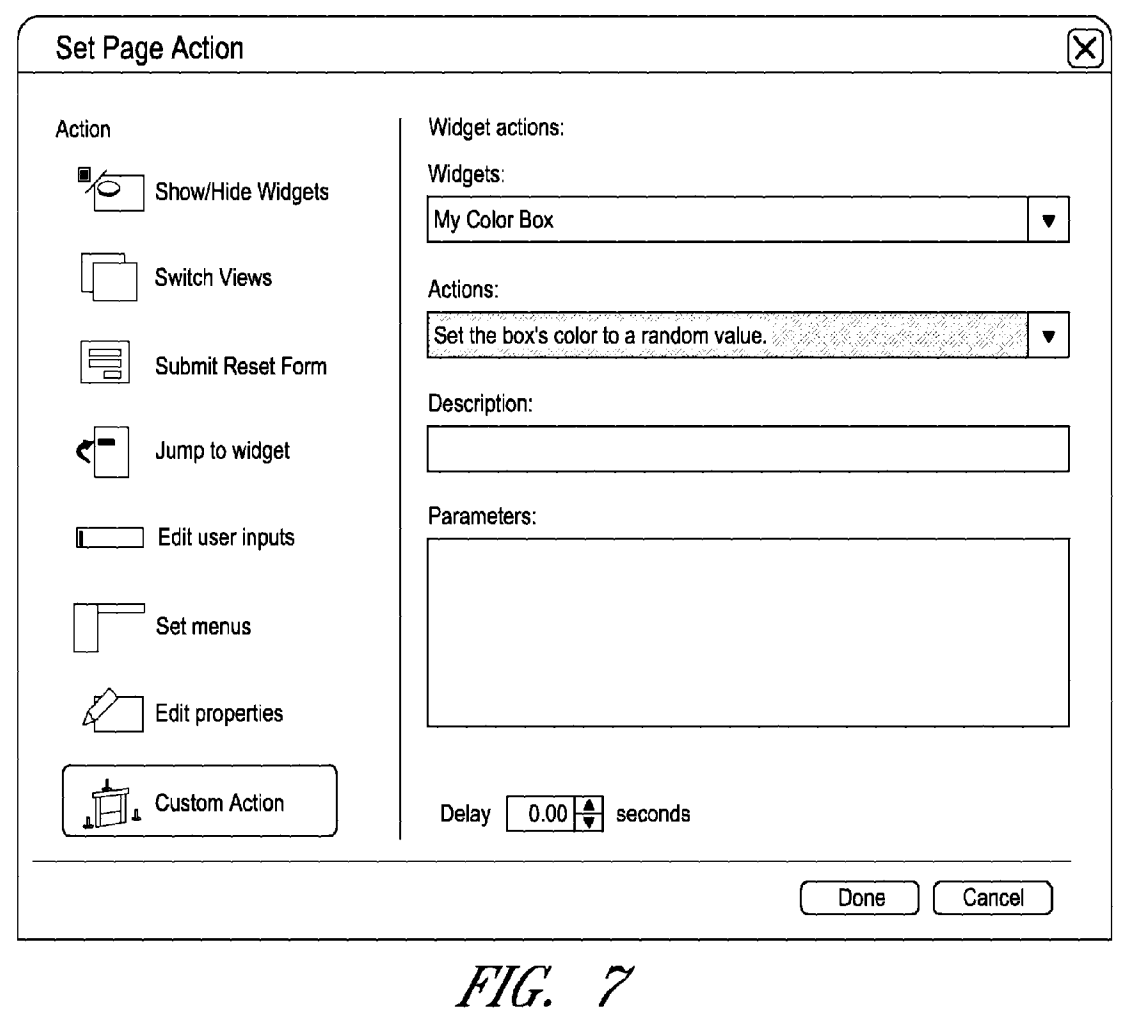

FIG. 6 and FIG. 7 depict, in the current embodiment, how the effects of this step may appear in a graphical user interface of a visualization authoring environment.

(1d) Define Custom Widget Events.

Optionally, the individual creating the custom element may further edit the file to incorporate computer readable instructions to cause the representation or behavior of the custom widget in the visualization authoring environment or the visualization produced from it to produce a custom event (in this example "onColorChanged") optionally further configured by the operator of the visualization authoring environment. By way of example, the following edits to the previously presented example of a widget-extension.xml file establish this behavior. In this example, a custom event named onColorChanged is defined.

| XML |
|---|
| ```
<p:eventDescriptor>
    <p:id>onColorChanged</p:id>
    <p:displayName>On color changed</p:displayName>
    <p:description>
    This event is fired when the box's color changes.
    The event contains a color field.
    </p:description>
</p:eventDescriptor>
``` |

Similar to defining a custom widget property, defining a custom action has two parts: exposing it through XML (or other technology), which was described previously, and optionally further defining the behavior using JavaScript (or other technology). By way of example, the following edits to the previously presented example of a widget-extension-.xml file further define this behavior.

| JavaScript |
|---|
| ```
function setBoxColor(color) {
    $('.' + selector).css("background-color", color);
    com.irise.event.fire('onColorChanged', id, {color: color});
}
``` |

Figure 8:
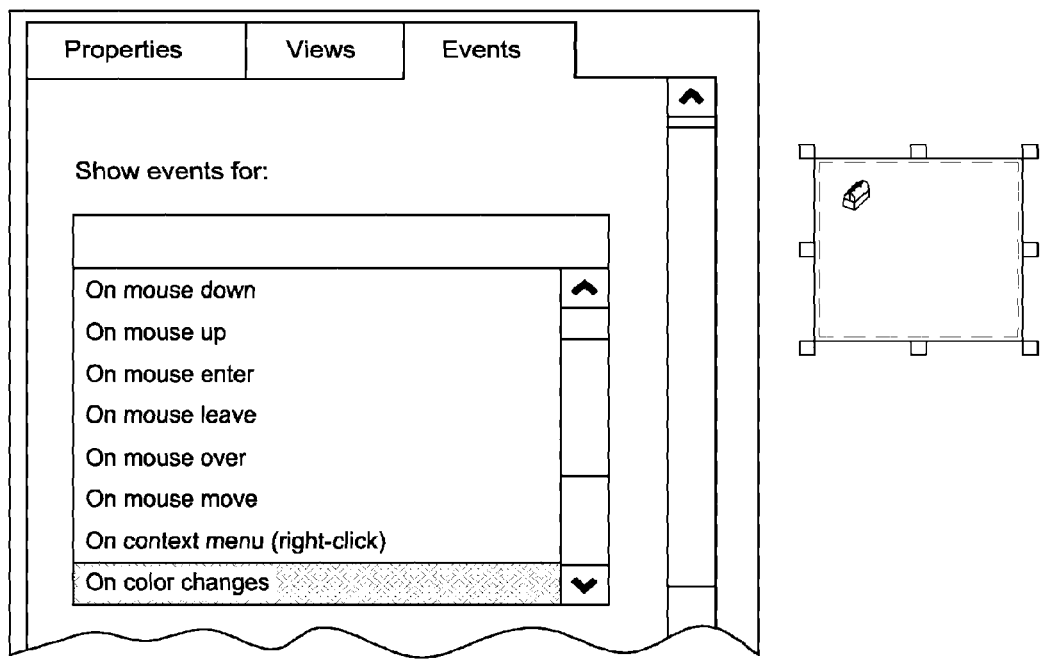

FIG. 8 depicts in the current embodiment, how the effects of this step may appear in a graphical user interface of a visualization authoring environment.

(1e) Define Custom Widget Visual Style.

Optionally, the individual creating the custom element may further edit the file to incorporate computer readable instructions to cause the representation or behavior of the custom widget in the visualization authoring environment or the visualization produced from it to take on certain graphical properties, or to take on certain graphic properties when optional events are executed in the visualization authoring environment or the visualization produced from it. In this example two behaviors are presented, first displaying a red dashed boundary and second displaying an image when the operator of a visualization produced by a visualization authoring environment provides inputs by way of mouse movements. By way of example, the following edits to the previously presented example of a widget-extension.xml file establish this behavior:

Example of adding a red dashed boundary:

```
CSS
.com-irise-samples-mycolorbox {
    border: dashed 1px red;
}
Example of causing image display based at least in part on input of
mouse movement JavaScript
.com-irise-gadgets-mycolorbox {
    border: solid 1px black;
}
.com-irise-gadgets-mycolorbox-hover {
background:url('/iRise/ext/widget/com/irise/gadgets/mycolorbox/
1.0/resources/images/yourImage.png');
    background-position: 0 0;
    background-repeat: no-repeat;
}
And
    init : function( ) {
        $('.' + selector).hover(
            function( ){
                // over
                $(this).addClass('com-irise-gadgets-
                mycolorbox-hover');
            },
            function( ){
                // out
                $(this).removeClass('com-irise-gadgets-
                mycolorbox-hover');
            }
        );
        var color = properties.color;
        setBoxColor(color);
    },
```

Figure 9:
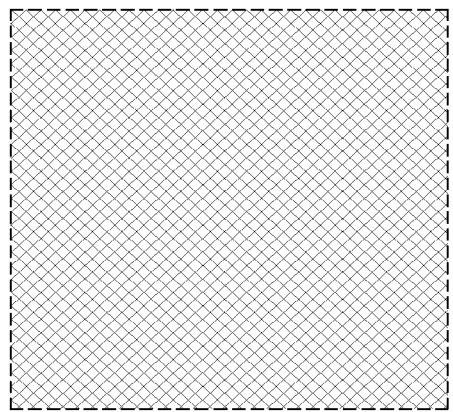

FIG. 9 depicts how the effects of this step may appear in a graphical user interface of a visualization authoring environment.

(1f) Define Custom Widget Images.

Optionally, the individual creating the custom element may further edit the file to incorporate computer readable instructions to cause the representation of the custom widget in the visualization authoring environment to correspond to one or more images. In this example three image representations are presented, each corresponding to a mode of display of widgets they may be available in a visualization authoring environment, named in this example "small icon", "icon" and "preview". By way of example, the following edits to the previously presented example of a widget-extension.xml file establish this behavior.

```
XML
<p:editorSettingDescriptor>
    <p:hResizable>true</p:hResizable>
    <p:vResizable>true</p:vResizable>
    <p:previewFile>resources/images/preview.gif</p:previewFile>
    <p:iconFile>resources/images/icon.gif</p:iconFile>
    <p:smallIconFile>resources/images/smallIcon.gif</p:smallIconFile>
</p:editorSettingDescriptor>
```

Figure 10:
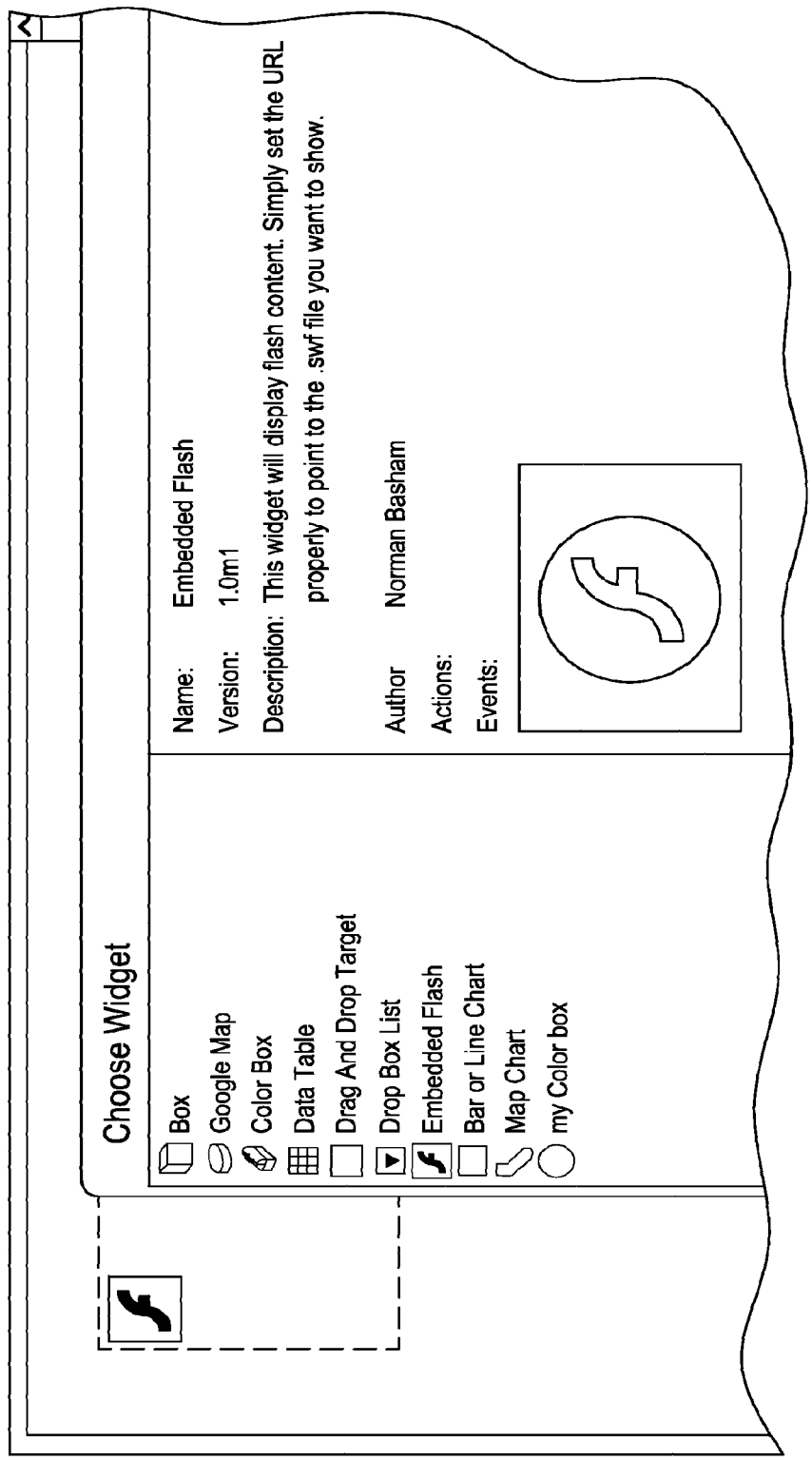

FIG. 10 depicts, in the current embodiment, how the effects of this step may appear in a graphical user interface of a visualization authoring environment. From the left to the right, an icon is shown (shown partially obscured with a dotted border), a small icon is shown (show immediately to the left of the label "Embedded Flash") and a preview is shown (the larger red square containing a circled red f).

In the present embodiment, a descriptor is used to specify images used to render custom widgets in a visualization authoring environment, as further described in the table below.

| Name | Description |
|---|---|
| canyasImage | The canvasImage is used to render the iBloc on the canvas. |
| iconImage | The iconImage is the iconic representation of the iBloc, used when displaying the iBloc in panels and dialogs. |

In a different embodiment, rather than utilizing static images, the custom widget's visual appearance may be delegated to computer readable drawing instructions (for example, utilizing Java2D or SVG) which could optionally be configured in this activity or in (1g)

(1g) Define Use of a Java Script Library

Optionally, the individual creating the custom element may further edit the file to incorporate computer readable instructions to cause the representation or behavior of the custom widget in the visualization authoring environment or the visualization produced from it to be further defined by other sets of computer readable instructions. This feature is particularly useful in the event that such sets of computer readable instructions have been previously created, although this feature may also be useful when such instructions have not been previously created. In the example provided below, a separate set of computer readable instructions that are part of the jQuery library are at least in part utilized to enable the display of the example custom element with rounded corners.

```
XML
<p:propertyDescriptor>
    <p:id>effect</p:id>
    <p:displayName>Corner effect</p:displayName>
    <p:type>string</p:type>
    <p:defaultValue>round</p:defaultValue>
</p:propertyDescriptor>
JavaScript
$('.' + selector).corner(properties.effect);
```

Figure 11:
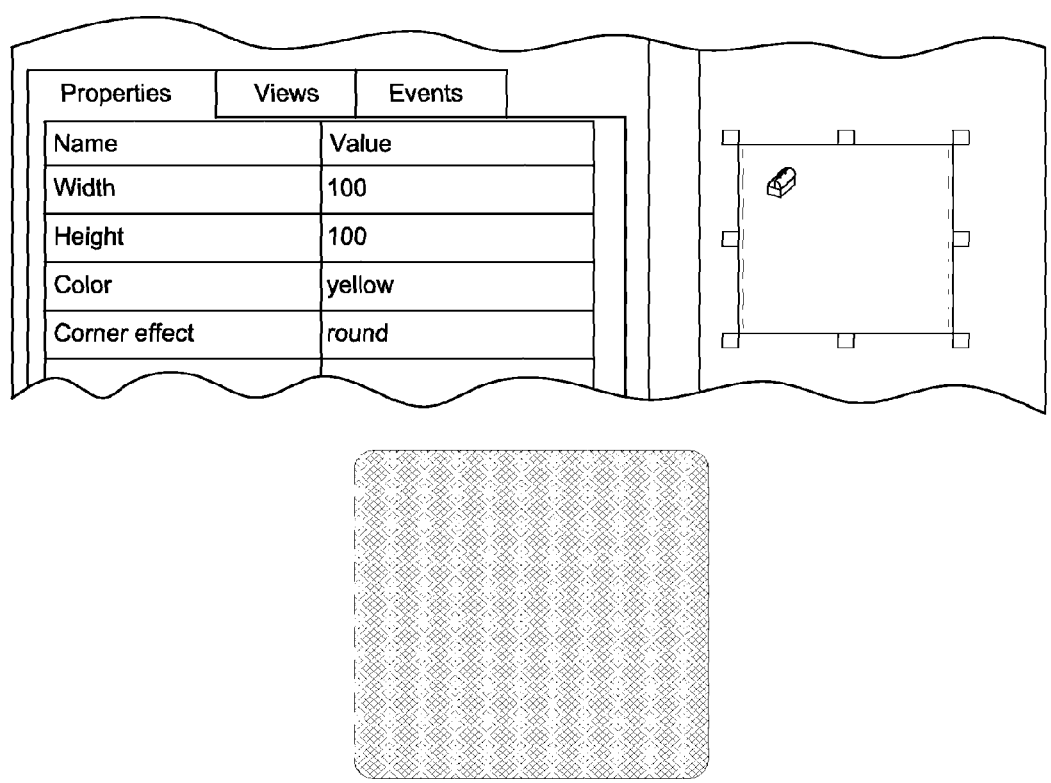

FIG. 11, in the current embodiment, illustrates how the effects of this step may appear in a graphical user interface of a visualization authoring environment.

Advantageously, the present embodiment also provides for various methods of referencing external resources to be processed in other activities performed by the visualization platform. Internal and external resources intended to be loaded in the html head section may be defined in the ibloc xml preload section. In the example below, Dygraph.js is present in the preload section. The JavaScript file can either be packaged with the ibloc or can be referenced externally (e.g., on the web site).

```
Dygraph.js
irise.namespace("my.widgets");
my.widgets.Dygraph = function( ) { };
my.widgets.Dygraph.prototype.onload = function( ) {
}
```

In this example, the Dygraph widget is also dependent upon a JavaScript file at http://danvk.org/dygraphs/dygraph-combined.js. In the present embodiment, there are several means provided to references this script, including by way of example, downloading the script and package it with the ibloc itself (the benefit in this case being the ibloc can work in simulations that do not have an internet connection) and referencing it directly on a website (the benefit here is the externally available library does not need to be included in the ibloc). This example shows the second approach.

```
<preload>
 <scripts>
  <script src="http://danvk.org/dygraphs/dygraph-combined.js"></script>
  <script src="/iblocs/my.widgets/Dygraph/1.0/javascript/Dygraph.js">
  </script>
 </scripts>
</preload>
```
The preload section can also reference cascading style sheets (CSS). The behavior is equivalent to the loading of JavaScript resources.
```
<preload>
 <scripts>
  <script src="http://danvk.org/dygraphs/dygraph-combined.js"/>
  <script src="/iblocs/my.widgets/Dygraph/1.0/javascript/Dygraph.js"/>
 </scripts>
 <stylesheets>
  <stylesheet src="http://www.mywebsite.com/mySheet.css"/>
  <stylesheet src="/iblocs/my.widgets/Dygraph/1.0/resources/
myLocalSheet.css"/>
 </stylesheets>
</preload>
```

Resources that are not intended to be preloaded in the head can still be referenced and loaded dynamically by calling the rewriteURL(e.g., "relativePath/to/resource") which returns a URL that can be used to retrieve the resource. This URL can be dereferenced in image src tags, Ajax calls, etc. rewriteURL(e.g., "resources/myImage.jpg") will return a URL that can retrieve a resource located in the ibloc: my.widgets/Dygraph/1.0/resources/myImage.jpg.

An optional Content section is available in the present embodiment for specifying arbitrary html that will be rendered when simulating. In the present embodiment, the ibloc itself is rendered as a div, but in alternative embodiments other HTML or non-html tags may be used. It is often the case that an ibloc will append html elements as children to the parent div. (e.g., some third party JavaScript libraries will render by replacing a div on the page). This can easily be done in the ibloc descriptor by adding a content section and placing the html code in a CDATA section so that the XML parser does not attempt to parse/validate the html code:

By way of example, the content section below will create a div with id "myChildDiv" that is parented by the ibloc div.

```
<preload>
......
</preload>
<content>
 <![CDATA[<div id="myChildDiv"/>]]>
</content>
```

(1h) Constrain Custom Widget Property Values.

Optionally, the individual creating the custom element may further edit the file to incorporate computer readable instructions to cause the representation or behavior of the custom widget in the visualization authoring environment or the visualization produced from it to be constrained by certain value ranges. This feature is particularly useful in the event that properties included in other steps herein have limited range of valid values, although this feature may be useful in other circumstances. In the example provided below, the file is further edited to establish a list of possible valid values for the corner effect property referenced in the step "defining use of a java script library".

```
XML
<p:listConstraintDescriptor>
 <p:propertyId>effect</p:propertyId>
 <p:options><p:key>None</p:key><p:value>none</p:value></p:options>
 <p:options><p:key>Round</p:key><p:value>round</p:value>
 </p:options>
 <p:options><p:key>Cool</p:key><p:value>cool</p:value></p:options>
 <p:options><p:key>Bite</p:key><p:value>bite</p:value></p:options>
 <p:options><p:key>Slide</p:key><p:value>slide</p:value></p:options>
 <p:options><p:key>Jut</p:key><p:value>jut</p:value></p:options>
 <p:options><p:key>Curl</p:key><p:value>curl</p:value></p:options>
 <p:options><p:key>Tear</p:key><p:value>tear</p:value></p:options>
 <p:options><p:key>Wicked</p:key><p:value>wicked</p:value>
 </p:options>
 <p:options><p:key>Long</p:key><p:value>long</p:value></p:options>
 <p:options><p:key>Sculpt</p:key><p:value>sculpt</p:value>
 </p:options>
 <p:options><p:key>Dog</p:key><p:value>dog</p:value></p:options>
 <p:options><p:key>Dog 2</p:key><p:value>dog2</p:value></p:options>
 <p:options><p:key>Dog 3</p:key><p:value>dog3</p:value></p:options>
 <p:options><p:key>Fray</p:key><p:value>fray</p:value></p:options>
 <p:options><p:key>Notch</p:key><p:value>notch</p:value></p:options>
 <p:options><p:key>Bevel</p:key><p:value>bevel</p:value></p:options>
</p:listConstraintDescriptor>
  JavaScript
if(properties.effect != 'none')
 $('.' + selector).corner(properties.effect);
```

Figure 12:
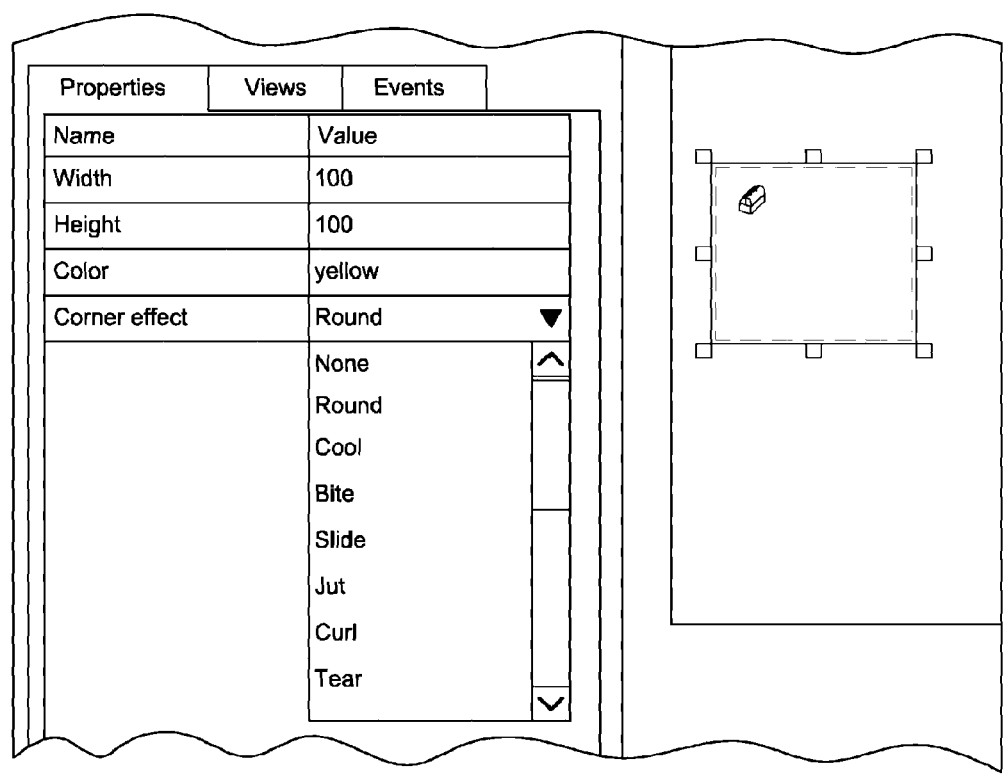

FIG. 12 depicts, in the current embodiment, how the effects of this step may appear in a graphical user interface of a visualization authoring environment.

(1i) Specify Custom Widget Descriptor.

Optionally, the individual creating the custom element may further edit the file to incorporate computer readable instructions to add representation or behaviors not previously addressed in one or more of the activities at (1a) through (1h) or to further modify the representations or behaviors referred to in those activities. This portion of the description of the present embodiment also serves to summarize and the types and formats of the declarations, instructions and other information that may form part of the new custom element.

The widgetDescriptor Element

In the present embodiment, the widgetDescriptor is the only required element in widget-extension.xml, but in different embodiments it may not be required.

| Field | Description |
| --- | --- |
| id | Widget's unique identifier defined by group, name, and version. |
| ↳ group | Widget namespace e.g. com.irise.example (can contain 0 to N namespace elements delimited by '.'). |
| ↳ name | Internal name of the widget e.g. smartbutton. |
| ↳ version | Version of the widget e.g. 1.0 or 2.03m1. |
| displayName | The name of the widget displayed to the user. |
| description | The description of the widget displayed to the user. The formatting (e.g. line breaks) in widget-extension.xml is removed. |
| author | The author of the widget displayed to the user. This can be a person or a company. |
| licenseFile | The name and optionally the relative path of the license file e.g. license.txt or resources/license.txt. The licensing information is displayed before a widget extension can be used in Studio. |
| helpFile | The name and optionally the relative path of the help file e.g. help.htm or resources/help.txt. This file can be formatted with HTML or text. The HTML support is minimal it does not support links, anchors, meta tags, JavaScript, etc. |

The actionDescriptor Element
This element defines a custom action(s) for the widget.

| Fields | Description |
| --- | --- |
| id | The action's unique (to this file) identifier. |
| displayName | The name of the action displayed to the user. |
| description | The description of the action displayed to the user. The formatting (e.g. line breaks) in widget-extension.xml is removed. |
| javascriptfunction | The function name of this action's JavaScript implementation. |
| parameters | A list of 0 to N parameters to be passed to the action's function. |
| ↳ id | The parameter's unique (to this action) identifier. |
| ↳ type | The parameter type. Possible values are boolean, string, number, array, object, and function. |
| ↳ name | The name of the parameter to displayed to the user. |
| ↳ description | The description of the parameter displayed to the user. The formatting (e.g. line breaks) in widget-extension.xml is removed. |
| ↳ required | Is this parameter required by the function. Possible values are true and false-defaults to false. |

The editorSettingsDescriptor Element
This element defines settings that may be used by a visualization authoring environment.

| Fields | Description |
| --- | --- |
| hResizable | Defines if this widget can be horizontally resized by the editor. Possible values are true and false-defaults to true. |
| vResizable | Defines if this widget can be vertically resized by the editor. Possible values are true and false-defaults to true. |
| smallIconFile | The name and optionally the relative path of the small icon file e.g. resources/images/smallicon.gif. |
| iconFile | The name and optionally the relative path of the icon file e.g. resources/images/icon.gif. |
| previewFile | The name and optionally the relative path of the preview file e.g. resources/images/preview.gif. |
| containable | Defines if this widget can be added as a child of another widget by the editor. Possible values are true and false-defaults to true. |
| canContain | Defines if this widget can have another widget added as a child. Possible values are true and false-defaults to false. |

The eventDescriptor Element
This element defines a custom event(s) for the widget.

| Field | Description |
| --- | --- |
| id | The event's unique (to this file) identifier. |
| displayName | The name of the event displayed to the user. |
| description | The description of the event displayed to the user. The formatting (e.g. line breaks) in widget-extension.xml is removed. |

The listConstraintDescriptor Element
This element defines a list of values that is valid for a propertyDescriptor.

| Field | | Description |
| --- | --- | --- |
| propertyId | | The [#propertyDescriptor].id to be constrained. The [#propertyDescriptor].type must be 'string'. |
| options | | 1 to N options. |
| ↳ | key change name to value | The value of the property. |
| ↳ | value change name to label | The label for this value to display to the user. |

The numberRangeConstraintDescriptor Element
This element defines a min and max range that is valid for a propertyDescriptor.

| Field | Description |
| --- | --- |
| propertyId | The [#propertyDescriptor].id to be constrained. The [#propertyDescriptor].type must be 'string'. |
| min | The minimum valid value for the property. |
| max | The maximum valid value for the property. |

The propertyDescriptor Element
This element defines a custom property(s) for the widget.

| Field | Description |
| --- | --- |
| id | The property's unique (to this file) identifier. |
| displayName | The name of the property displayed to the user. |
| description | The description of the property displayed to the user. The formatting (e.g. line breaks) in widget-extension.xml is removed. |
| type | The property type. Possible values are boolean, string, integer, double, float, color, and tag. |
| defaultValue | default value to use for this property. |
| modifiable | Defines if the user change the property value. Possible values are true and false - defaults to true. |
| required | Defines if the user has to enter a value for this property. Possible values are true and false - defaults to true. |

(1j) Define Custom Widget Package Specification.

Optionally, the individual creating the custom element may further edit or otherwise manipulate the file or files referred to in activities (1a) through (1i) to facilitate transfer of new user interface element or new behavioral element between creators of such elements and authors of visualizations (as well as, optionally, consumers of such visualizations). In the present embodiment, this activity sets forth the structure and other conventions for organizing and naming directories and files related to a custom element.

Directory Structure

In the present embodiment, the required directory structure follows this format, but other formats could be utilized in different embodiments.

```
group
    name
        version
```

Directory Structure example for a specific custom widget ID
    group com.irise.samples (1 to N directories)
    name box
    version 1.0

In the present embodiment, the required widget directory for a widget with this ID is as follows, but in other embodiments different directories could be used

```
com
    irise
        samples
            box
                1.0
```

File Structure

In the present embodiment, the widget-extension.xml is the only file that is required and it must be placed at the root of the widget directory as follows, although these requirements could be eliminated in different embodiments:

```
group
    name
        version
            widget-extension.xml
```

Other files can be placed anywhere inside the widget directory.

```
group
    name
        version
            widget-extension.xml
            resources
                name.css
                images
            JavaScript
                name.js
            html
                name.html
```

File Structure Example:

```
com
    irise
        samples
            box
                1.0
                    widget-extension.xml
                    license.txt
                    resources
                        box.css
                        images
                            smallicon.gif (gif, png or jpg)
                            icon.gif (gif, png or jpg)
                            preview.gif (gif, png or jpg)
                    JavaScript
                        box.js
                    html
                        box.html
```

In the present embodiment, a facility is available to assist in several of the activities described above. This facility, referred to as the iBloc creator utility packages a custom widget into a file or series of files as described herein. In the present embodiment, the iBloc creator utility takes the form of a computer module configured to take the following user input from the console: (a) location of the source directory where the iBloc data resides and (b) destination location where the iBloc will be extracted. If the destination is omitted, the current directory is used. If the iBloc name is not provided in the destination, an iBloc with name <namespace>-<name>-<version>.ibloc is used where namespace, name, and version correspond to the namespace, name and version as defined in the iBloc schema. Further, the iBloc creator utility functions to validate against the ibloc schema using a standard xml SAX parser that handles schema validation. If the validation fails, an informative message is presented to the user (including the line number (s) that are the cause of the error). Further, the iBloc creator utility continues processing with one or more of the following activities:

writing the new iBloc to the destination location
writing header information
opening a data stream
writing the following token "iRise iBloc:
writing a data version of the iBloc
writing the contents and all resources of the source location (the iBloc xml) through a compressed stream An operator of the iBloc creator utility may interact with it through one or more of the following optional activities:

To use the tool: 1. Launch the command prompt. 2. Navigate to the directory where the tool has been extracted (e.g., if the extracted folder is in C:\work\irise-ibloc-generator, type "cd C:\work\irise-ibloc-generator"). 3. Then type: ibloc-generator.bat [working directory] [iBloc destination folder\file name] to generate the iBloc.

By way of example, an operator of the iBloc utility may replace [working directory] with the path of the folder that contains the ibloc.xml file, e.g. C:\myWidgets\com.irise\ColorBox\1 and replace [iBloc destination folder\file name] with your iBloc folder and file name, e.g. C:\Users\[username]\Documents\iRise\myColorBox.ibloc.

The foregoing examples of activities involved in the creation of a new element could, in a different embodiment, be partially accomplished with the aid of a computer system component or components, in addition to the iBloc creator utility, each optionally configured to present the information through a graphical user interface and optionally configured to accept input information through the monitoring of keyboard, mouse, touch screen or other user interface technology.

It should be reiterated that the foregoing examples pertain to a relatively simple custom widget named Colorbox or myColorBox, but the activities described herein can be utilized to create a wide variety of more complicated and practical custom widgets, for example, calendar pickers that commonly occur on airline reservation web sites, contact lists that commonly occur on smartphone applications, or credit card information collection forms that commonly appear in ecommerce applications.

(2) Optionally Store New Element.

Figure 13B:
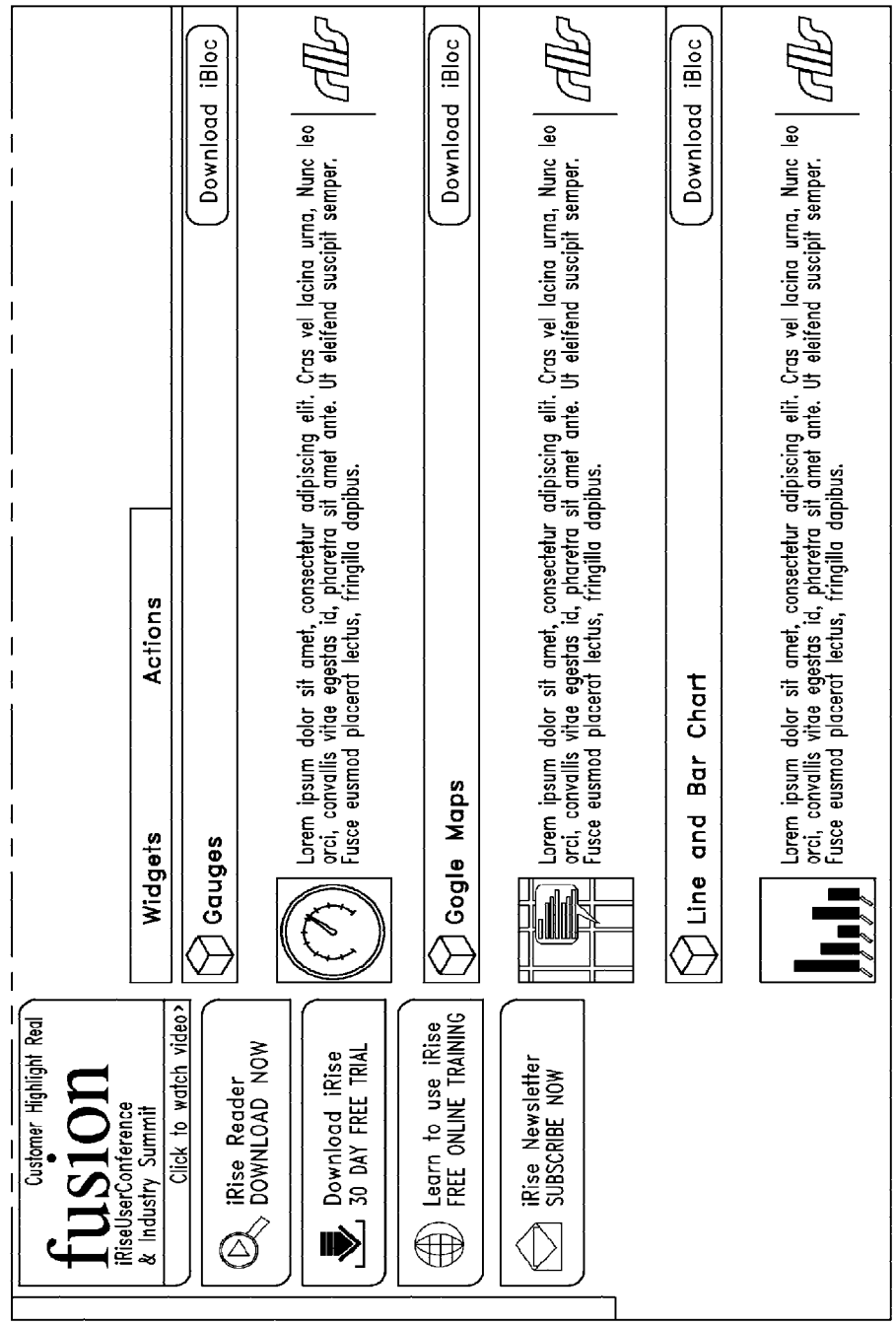
FIG. 13 (including FIGS. 13A-13B) depicts an example simulated web site.

In the present embodiment, a new element is stored on computer readable media and may be transferred between computer systems using common methods, including email, File Transfer Protocol (sometimes referred to as FTP) or other appropriate means. In different embodiments, the new element could also be stored in a database, including a relational database or RDBMS, an object oriented database or other electronic repository. To facilitate transfer of new user interface element or new behavioral element between creators of such elements and authors of visualizations (as well as, optionally, consumers of such visualizations), the present embodiment also optionally includes a public or private web-site depicted in FIG. 13 that stores one or more such elements.

In the present embodiment, a custom widget, custom action, or custom event may also be referred to as an "iBloc". In different embodiments, the web-site or other facility for temporary storage and transfer of new element might include additional capabilities to permit searching and sorting of new elements (2a).

(3) Adding a New Custom Widget

In the present embodiment, a custom widget is represented by one or more of a group of files (previously discussed in the descriptions of activities 1a through 1j) that are used to support the new element being incorporated into a visualization authoring environment. After acquiring the files representing a custom widget, the operator of a visualization authoring environment saves the files on their hard drive or other computer readable media. Advantageously, in the present embodiment, a visualization authoring environment computer software component is configured to monitor the computer readable media for the presence of a new custom widget and perform one or more of several activities when a new custom widget is detected. This monitoring permits the adding of a new custom widget without further user inputs. The activities performed when a new custom widget is detected optionally include the following, and may occur in any order.

a) Validate that the contents of the files representing the custom widget conform to an iBloc schema. An iBloc schema is a computer readable declaration of the structure and valid contents of the files representing a custom widget. In the present embodiment the iBloc schema is expressed in XML or an XML Schema Document, sometimes referred to as an XSD, although in different embodiments the an iBloc schema may be expressed using other conventions or standards. The iBloc schema of the present embodiment is reproduced in text form.

b) Store the contents of the files representing the custom widget in format more readily accessible by a visualization authoring environment, for example in the computer memory allocated to the visualization authoring environment. In the present example, this information may be stored in a directory structure in the form of "namespace/name/version" and, optionally, in sub-directories relative to the version directory.

c) Validate that the visualization authoring environment has a valid license to use the custom widget. As custom widgets may represent something of value to their creators and users, the creator of the custom widget may optionally utilize the techniques and facilities described in activities 1a through 1j to cause the representation or behavior of the custom widget in the visualization authoring environment or the visualization produced from it to not operate or to operate in a limited fashion, with a reduction in functionality, in the absence of a valid license key or other token. In different embodiments, this could be accomplished using public or commercially available licensing technology that would be apparent to an individual skilled in the art. Further, in a different embodiment the evaluation of the license validity could be performed upon the first attempted use of the custom widget, rather than at the time of incorporation into a visualization authoring environment.

d) Update repository of incorporated custom widgets. Optionally, a visualization authoring environment may maintain a repository or other persisted inventory of custom widgets that have been incorporated and this activity involves updating that persisted inventory for later retrieval.

Advantageously with respect to native widgets, the files representing the custom widget remain editable even after the process above, permitting them to be further modified without requiring re-execution of the this process or other processes described in (1).

The overall process described herein may optionally include an activity in which an operator of a visualization authoring environment searches or sorts custom widgets (3a) added to the visualization authoring environment as described under (2). An example graphical user interface of a visualization authoring environment is depicted in FIG. 14 showing the representation of several custom widgets (in this example labeled "Google Map", "Image Flow", "Slider (horizontal)" and "Slider (vertical)" that have been added to a visualization authoring environment, as well as graphical user interface controls for sorting and searching custom widgets. In the present embodiment, custom widgets and custom actions are segregated (but available using the graphical user interface controls labeled "Widgets" and "Actions"), but in different embodiments custom widgets and actions could be presented in a non-segregated fashion. Referring to FIG. 14, immediately following the example graphical user interface is a table that further describes optional features available in the present embodiment.

Advantageously, the present embodiment permits adding a new custom widget without requiring one or more of the following activities: acquiring a new version of the visualization authoring environment, installing a new version of the visualization authoring environment, stopping the execution of the visualization authoring environment, restarting the execution of the visualization authoring environment, writing or modifying computer readable instructions for the visualization authoring environment.

(4) Optionally Incorporate New Element into Visualization Project.

Once one or more new elements have been added to a visualization authoring environment or instance of a visualization authoring environment, the operator thereof may optionally incorporate one or more of such new elements into a visualization project. A visualization project refers to the information stored in computer readable media or computer memory that contains information specific to the prospective application being visualized using the visualization authoring environment and optionally a corresponding visualization rendering environment, as well as optionally additional information. Visualization project also refers to the graphical representation of such prospective application and additional information in a graphical user interface either as part of a visualization authoring environment or a visualization rendering environment. In the present embodiment, custom widgets are incorporated into visualization projects using one of several techniques provided by a visualization authoring environment including using a mouse to click on a representation (for example the a small icon image described in (1f)) of the custom widget, dragging such representation into the graphical user interface area that represents the visualization project and releasing the mouse button. Advantageously, in the present embodiment, incorporation of custom widgets into a visualization project does not require the user of the visualization authoring environment to write computer code. In the present embodiment, several additional activities take place as result of this action, including optionally:

a) The visualization authoring environment determines if the custom widget had already been incorporated into the visualization project, and if not, copy the information in the files that correspond to the custom widget into the project. In the present embodiment determination of if a custom widget has already been incorporated into visualization project is accomplished by searching the visualization project (using techniques common in the state of the art) for a portion of or all of the ID established as described in 1a above. Optionally, the visualization authoring environment may further determine, using similar techniques, if the version designation optionally included in the compound ID of the previously incorporated custom widget matches the version designation of custom widget being incorporated. If full or partial match for the ID is found, optionally, the visualization authoring environment may present one or more options using a graphical user interface to allow the operator of the visualization authoring environment to choose optional processing to occur.

b) The visualization authoring environment inserts an instance of the custom widget in the visualization project at the location received by the visualization authoring environment from the operator, for example, based on the location of the cursor upon release of the mouse button. Based on information that may be included in the files described in 1, such instance may be configured with a list of custom widget properties, default values and other information specific to the particular instance of the custom widget. In addition to the instance of the custom widget, the visualization authoring environment configures such instance and optionally adds additional data to the visualization project, based on if the ID was found in the visualization project, optionally the operator's choice received by the visualization authoring environment and optionally other factors.

For example, if the ID was found in the visualization project and such ID contained a matching version designation, no addition processing is performed.

As a further example, if the ID was not found, the various files described in 1 above are replicated and stored in the visualization project (e.g., encapsulated), and optionally, a reference is created from the newly added instance to the replicated files. In the present embodiment a storage structure is used that contains a header allowing the visualization authoring environment to ensure the data contained in the various files described in 1 above is valid by verifying the header, and allows the visualization authoring environment to ensure the data format used in the various files described in 1 is supported by the visualization authoring environment, at least in part by evaluating an integer representing the iBloc data version in the storage structure.

As a further example, if the ID was found but contained a different version designation, based in least at part on the choice received by the visualization authoring environment in (b) above, the various files described in (1) above replicated and stored in the visualization project, and optionally, a reference is created from the newly added instance to the replicated files.

As a further example, if the ID was found but contained a different version designation, based in least at part on the choice received by the visualization authoring environment in (b) above the visualization authoring environment replaces data associated with the existing custom widget with the information in the various files described in (1).

The forgoing processing facilitates the transfer of visualization projects containing custom widgets among visualization platforms and between the users thereof. Because the information necessary for displaying and defining the behavior of a custom widget can be incorporated into the visualization project, it is not necessary for operators of the visualization platform to separately incorporate such information into their instances of the visualization platform by, for example, installing a new version of a visualization platform component or incorporating the custom widget into their visualization authoring environment as described in (3).

Figure 15B:
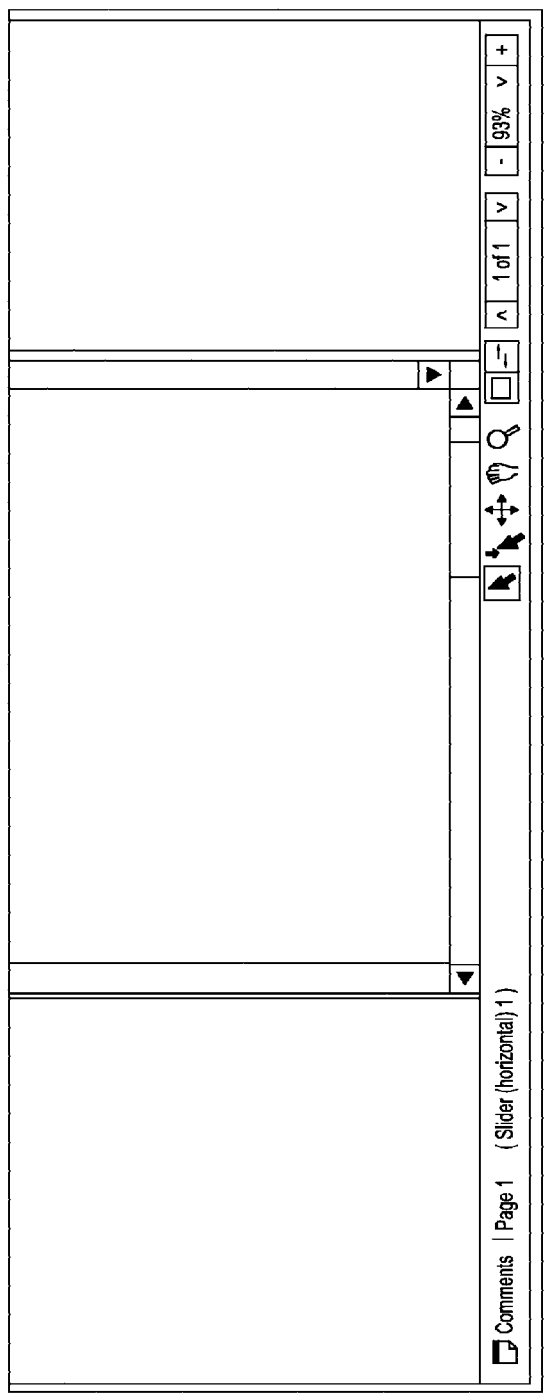
Figure 15:
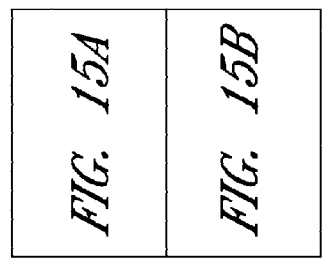
Figure 15A:
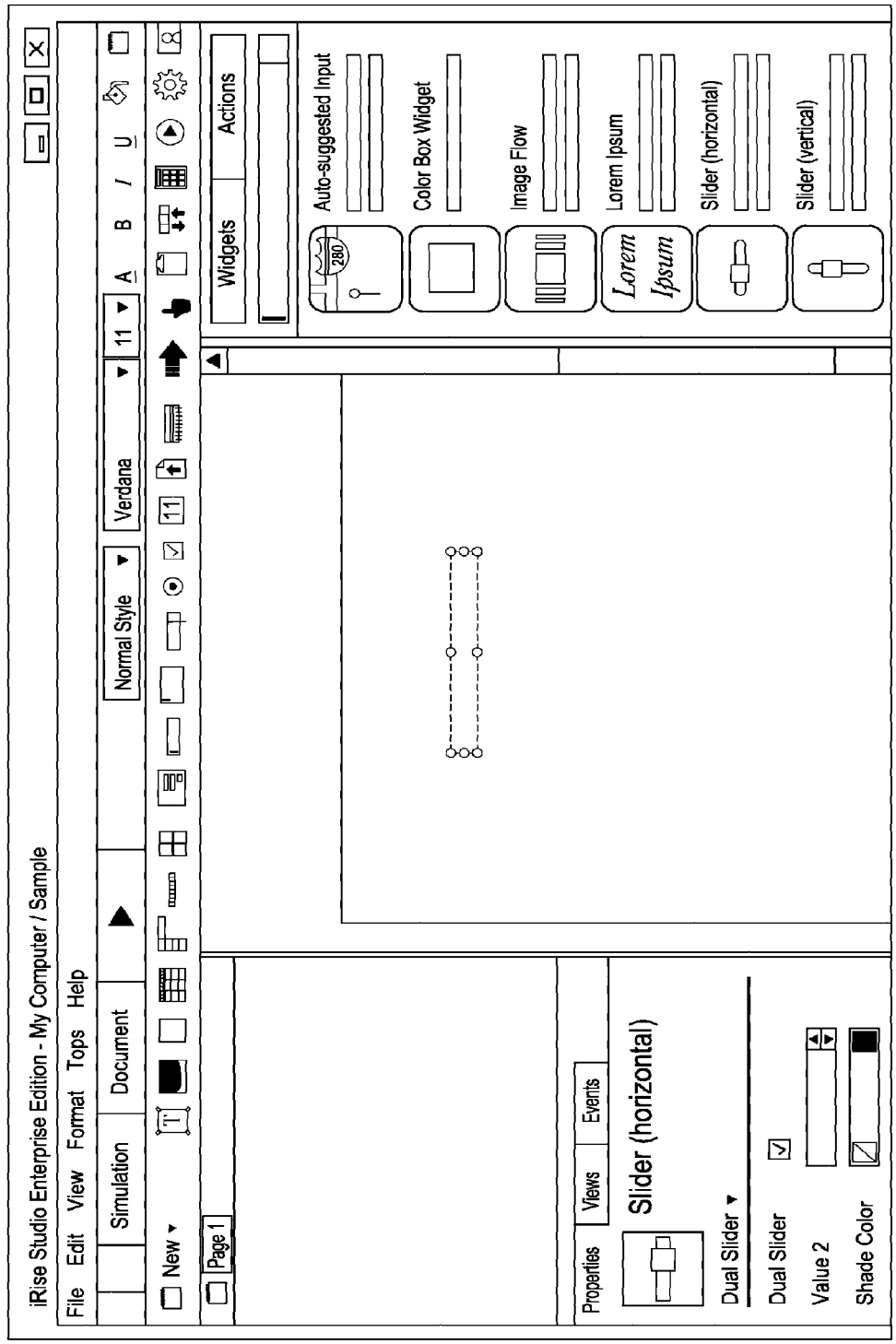

In the present embodiment, the header can be further described as a 15 byte header broken down into a 11 byte file marker (other size headers and markers may be used): "iRise iBloc" and a 4 byte integer representing the iBloc data format version. Additional data is stored as a zip stream containing the ibloc.xml and optionally all resources, with the entries are stored as:namespace/name/version/<resource> where <resource> represents the relative path to the resource. In the present embodiment, iBlocs are stored in DOD at the project level as one Nnde representing the iBloc definition with one Binary Node (Blob) containing the ibloc.xml and one Binary Node (Blob) for each resource.

c) The display of the graphical user interface of the visualization authoring environment is updated to show the inclusion of the custom widget. In the present embodiment, this is accomplished by displaying one or more of the images associated with the custom widget as described in (1f) and one or more of the properties of the custom widget. By way of example, the FIG. 15 depicts a custom action named "Slider (horizontal)" in the display of the graphical user interface of a visualization authoring environment.

In a different embodiment, corresponding to the different embodiment described in (1f), updating the display of the graphical user interface of the visualization authoring environment could be accomplished by executing the instructions stored as, for example Java2D or SVG instructions.

Once the information from the files representing the custom widget are incorporated into the visualization project they become part of the visualization project and are therefore transported with it. For example, visualization authoring environments (which are generally used to create, edit and modify visualization projects), as well as visualization rendering environments (which are generally used to render visualization projects), typically have one or more facilities for transfer of visualization projects between environments, instances of environments, computer hardware systems or individual operators. Including the information needed to define and realize the visual appearance and behavior of the custom widget into the visualization project obviates the need to independently transfer this information between such environments, systems, or operators. For example, one operator of a visualization authoring environment may utilize several custom widgets in a particular visualization project and wish to share his or her work with a college, who is operating another instance of a visualization authoring environment. By simply utilizing the typical features of a visualization authoring environment to transfer a visualization project from the first operator to the second operator, the second operator's can utilize one or more features of the custom widget without having to separately incorporate the custom widget into their instance of the visualization authoring environment. In a different embodiment, the information from the files representing the custom widget may not be incorporated, or may only be partially incorporated, into the visualization project requiring that the second operator identify the missing information or custom widget and incorporate it into their visualization authoring environment through an activity analogous to (3) Adding a custom widget.

(5) Optionally Adjust One or More of the Placement, Orientation, Configuration, Properties or Connections to (or From) the New Element.

Custom widgets that have been incorporated into a visualization project may optionally be further repeatedly adjusted to change their placement, orientation, configuration and properties. Further, custom widgets that have been incorporated into a visualization project may optionally be connected to or from other widgets, actions or events (or custom widgets, actions and events). These adjustments and connections enable the visual appearance and behavior of the specific instance of the custom widget to be modified. Because they are applied to the specific instance of the custom widget, the information discussed in activities (1a) through (1j) are not changed and the visual appearance and behavior of other instances of the custom widget (in the same or different visualization projects) are not modified.

In the present embodiment, the adjustments and connections are accomplished using various features and functions of a visualization authoring environment also applicable to widgets, actions and events that may not be custom widgets, custom actions or custom events.

Figures 16, 16B:
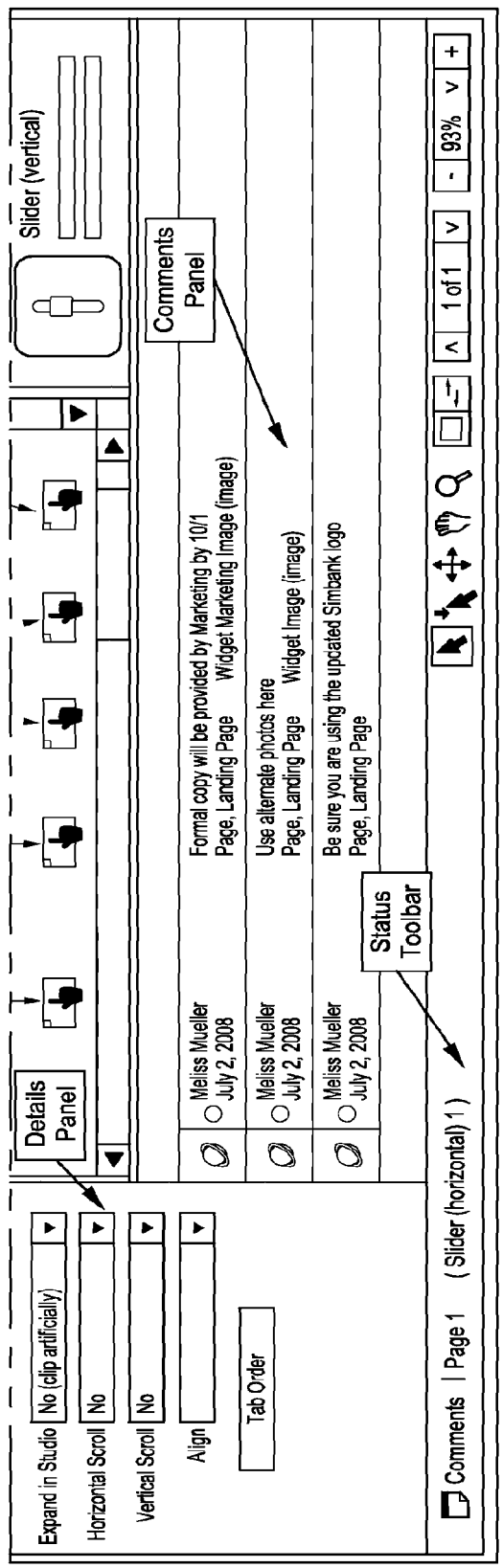
Figure 16A:
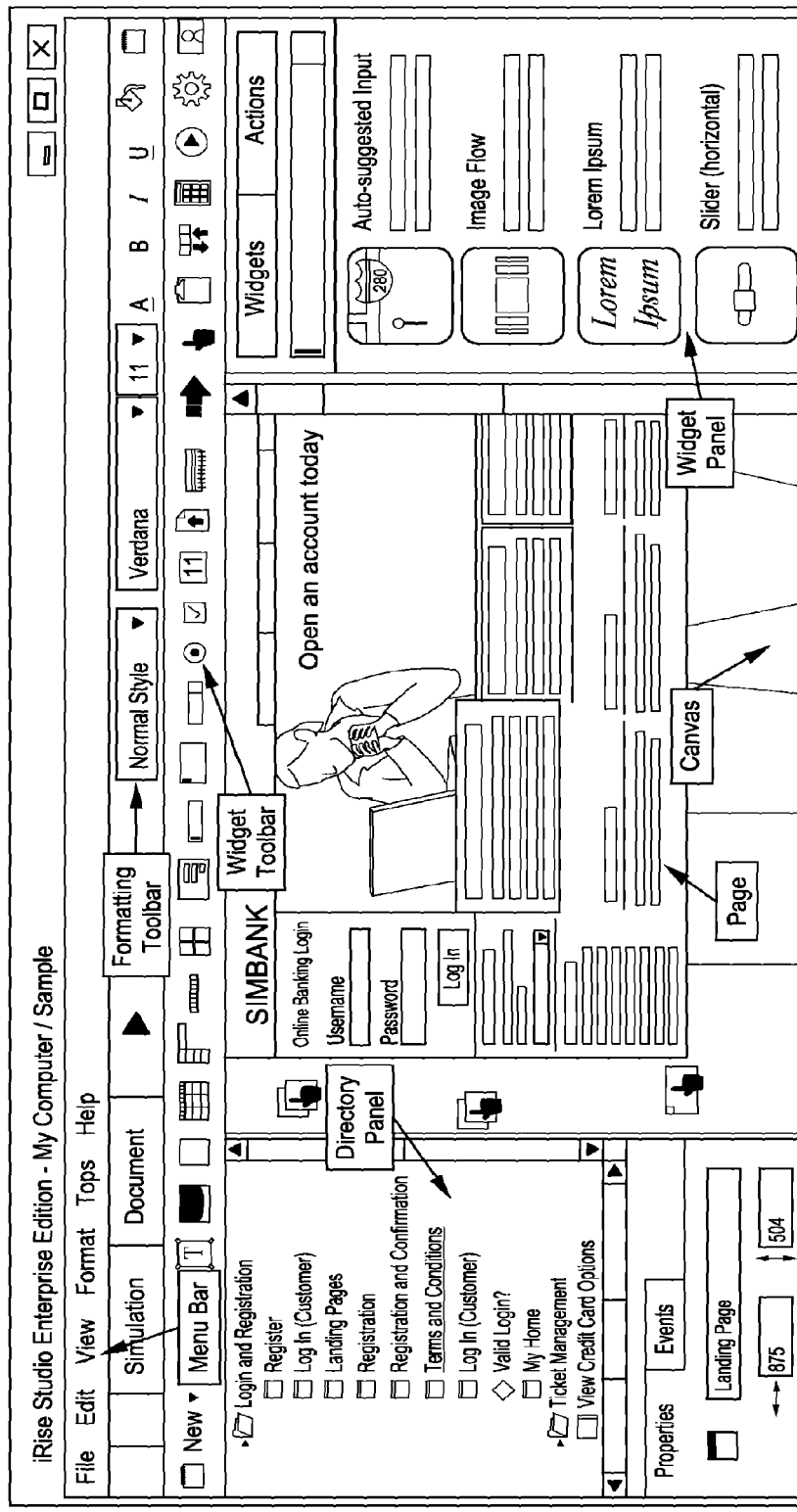

FIG. 16 depicts an example embodiment of a visualization authoring environment. In this embodiment the widget toolbar contains native widgets and the widget panel contains custom widgets.

For example, in a visualization authoring environment, a user may select a widget, drag the widget, and drop the widget in a different location in the design area (which may also be referred to canvas or page) of a visualization authoring environment (by way of mouse movements or similar gestures), in order to accomplish adjustment of the widgets' placement.

As an additional example, in a visualization authoring environment, a user may select a widget, drag the widget, and drop the widget on top of another widget (by way of mouse movements or similar gestures), in order to accomplish connecting the widget or from other widgets, actions or events.

As an additional example the properties of a widget may be manipulated by providing inputs (by way of mouse movement or keyboard inputs) to a details panel, or other graphical user interface facilities, in order to modify the properties or attributes of a widget.

The adjustments and connections described herein and provided in these examples, and or the results thereof, may be stored by the visualization authoring environment into temporary computer memory or stored in other computer readable media.

It should be noted that, in the present embodiment, custom widgets can be utilized in visualization projects in the same way that native widgets can be used. For example, custom widgets can be connected to custom or native actions in the same manner as native widgets are connected to native actions of a visualization authoring environment and exhibit the same behavior in a visualization rendering environment.

Further, in the present embodiment, appropriately configured custom widgets may be used in ways advantageous over native widgets. For example, in the present embodiment, custom widgets can be configured to accept multiple connections corresponding to dataflow into the custom widget and out of the custom widget. In either case, the creator of the custom widget or the operator of the visualization authoring environment may specify which properties to flow out of the custom widget as well as which properties to populate with dataflow input values. Further, in the case of dataflow connected from a custom widget, one or more properties can flow out to one or more dataflow destinations. Thus one property can be flowed out to multiple widgets and multiple properties can be flowed out to multiple widgets. When connecting dataflow in, one input value can be flowed in to multiple properties. Multiple input values can also be flowed into multiple properties.

Further, in the present embedment, dataflow enables custom widgets to participate in visualization data persistence by storing and retrieving values from a datasheet, which may also be may be stored by the visualization authoring environment into temporary computer memory or stored in other computer readable media.

(6) Optionally Render Visualization Project.

Further, the process may optionally continue with an additional step wherein the visualization of the prospective software application that includes the new element is rendered or otherwise interacted with. For example, a visualization rendering environment may read visualization repository information containing a custom widget (for example a movie player) and display on a computer screen an interactive representation of the custom widget in order to solicit feedback from potential users of the prospective application on the placement, appearance or behavior of a movie player. Further, the potential users may operate, through the use of mouse movements or keyboard inputs, various custom actions (e.g., play, stop, fast forward) associated with the custom widget. As an additional example, a visualization platform may be extended to accept feedback on the placement, appearance or behavior of other elements utilizing recording of speech and storage of a corresponding sound file to the visualization repository or other method of storing computer files.

In the present embodiment, a visualization rendering environment is configured to generate a interactive representation containing custom widgets, custom actions, or custom events by optionally performing one or more of the following activities:

A component of the visualization rendering environment navigates the visualization repository and/or the visualization project to produce a list of custom widgets and custom actions.

For each custom widget or custom action a component the visualization rendering environment records a list of any external references (e.g., JavaScript libraries, CSS files) for that widget or action.

For each custom widget or custom action a component of the visualization rendering environment records any JavaScript associated with that widget or action.

A component of the visualization rendering environment writes the list of external references to an HTML header to facilitate downloading by a web browser or similar component.

A component of the visualization rendering environment navigates the visualization repository for the appropriate page or other element to be displayed by the visualization rendering environment For each custom widget or custom action a component of the visualization rendering environment creates an HTML div or similar component and outputs the HTML code that is contained in the appropriate custom widget files For each custom widget or custom action a component of the visualization rendering environment writes out the JavaScript associated with custom widgets and custom actions.

In the present embodiment, the following is a representation of an the iBloc Schema.

```xml
<?xml version="1.0" encoding="UTF-8"?>
<xs:schema targetNamespace="http://www.irise.com/schema/ibloc"
    xmlns="http://www.irise.com/schema/ibloc"
    xmlns:xs="http://www.w3.org/2001/XMLSchema"
    xmlns:xmime="http://www.w3.org/2005/05/xmlmime"
    elementFormDefault="qualified"
    version="1.0">
 <xs:element name="ibloc" type="iblocType"/>
 <xs:simpleType name="restrictedIblocType">
  <xs:annotation>
   <xs:documentation>
     Restricts the descriptor type attribute to either a widget or an action
   </xs:documentation>
  </xs:annotation>
  <xs:restriction base="xs:string">
   <xs:enumeration value="widget"/>
   <xs:enumeration value="action"/>
  </xs:restriction>
 </xs:simpleType>
 <xs:group name="jsFunctionGroup">
  <xs:annotation>
   <xs:documentation>
     Javascript function element aggreggate for use in a choice element.   (either one jsVariable element or both js function (getter/setter) elements must be present.)
   </xs:documentation>
  </xs:annotation>
  <xs:sequence>
   <xs:element name="jsGetFunctionName" type="xs:string"/>
   <xs:element name="jsSetFunctionName" type="xs:string"/>
  </xs:sequence>
 </xs:group>
 <xs:complexType name="validatorAggregateType">
  <xs:annotation>
   <xs:documentation>
    Defines an aggregate validator element.
   </xs:documentation>
  </xs:annotation>
  <xs:sequence>
   <xs:choice minOccurs="0" maxOccurs="unbounded">
    <xs:element name="enumeration" type="enumerationValidatorType"/>
    <xs:element name="isNull" type="nullValidatorType"/>
    <xs:element name="notNull" type="notNullValidatorType"/>
    <xs:element name="range" type="rangeValidatorType"/>
    <xs:element name="length" type="lengthValidatorType"/>
    <xs:element name="isDate" type="dateValidatorType"/>
    <xs:element name="isNumeric" type="numericValidatorType"/>
   </xs:choice>
  </xs:sequence>
 </xs:complexType>
 <xs:complexType name="editorContextType">
  <xs:annotation>
   <xs:documentation>
     Defines the editor element that allows for a name attribute and a list of property elements.
   </xs:documentation>
  </xs:annotation>
  <xs:sequence>
   <xs:element name="property" type="editorPropertyType" minOccurs="0" maxOccurs="unbounded"/>
  </xs:sequence>
  <xs:attribute name="name" type="xs:string" use="required"/>
  <xs:attribute name="multiValue" type="xs:boolean" default="false"/>
  <xs:attribute name="minEditorCount" type="xs:integer" default="1"/>
  <xs:attribute name="maxEditorCount" type="xs:integer" default="0"/>
 </xs:complexType>
```

-continued

```
<xs:complexType name="editorPropertyType">
 <xs:annotation>
  <xs:documentation>
   Defines a property element. A property has a name and either a single value or multi value.
  </xs:documentation>
 </xs:annotation>
 <xs:sequence>
  <xs:choice>
   <xs:element name="values" type="defaultMultiValueType"/>
  </xs:choice>
 </xs:sequence>
 <xs:attribute name="name" type="xs:string" use="required"/>
</xs:complexType>
<xs:complexType name="enumerationValidatorType">
 <xs:annotation>
  <xs:documentation>
   A validator that validates a value is equal to one of the values in the defined enumeration.
  </xs:documentation>
 </xs:annotation>
 <xs:sequence>
  <xs:element name="description" type="xs:string" minOccurs="0"/>
  <xs:choice>
   <xs:element name="string" type="xs:string" minOccurs="0" maxOccurs="unbounded"/>
   <xs:element name="integer" type="xs:integer" minOccurs="0" maxOccurs="unbounded"/>
   <xs:element name="boolean" type="xs:boolean" minOccurs="0" maxOccurs="unbounded"/>
  </xs:choice>
 </xs:sequence>
</xs:complexType>
<xs:complexType name="defaultMultiValueType">
 <xs:annotation>
  <xs:documentation>
   Represents a default value.
  </xs:documentation>
 </xs:annotation>
 <xs:choice>
  <xs:element name="string" type="xs:string" minOccurs="0" maxOccurs="unbounded"/>
  <xs:element name="integer" type="xs:integer" minOccurs="0" maxOccurs="unbounded"/>
  <xs:element name="boolean" type="xs:boolean" minOccurs="0" maxOccurs="unbounded"/>
 </xs:choice>
</xs:complexType>
<xs:complexType name="baseValidatorType">
 <xs:annotation>
  <xs:documentation>
   Base validator type extended by all validators.
  </xs:documentation>
 </xs:annotation>
 <xs:sequence>
  <xs:element name="description" type="xs:string" minOccurs="0"/>
 </xs:sequence>
</xs:complexType>
<xs:complexType name="rangeValidatorType">
 <xs:annotation>
  <xs:documentation>
   A validator that validates a value lies within the defined minimum and maximum range.
  </xs:documentation>
 </xs:annotation>
 <xs:complexContent>
  <xs:extension base="baseValidatorType">
   <xs:attribute name="min" type="xs:double" use="required"/>
   <xs:attribute name="max" type="xs:double" use="required"/>
  </xs:extension>
 </xs:complexContent>
</xs:complexType>
<xs:complexType name="lengthValidatorType">
 <xs:annotation>
  <xs:documentation>
   A validator that validates the length of a string value.
  </xs:documentation>
 </xs:annotation>
 <xs:complexContent>
  <xs:extension base="baseValidatorType">
   <xs:attribute name="min" type="xs:integer" use="required"/>
```

```
      <xs:attribute name="max" type="xs:integer" use="required"/>
    </xs:extension>
  </xs:complexContent>
</xs:complexType>
<xs:complexType name="nullValidatorType">
  <xs:annotation>
    <xs:documentation>
      A validator that validates a value is null.
    </xs:documentation>
  </xs:annotation>
  <xs:complexContent>
    <xs:extension base="baseValidatorType"/>
  </xs:complexContent>
</xs:complexType>
<xs:complexType name="notNullValidatorType">
  <xs:annotation>
    <xs:documentation>
      A validator that validates a value is not null.
    </xs:documentation>
  </xs:annotation>
  <xs:complexContent>
    <xs:extension base="baseValidatorType"/>
  </xs:complexContent>
</xs:complexType>
<xs:complexType name="dateValidatorType">
  <xs:annotation>
    <xs:documentation>
      A validator that validates a value represents a date.
    </xs:documentation>
  </xs:annotation>
  <xs:complexContent>
    <xs:extension base="baseValidatorType"/>
  </xs:complexContent>
</xs:complexType>
<xs:complexType name="numericValidatorType">
  <xs:annotation>
    <xs:documentation>
      A validator that validates a value represents a numeric value.
    </xs:documentation>
  </xs:annotation>
  <xs:complexContent>
    <xs:extension base="baseValidatorType"/>
  </xs:complexContent>
</xs:complexType>
<xs:complexType name="descriptorBaseType">
  <xs:annotation>
    <xs:documentation>
      The base element type that all descriptors inherit from. All descriptors have an internal
name, and optionally
      a display name, and description.
    </xs:documentation>
  </xs:annotation>
  <xs:sequence>
    <xs:element name="displayName" type="xs:string" minOccurs="0"/>
    <xs:element name="description" type="xs:string" minOccurs="0"/>
  </xs:sequence>
  <xs:attribute name="name" type="xs:string" use="required"/>
</xs:complexType>
<xs:complexType name="iblocType">
  <xs:annotation>
    <xs:documentation>
```

The root element that defines a custom widget. A widget is uniquely identified by its namespace, name, and version.

The preview image is the image that will represent the widget in studio during modeling.

```
    </xs:documentation>
  </xs:annotation>
  <xs:complexContent>
    <xs:extension base="descriptorBaseType">
      <xs:sequence>
        <xs:element name="canvasImage" type="xs:string" minOccurs="0"/>
        <xs:element name="iconImage" type="xs:string" minOccurs="0"/>
        <xs:element name="defaultWidth" type="xs:integer" minOccurs="0"/>
        <xs:element name="defaultHeight" type="xs:integer" minOccurs="0"/>
        <xs:element name="intrinsicProperty" type="xs:string" minOccurs="0"/>
        <xs:element name="authorUrl" type="xs:string" minOccurs="0"/>
```

-continued

```
      <xs:element name="properties" minOccurs="0">
        <xs:complexType>
          <xs:sequence>
            <xs:element name="property" type="propertyType" minOccurs="0" maxOccurs="unbounded"/>
          </xs:sequence>
        </xs:complexType>
      </xs:element>
      <xs:element name="events" minOccurs="0">
        <xs:complexType>
          <xs:sequence>
            <xs:element name="event" type="eventType" minOccurs="0" maxOccurs="unbounded"/>
          </xs:sequence>
        </xs:complexType>
      </xs:element>
      <xs:element name="layouts" minOccurs="0">
        <xs:complexType>
          <xs:sequence>
            <xs:element name="layout" type="layoutType" minOccurs="0" maxOccurs="unbounded"/>
          </xs:sequence>
        </xs:complexType>
      </xs:element>
      <xs:element name="preload" minOccurs="0">
        <xs:complexType>
          <xs:sequence>
            <xs:element name="scripts" minOccurs="0">
              <xs:complexType>
                <xs:sequence>
                  <xs:element name="script" type="uriType" minOccurs="0" maxOccurs="unbounded"/>
                </xs:sequence>
              </xs:complexType>
            </xs:element>
            <xs:element name="stylesheets" minOccurs="0">
              <xs:complexType>
                <xs:sequence>
                  <xs:element name="stylesheet" type="uriType" minOccurs="0" maxOccurs="unbounded"/>
                </xs:sequence>
              </xs:complexType>
            </xs:element>
          </xs:sequence>
        </xs:complexType>
      </xs:element>
      <xs:element name="content" type="xs:string" minOccurs="0"/>
    </xs:sequence>
    <xs:attribute name="type" type="restrictedIblocType" default="widget"/>
    <xs:attribute name="namespace" type="xs:string" use="required"/>
    <xs:attribute name="version" type="xs:string" use="required"/>
    <xs:attribute name="productVersion" type="xs:string" use="required"/>
  </xs:extension>
 </xs:complexContent>
</xs:complexType>
<xs:complexType name="propertyType">
 <xs:annotation>
  <xs:documentation>
```

This element defines a typed property to be exposed by the custom widget.

```
  </xs:documentation>
 </xs:annotation>
 <xs:complexContent>
  <xs:extension base="descriptorBaseType">
   <xs:sequence>
    <xs:choice minOccurs="0">
     <xs:element name="jsVariableName" type="xs:string"/>
     <xs:group ref="jsFunctionGroup"/>
    </xs:choice>
    <xs:element name="editor" type="editorContextType" minOccurs="0"/>
    <xs:element name="defaultValue" type="defaultMultiValueType" minOccurs="0"/>
    <xs:element name="validators" type="validatorAggregateType" minOccurs="0"/>
   </xs:sequence>
   <xs:attribute name="editable" type="xs:boolean" default="true"/>
   <xs:attribute name="required" type="xs:boolean" default="false"/>
  </xs:extension>
 </xs:complexContent>
</xs:complexType>
<xs:complexType name="eventType">
 <xs:annotation>
  <xs:documentation>
   This element defines an event that can be fired by the custom widget.
  </xs:documentation>
 </xs:annotation>
 <xs:complexContent>
  <xs:extension base="descriptorBaseType">
   <xs:sequence>
    <xs:element name="parameters" minOccurs="0">
     <xs:complexType>
      <xs:sequence>
       <xs:element name="parameter" type="parameterType" minOccurs="0" maxOccurs="unbounded"/>
      </xs:sequence>
     </xs:complexType>
    </xs:element>
   </xs:sequence>
  </xs:extension>
 </xs:complexContent>
</xs:complexType>
<xs:complexType name="parameterType">
 <xs:annotation>
  <xs:documentation>
```

This element defines a parameter that can be executed by the custom widget.

```
  </xs:documentation>
 </xs:annotation>
 <xs:complexContent>
  <xs:extension base="descriptorBaseType">
   <xs:attribute name="required" type="xs:boolean" default="false"/>
   <xs:attribute name="type" type="xs:string" default="string"/>
  </xs:extension>
 </xs:complexContent>
</xs:complexType>
<xs:complexType name="layoutType">
 <xs:annotation>
  <xs:documentation>
```

This element defines a specific layout for properties that can hint UI implementations on ordering and grouping. The list of property names also acts as a filtering mechanism. Omit the property name list to show all properties in alphabetical order.

```
  </xs:documentation>
 </xs:annotation>
 <xs:sequence>
  <xs:element name="displayName" minOccurs="0" type="xs:string"/>
  <xs:element name="description" minOccurs="0" type="xs:string"/>
  <xs:element name="propertyNames" minOccurs="0">
```

-continued

```
   <xs:complexType>
    <xs:sequence>
     <xs:element name="propertyName" type="xs:string" minOccurs="0" maxOccurs="unbounded"/>
    </xs:sequence>
   </xs:complexType>
  </xs:element>
 </xs:sequence>
 <xs:attribute name="name" type="xs:string" use="required"/>
</xs:complexType>
<xs:complexType name="uriType">
 <xs:annotation>
  <xs:documentation>
   This type will be used for the elements that needs to define the src attribute.
  </xs:documentation>
 </xs:annotation>
 <xs:attribute name="src" type="xs:string" use="required"/>
</xs:complexType>
</xs:schema>
```

The following is a representation of examples of JavaScript APIs in the present embodiment.

Class irise.AbstractExtension Defined in: AbstractExtension.js.

irise.AbstractExtension(properties) Provides base functionality for extensions.

getClassName( ) Get the fully qualified class name used to instantiate the extension.

getId( ) Get the unique HTML element id for this widget.
getName( ) Get the name of this extension.
getNamespace( ) Get the name space of this extension.
getProperty(key) Get an extension property.
getPropertyKeys( ) Get the property keys for this extension.
getSelector( ) Get the Extension selector e.g.
getType( ) Get the type of this Extension.
getVersion( ) Get the version of this extension.
rewriteURL(resourcePath)Return the URL for a extension resource file e.g.
setProperty(key, value) Set an extension property.
irise.AbstractExtension(properties)
Example usage:
var extension=new irise.AbstractExtension(○);
var sampleWidget=function SampleWidget( ){ };
irise.extend(sampleWidget, extension);
Parameters: {object} properties A JSON object containing the extension's immutable properties.
Required fields: namespace, name, properties
Optional fields: $
Method Details:
{string} getClassName( ) Get the fully qualified class name used to instantiate the extension. Returns: {string} The fully qualified class name used to instantiate the extension.
{string} getId( ) Get the unique HTML element id for this widget. Returns: {string} The unique HTML element id of this widget.
{string} getName( ) Get the name of this extension. Returns: {string} The name of this extension.
{string} getNamespace( ) Get the name space of this extension. Returns:{string} The name space of this extension.
{object} getProperty(key) Get an extension property. Parameters: key Returns:{object} The value of the extension's property.
{array} getPropertyKeys( ) Get the property keys for this extension. Returns: {array} The extension's property keys.
{string} getSelector( ) Get the Extension selector e.g. class='com-irise-ColorBox'. Note this is not unique for each instance, but for a Widget class. Returns: {string} The Extension's selector.
{string} getType( ) Get the type of this Extension. Returns: {string} The type of this extension.
{string} getVersion( ) Get the version of this extension. Returns: {string} The version of this extension.
rewriteURL(resourcePath) Return the URL for a extension resource file e.g. my.html, data/my.xml, images/default/my.png. Parameters: {string} resourcePath The name or partial path of the resource e.g. data/box.xml.
setProperty(key, value) Set an extension property. Parameters: {string} key The key of the property.{string} value The value of the property.
Namespace irise
irise Defined in: irise.js.
irise is the irise global namespace object. If irise is already defined, the existing irise object will not be overwritten so that defined namespaces are preserved.
<static> irise.log(message) Normalized logging; Parameters; {string} message; which is the message to log.
<static> {Object} irise.namespace(arguments) Returns the namespace specified and creates it if it doesn't exist. Parameters: {String*} arguments 1-n namespaces to create Returns: {Object} A reference to the last namespace object created.

Namespace irise.widget.Widget—Provides base functionality for widgets. This constructor is used internally and should not be called.
Example usage:
var widget=new irise.widget.Widget(○);
var sampleWidget=function SampleWidget( ) { };
irise.extend(sampleWidget, widget);
Method Summary
canRelocate( ) Drag and drop function, returns True if the draggable widget can be relocated after being dropped, false if not.
getHasRestrictDropTo( ) Drag and drop function, returns True if the draggable widget has drop target element to which is restricted drop to.
getHeight( ) Get the height of this widget.
getHtmlElement( ) Gets the HTML Element used to create this widget
getLeft( ) Get the left/x coordinate of this widget relative to the simulation panel.
getTop( ) Get the top/y coordinate of this widget relative to the simulation panel.
getWidgetDiv( ) Get the jQuery object for this widget.
getWidth( ) Get the width of this widget.
hasEvent(eventType) Returns true if an event
isDraggable( ) Is the widget draggable.
isDropTarget( ) Returns true if this widget has been instantiated as a drop target for draggable widgets.
isVisible( ) Is the width visible.
send Event(eventType, data) Broadcast an event.
setCanRelocate(isCanRelocate)) Drag and drop function, used to determine if this widget can be relocated when dragged.
setDraggable(isDraggable) Set the widget draggable attribute.
setHasRestrictDropTo(isCanRelocate)) Drag and drop function, used to determine if this widget has drop target element to which is restricted drop to.
setHeight(height) Set the height of this widget.
setLeft(left) Set the left/x coordinate of this widget relative to the simulation panel.
setTop(top) Set the top/y coordinate of this widget relative to the simulation panel.
setVisible(isVisible) Set the widget visibility.
setWidth(width) Set the width of this widget.
subscribeToEvent(eventType, callback) Subscribe to an event.
irise.widget.Widget Provides base functionality for widgets. This constructor is used internally and should not be called.
Example usage:
var widget=new irise.widget.Widget(o);
var sampleWidget=function SampleWidget( ) { };
irise.extend(sampleWidget, widget);
Parameters: {object} properties, A JSON object containing the widget's immutable properties. Required fields: element, group, name, properties. Optional fields: $, visible, draggable.
Method Detail:
canRelocate( ) Drag and drop function, returns True if the draggable widget can be relocated after being dropped, false if not.
getHasRestrictDropTo( ) Drag and drop function, returns True if the draggable widget has drop target element to which is restricted drop to.

{int} getHeight( ) Get the height of this widget. Throws: ExceptionType {attribute} is undefined for widget '{name}'.E xceptionType Widget '{name}' attribute '{attribute}' is non numeric. Returns:{int} The height of this widget.

getHtmlElement( ) Gets the HTML Element used to create this widget

{int} getLeft( ) Get the left/x coordinate of this widget relative to the simulation panel.
Throws:
ExceptionType {attribute} is undefined for widget '{name}'. ExceptionType Widget '{name}' attribute '{attribute}' is non numeric. Returns:{int} The x coordinate of this widget.

{int} getTop( ) Get the top/y coordinate of this widget relative to the simulation panel. Throws:ExceptionType {attribute} is undefined for widget '{name}'. ExceptionType Widget '{name}' attribute '{attribute}' is non numeric.Returns:{int} They coordinate of this widget.

{object} getWidgetDiv( ) Get the jQuery object for this widget. Returns:{object} The jQuery object of this widget.

{int} getWidth( ) Get the width of this widget. Throws: ExceptionType {attribute} is undefined for widget '{name}'.ExceptionType Widget '{name}' attribute '{attribute}' is non numeric. Returns:{int} The width of this widget.

hasEvent(eventType) Returns true if an event (e.g. 'click', 'submit', 'drop', etc) is bound to this widget. Parameters: {string} eventType The name of the event to look up.

{boolean} isDraggable( ) Is the widget draggable. Returns: {boolean} True if the widget is draggable.

isDropTarget( ) Returns true if this widget has been instantiated as a drop target for draggable widgets.

{boolean} isVisible( ) Is the widget visible. Returns: {boolean} True if the widget is visible.

sendEvent(eventType, data) Broadcast an event. Parameters: {string} eventType The event type.{object optional} data The optional data passed to the listener(s).

setCanRelocate(isCanRelocate)) Drag and drop function, used to determine if this widget can be relocated when dragged. Parameters: {boolean} isCanRelocate) True if the draggable widget can be relocated after being dropped, false if not.

setDraggable(isDraggable) Set the widget draggable attribute. Parameters: {boolean} isDraggable True if the widget should be draggable, false if not.

setHasRestrictDropTo(isCanRelocate)) Drag and drop function, used to determine if this widget has drop target element to which is restricted drop to. Parameters: {boolean} isCanRelocate) True if the draggable widget can be relocated after being dropped, false if not.

setHeight(height) Set the height of this widget. Parameters: {int} height The height of this widget.

setLeft(left) Set the left/x coordinate of this widget relative to the simulation panel. Parameters: {int} left The x coordinate of this widget.

setTop(top) Set the top/y coordinate of this widget relative to the simulation panel. Parameters: {int} top The y coordinate of this widget.

setVisible(isVisible) Set the widget visibility. Parameters: {boolean} isVisible True if the widget should be visible, false if not.

setWidth(width) Set the width of this widget. Parameters: {int} width The width of this widget.

subscribeToEvent(eventType, callback) Subscribe to an event. Parameters: {string} eventType The event type.{function} callback The function that will be called when eventType is fired. This function will receive two parameters, the eventType and, optionally, a data object whose contents is determined by the event sender.

In the present embodiment, following is an alternative representation of an iBloc Schema.

The iBloc schema is a specification and validator for an XML description of a custom widget. It describes the namespace, name, and version that uniquely identify the widget as well as the makeup of the widget itself. This includes properties and events as well as presentation layer items such as layouts and images. The root element in the iBloc descriptor is the ibloc element. The following attributes are used in the present embodiment to further describe an ibloc element.

| Name | Type | Required | Description |
|---|---|---|---|
| xmlns | string | Yes | The value must be: http://www.irise.com/schema/ibloc |
| xmlns:xsi | string | No | Defines the xsi namespace. Required if specifying a schema location "http://www.w3.org/2001/XMLSchema-instance" |
| xsl:schemaLocation | string | No | If defined, the value must be the following pair(separated by a space) http://www.irise.com/schema/ibloc http://www.irise.com/schema/ibloc-1.0.xsd. The xmlns:xsi attribute must be specified if specifying the schema location. |
| namespace | string | Yes | The namespace the widget resides in. (ie com.irise) |
| name | string | Yes | The name of the widget. |
| version | string | Yes | The version of the widget. |
| productVersion | string | Yes | The minimum version of iRise this widget is compatible with. iBlocs are currently supported on newer versions of iRise (backward compatible), however, an iBloc built for a newer version of Studio will not work on an older version of Studio. (not forward compatible). The initial version of |

-continued

| Name | Type | Required | Description |
|---|---|---|---|
| type | string | No | Studio that supports iBlocs is 8.5. The type of widget: either "widget" or "action". Default: "widget". |

The following table describes example child elements for an ibloc element in the present embodiment:

| Name | Type | Occurrence | Description |
|---|---|---|---|
| canvasImage | string | 1 time | The canvasImage is used to render the iBloc on the canvas. |
| iconImage | string | 1 time | The iconImage is the iconic representation of the iBloc, used when displaying the iBloc in panels and dialogs. |
| defaultWidth | integer | 0 or 1 | The default width of the widget. If not specified the default is 200. |
| defaultHeight | integer | 0 or 1 | The default height of the widget. If not specified the default is 200. |
| intrinsicProperty | string | 0 or 1 | The internal name of the property to use as the primary property used currently as a default when modeling incoming and outgoing dataflow lines. |
| authorUrl | string | 0 or 1 | A url to the author's site containing useful information or help for this ibloc. |
| properties | collection | 0 or 1 | The collection of property elements that define the set of properties exposed by this widget. |
| events | collection | 0 or 1 | The collection of event elements that define the set of events exposed by this widget. |
| layouts | collection | 0 or 1 | The collection of layout elements that define the different editor layouts shown when modeling this widget. |
| preload | object | 0 or 1 | Can contain a collection of script elements(in a scripts collection) which define the JavaScript files that will be loaded with this ibloc and a collection of stylesheet elements(in a stylesheets collection) that define the css files that will be loaded. Both the script and stylesheet element allow for one attribute src which takes either a URL for external resources, or a relative path for resources bundled with the ibloc. The relative path is /iblocs/<namespace>/<name>/<version>/<path within ibloc/<filename>. |
| content | CData | 0 or 1 | Allows for html to be placed in a CData section that will be included as a child of the iBloc div that is generated during simulation. |

The property element describes a property associated with a widget that can be utilized by a visualization authoring environment or a visualization rendering environment. Each property can describe as set of validators that are used in aggregate to validate a particular value associated with a property.

The following table describes example attributes for a property element in the present embodiment.

| Name | Type | Required | Description |
|---|---|---|---|
| name | string | Yes | The unique internal name of the property. This value will be rendered by UI implementations if the displayName element has been omitted. |
| editable | boolean | No | If set to true, allows the value of this property to be changed. Default: true. |

The following table describes example child elements in the present embodiment.

| Name | Type | Occurrence | Description |
|---|---|---|---|
| displayName | string | 0 or 1 | The display name of the property. The internal name will be used if no display name has been set. |
| description | string | 0 or 1 | The description of this property. |
| editor | element | 0 or 1 | Specifies the editor to use to edit this property as well as an optional set of properties that can be used to initialize the editor. |
| defaultValue | object | 0 or 1 | A default value. Subelements allowed are: <string>, <integer>, or <boolean>. This element can accept 0-n subelements of the same type. |
| validators | collection | 0 or 1 | The collection of validator elements that that will be used in aggregate to validate a value. |

The following table describes additional example elements in the present embodiment that may be associated with and editor element.

| Name | Type | Required | Description |
|---|---|---|---|
| name | string | Yes | The unique internal name of the editor. |
| multiValue | boolean | No | If true, allow for editing multi-values. The lower and upper bound are specified by the minEditorCount and maxEditorCount respectively. If false, these values are ignored. Default: false |
| maxEditorCount | integer | No | The upper bound value for the number of editors to display. This value affects the size of the multi-value property. A value less than 1 allows for an unbounded maximum. Default: 0 |
| minEditorCount | integer | No | The minimum number of editors to display. A value less than 1 is disregarded and a value greater than the maxEditorCount is adjusted to the maxEditorCount(if the maxEditorCount is bounded) Default: 1 |

| Name | Type | Occurrence | Description |
|---|---|---|---|
| property | element | collection | The property element has one attribute: name corresponding to the internal property name. The property has a subelement <values>: which takes 0 or more <string>, <integer>, or <boolean>. The <values> subelement must contain a homogenous set of subelements. |

In the present embodiment, additional information may be provided to locate an editor best suitable to edit the property value. Below is a table of example editors.

| Name | Description |
| --- | --- |
| textInput | A general editor that allows for editing string values in a text field. (This is the default editor.) |
| comboBox | An editable combobox that allows for an enumerated set of values. |
| dropDown | An uneditable combobox that allows for an enumerated set of values. |
| checkBox | A boolean editor that shows a checkbox. |
| textArea | An editor that allows for editing string values with line breaks. |
| colorChooser | An editor that allows for color selection. |
| fileChooser | An editor that allows for file selection. |
| imageChooser | An editor that allows for image selection. |
| widgetChooser | An editor that allows for widget selection. |

The event element describes an event associated with a widget that can be executed by a visualization rendering environment. Events can be further specified in a visualization authoring environment in the same way as standard (native) events are specified.

The following table describes additional example attributes that may be associated with Event elements.

| Name | Type | Required | Description |
| --- | --- | --- | --- |
| name | string | Yes | The unique internal name of the event. This value will be rendered by UI implementations if the displayName element has been omitted. |

The following table describes additional example attributes that may be associated with event elements.

| Name | Type | Occurrence | Description |
| --- | --- | --- | --- |
| displayName | string | 0 or 1 | The display name of the event. The internal name will be used if no display name has been set. |
| description | string | 0 or 1 | The description of this event. |

In the present embodiment, a layout element provides ordering, filtering and optionally other information that may be used by components of a visualization authoring environment (for example, UI property editors) when displaying properties. The following table describes additional example attributes that may be associated with layout elements.

| Name | Type | Required | Description |
| --- | --- | --- | --- |
| name | string | Yes | The unique internal name of the layout. This value will be rendered by UI implementations if the displayName element has been omitted. |

The following table describes additional example attributes that may be associated with layout elements.

| Name | Type | Occurrence | Description |
| --- | --- | --- | --- |
| displayName | string | 0 or 1 | The display name of the layout. The internal name will be used if no display name has been set. |
| description | string | 0 or 1 | The description of this layout. |
| propertyNames | collection | 0 or 1 | The collection of propertyName elements that correspond to the internal property names. If the collection is omitted, all properties will be shown. |

In the present embodiment, Validator elements validate an arbitrary value against some specific criteria. Each validator element can have a description subelement that contains a string description. The following table describes additional example attributes that may be associated with validator elements

| Criteria | Description |
| --- | --- |
| isNull | Validates the value is null |
| notNull | Validates the value is not null |
| enumeration | Validates the value is equal to one of the specified enumerated values. Subelements can be of type <string>, <boolean>, <integer> |

The systems will generally receive user inputs and commands as further described herein and processes these inputs and commands to perform the operations further described herein.

Figure 17:
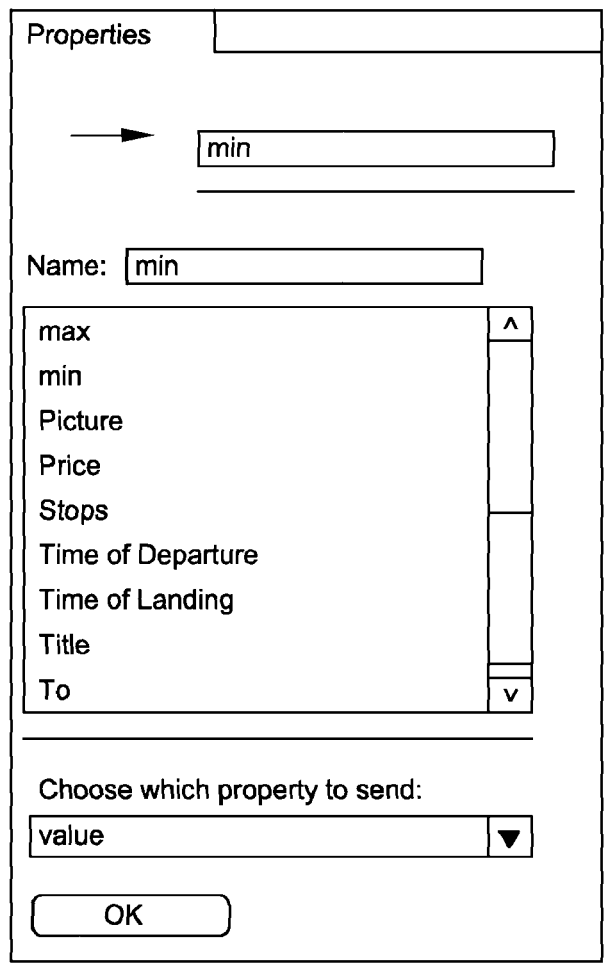
Figures 19, 19A, 19B:
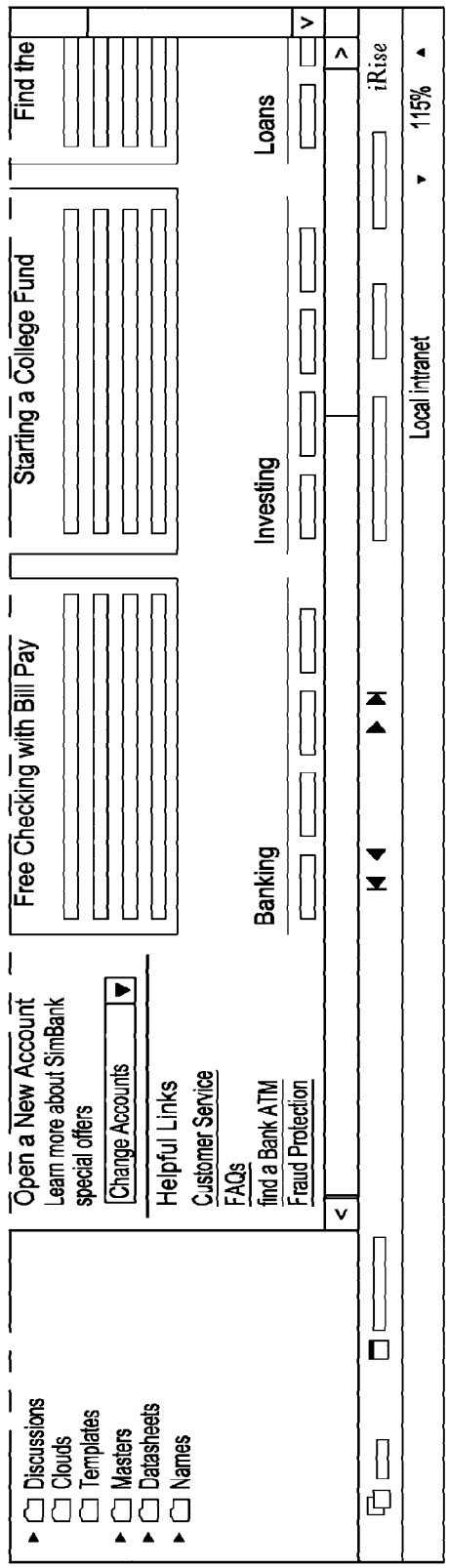
FIGS. 19 (including FIGS. 19A-19B) and 22 depict various example user interface elements of an example visualization authoring environment.
Figure 19A:
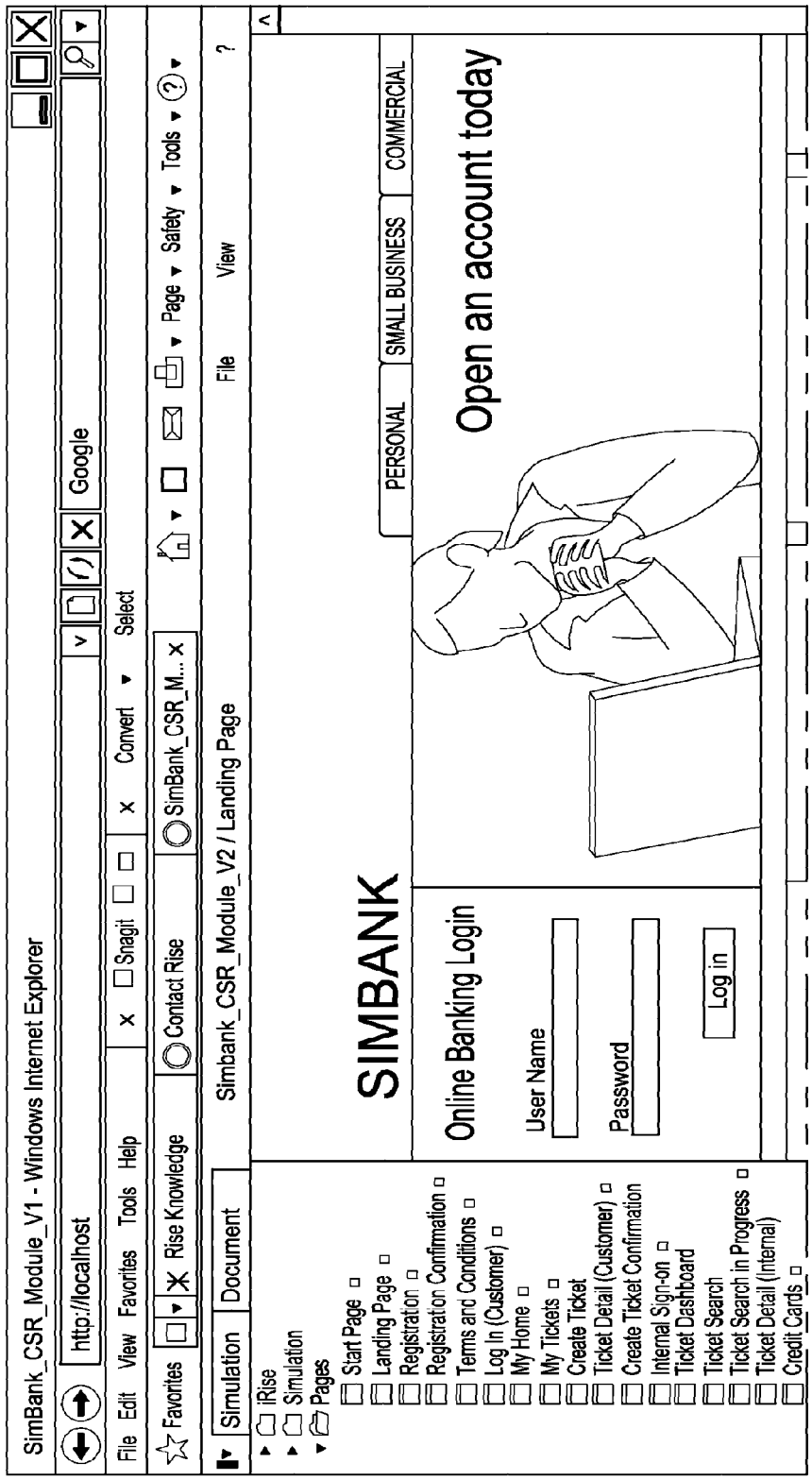
Figure 20:
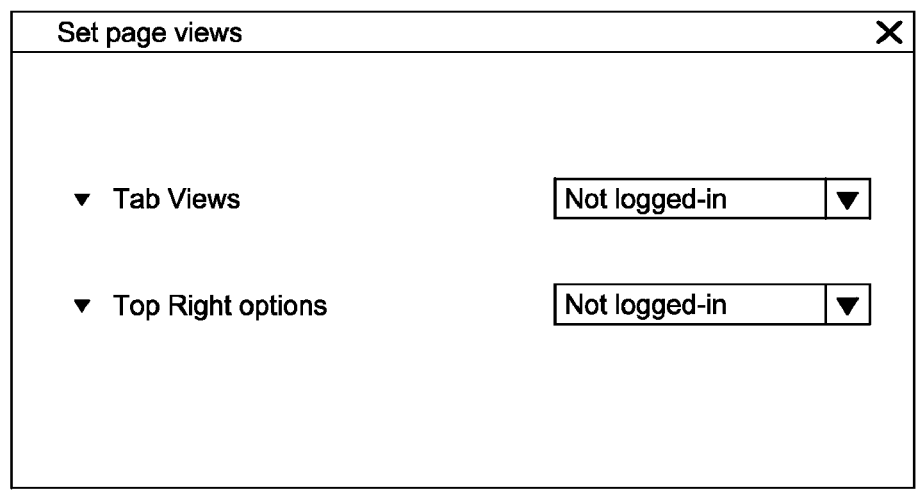
Figure 21:
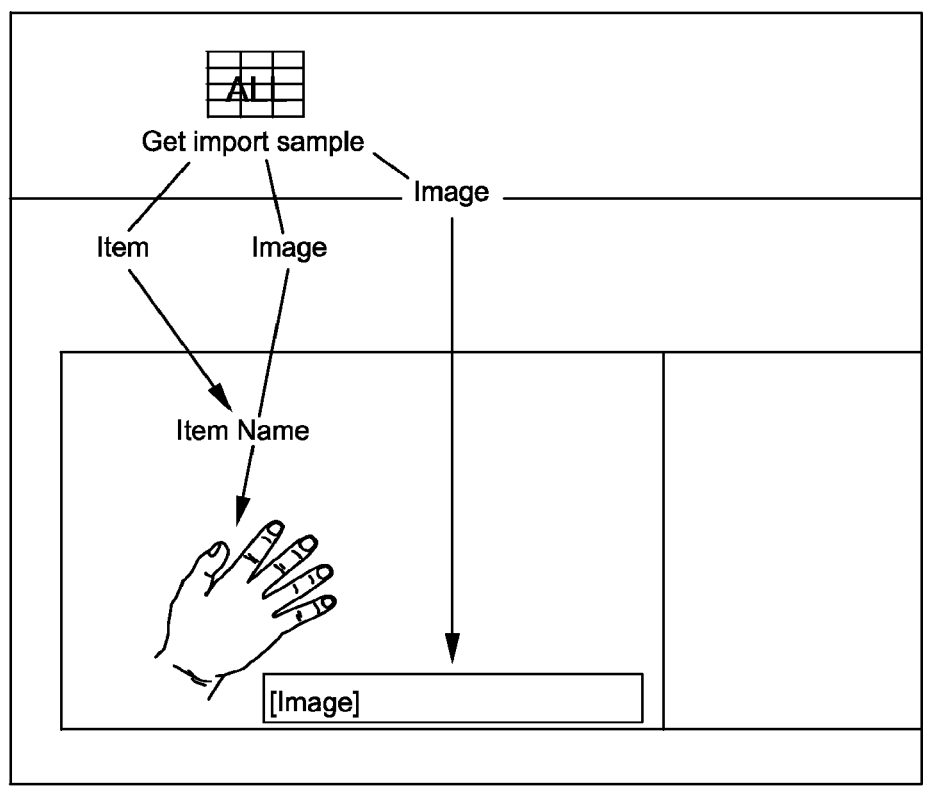
Figure 22:
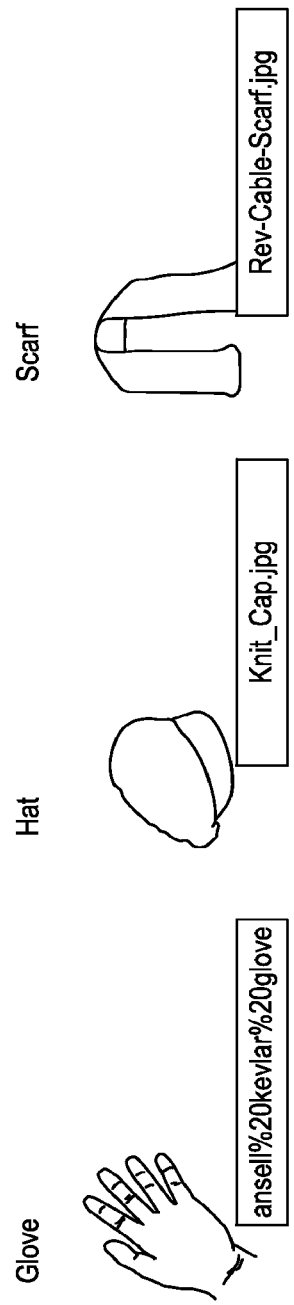
Figure 23:
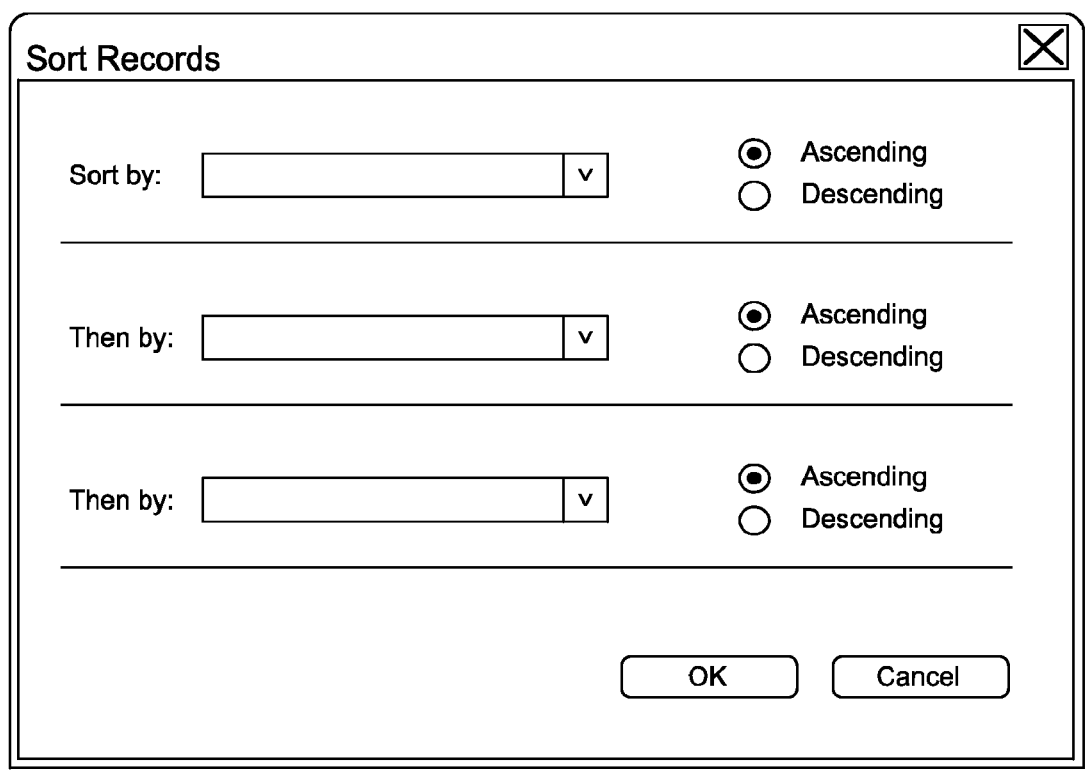
Figure 24:
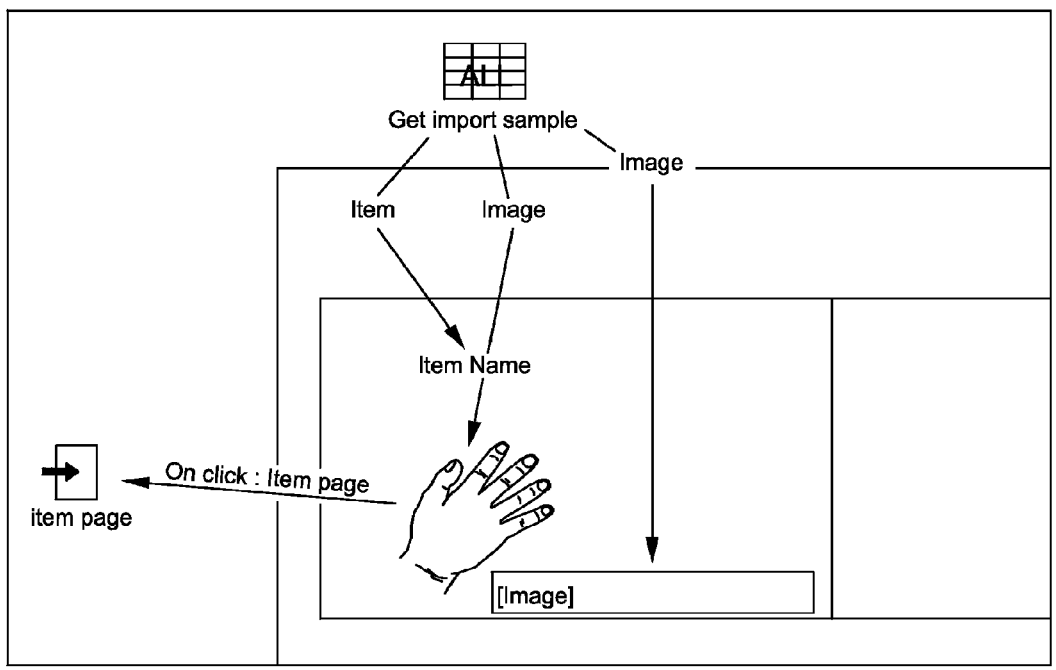

In order to provide for the specification of data flow from a non-native widget to another widget in the present embodiment, the visualization authoring environment monitors the users inputs to determine if a non-native widget has been dragged over another widget and presents a pop-up menu when this input is received. The pop-up menu is configured to allow the user to choose to send data to the second widget. The visualization authoring environment presents a dialog allowing the user to specify a name for the data to be processed by other widgets. The visualization authoring environment presents a user interface element depicted in FIG. 17 based at least in part on the definition of the non-native widget described in (1) and captures from the user one or more of the properties defined for the non-native widget that are associated by the visualization authoring environment to the name for the data to be processed by other widgets.

The following example describes various user inputs to and various processing performed by a visualization authoring environment in the present embodiment. In this example, iTravel corresponds to a prospective software application and/or a visualization project, slider, horizontal slider, dual slider, and price range slider correspond to non-native widgets, set value action, data table, clipboard, submit form, text, text widget, page, set value, standard button, and button correspond to native actions.

On the "Flights" page of the iTravel web site, two slider controls are desired to enable the user of the iTravel web site to filter the results of their search for flights. The first slider should allow the user of the iTravel web site to specify a price range by selecting a minimum and maximum price; the second slider should allow the user of the iTravel web site to set a maximum number of stops, with a range from 0 to 3. A button should be provided that the user of the iTravel web site can click to specify non-stop flights only. As the values of these three data fields (min price, max price, and stops) are changed by the user of the iTravel web site, the table that displays matching flights will dynamically change to reflect the new limitations.

Figure 25:
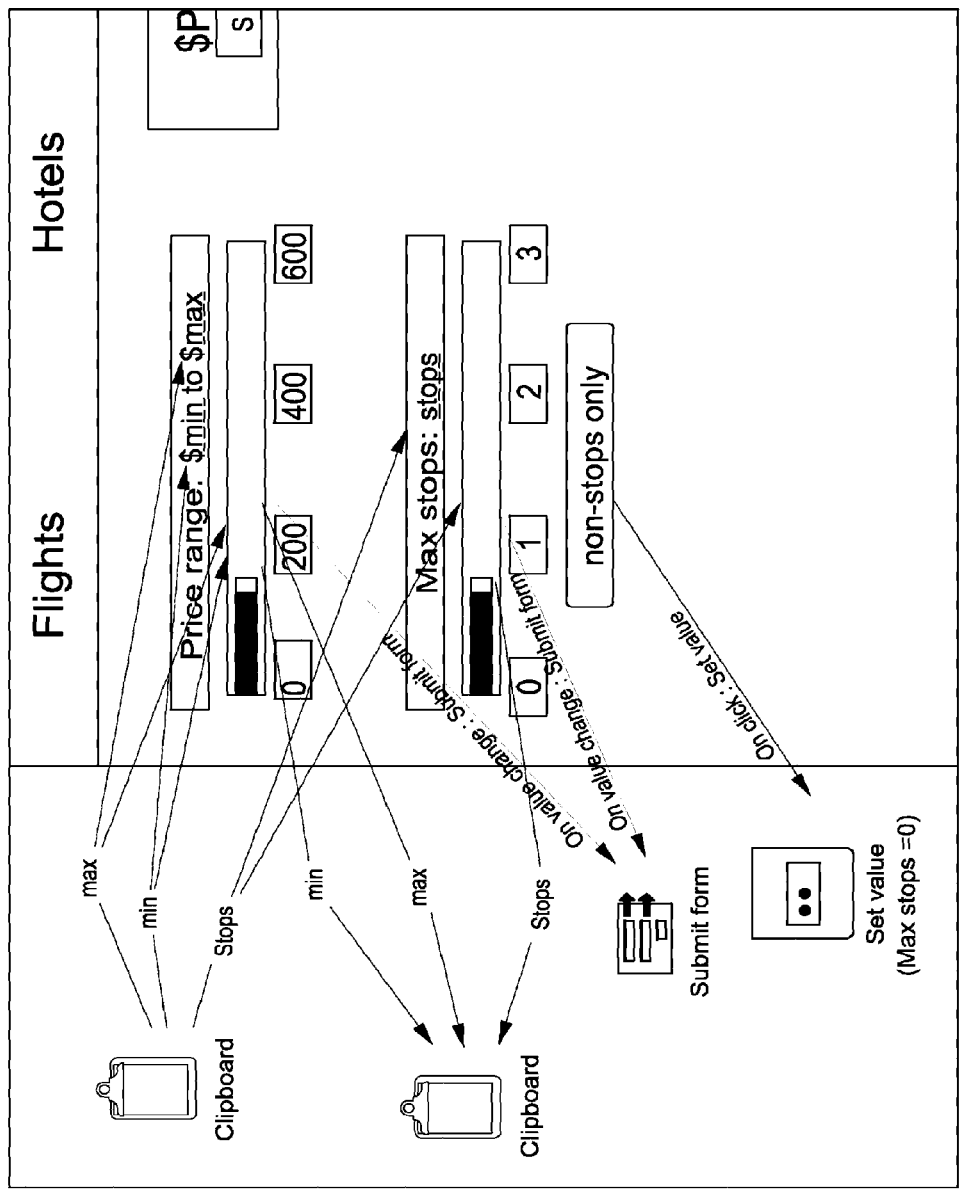

As depicted in FIG. 25, two iBlocs may used to simulate the requirements for this page: a horizontal Slider widget, and a Set value action. One of the horizontal Sliders may be defined as a dual slider, which enables setting both a minimum and a maximum value for the price range. The Set value action, which will receive an event from a Button widget, may used to set the value of the Max stops Slider to 0.

The values of the min, max and stops data fields may also be used to set where conditions on the data flowing into the data table that displays matching flights from the flights datasheet, as is further described herein.

Example user inputs to the visualization authoring environment for adding widgets are described below:
1. Create a page called Flight Search Results.
2. Add a Form widget to the page and call it Filters.
3. Add a Text widget near the top of the Filters Form, and type Price range: $min to $max.
   Directly beneath the Text widget, add a Slider (horizontal) widget. Call it Price Range, and apply the following settings: Minimum=0, Maximum=600, Step Size=25, Shade=Left
5. Arrange four Text widgets directly beneath the Price Range Slider with the following contents: 0, 200, 400 and 600.
6. Add a Text widget beneath the Price Range control and type Max Stops: stops.
7. Add another Slider (horizontal) widget beneath the Text widget. Call it Max Stops and set the Shade attribute to Left.
8. Arrange four Text widgets directly beneath the Max Stops Slider with the following contents: 0, 1, 2 and 3.
9. Add a Button widget beneath the Max Stops control and give it the Button Label Non-stops only.

Example user inputs to the visualization authoring environment for capturing price range data are described below:
1. Add a Clipboard widget to the canvas on the left side of the page.
2. Drag the Price Range Slider widget to the Clipboard and select Send data in the pop-up. The Select a Field dialog appears.
3. In the Select a Field dialog, type min and click OK. The Properties panel displays the new data field you created.
4. In the Properties panel, select Value in the Choose which property to send field.
5. Drag the Price Range Slider widget to the Clipboard once more and select Send data in the pop-up.
6. In the Select a Field dialog, type max and click OK.
7. In the Properties panel, select Value2 in the Choose which property to send field.
8. Select the Price Range Slider. In the Properties panel, make the following changes:
   a. Click the small box to the right of the Value field. The Select Property dialog appears.
   b. Select min and click OK.
   c. Click the small box to the right of the Value2 field (if it is not visible, click the word Common and select Dual Slider or All from the menu).
   d. In the Select Property dialog, select max and click OK.
9. Add a Submit Form action widget to the canvas on the left side of the page.
10. Drag the Price Range Slider to the Submit Form action.
11. Change the trigger for the Submit Form action to On value change.

Example user inputs to the visualization authoring environment for capturing max stops data are described below:
1. Drag the Max Stops Slider to the Clipboard and select Send data in the pop-up.
2. In the Select a Field dialog, type Stops and click OK.
3. In the Properties panel, select Value in the Choose which property to send field.
4. Select the Max Stops Slider. In the Properties panel, make the following changes:
   a. Click the small box to the right of the Value field.
   b. In the Select Property dialog, select Stops and click OK.
5. Drag the Max Stops Slider to the Submit Form action.
6. Change the trigger for the Submit Form action to On value change.

Example user inputs to the visualization authoring environment for sending data to widgets are described below:
1. Add another Clipboard widget to the canvas on the left side of the page.
2. Drag the Clipboard to the Text widget above the Price Range Slider, and release your mouse button when only the word "min" is highlighted. The Select a Field or Record dialog appears.
3. Select min and click OK.
4. Drag the min field label from the new data line to the Price Range Slider.
5. Repeat steps 2-4, this time selecting max.
6. Drag the Clipboard to the Text widget above the Max Stops Slider, and release your mouse button when only the word "stops" is highlighted.
7. Select Stops and click OK.
8. Drag the Stops field label from the new data line to the Max Stops Slider.

Example user inputs to the visualization authoring environment for configuring the Set Value action are described below:
1. Add a Set value custom action to the canvas on the left side of the page. Give it the label Max stops=0.
   In the Properties panel, set the following attributes for the Set value action: Target widget=Max Stops, Value=0
3. Drag the Button widget to the Set value action. A blue navigation line connects the Button to the Set value action.

Based on the example inputs above, when the visualization rendering environment renders the visualization project for itravel, the Price Range Slider will appear with two handles, one at the 0 position and the other at the 600 position. The Max Stops Slider will appear with a single handle at the 0 position. In response to the user of the visualization rendering environment dragging any of the handles the values displayed in the Text widgets above the sliders will change and the handles should maintain their positions when they are released. The user of the visualization rendering environment will be constrained to changing the price range values in increments of 25, and the max stops value in increments of 1. If the user of the visualization rendering environment clicks on the non-stops only button the value of the max stops slider will be set to 0.

Figure 26:
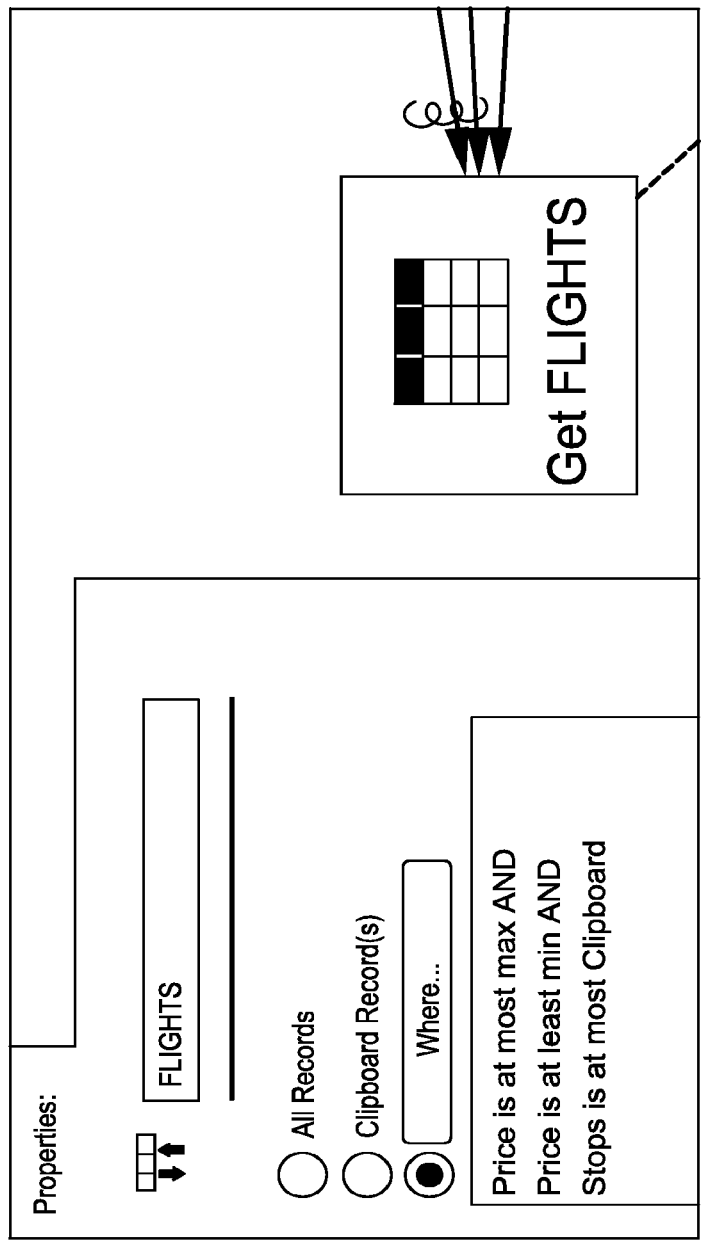

Based on similar inputs from the user of the visualization authoring environment, the values for min, max and stops may be used to filter the data records flowing from a flights datasheet into a data table on a page. By way of example, this could be accomplished with a get record widget that uses where conditions to filter the records flowing into the data table, as depicted in FIG. 26.

In this example, the slider widgets have pre-defined properties called 'Value' and 'Value2', with Value2 applying only to a dual slider. In order to permit data to be passed from the sliders to the clipboard, an association between the data fields and properties for the widgets is created. In this case, min is associated with Value and max is associated with Value2 in the price range slider, and stops with Value in the max stops slider.

In the example, an event called 'On value change' has also been pre-defined for the slider widgets. This has been associated with a Submit Form action causing the visualization rendering environment to process the data and refresh the page. The values for min, max and stops are also used to populate text widgets, as well as setting the values of the sliders after the page refresh.

Thus, described herein are systems and methods that enable a visualization authoring environment to be extended to encompass additional user interface elements and behavioral elements beyond those that are integral to the visualization authoring environment.

What is claimed is:

1. A computer implemented method for extending a visualization platform, the method comprising:
    providing, by a computing device comprising hardware, a visualization authoring environment configured to enable a first user to define a user interface appearance and behavior of a prospective software application for at least a smart-phone or a prospective modification to an existing software application for at least a smart-phone at least in part by incorporating native widgets;
    storing such definitions on computer readable media in a format that can be utilized by one or more other instances of the visualization authoring environment or one or more instances of a visualization rendering environment, or both one or more other instances of the visualization authoring environment and one or more instances of a visualization rendering environment;
    providing, by the computing device, in the visualization authoring environment a facility to enable a user to incorporate one or more non-native widgets into the visualization authoring environment without requiring acquisition or installation of a new version of the visualization authoring environment;
    enabling the first user to search for native and non-native widgets using the computing device;
    providing, by the computing device, in the visualization authoring environment a facility to enable the first user to incorporate non-native widgets into a visualization project for a prospective software application for a smartphone or a prospective modification to an existing software application for a smartphone;
    providing, by the computing device, in the visualization authoring environment a user interface component configured to display icons corresponding to one or more non-native widgets and one or more native widgets and process click and drag operations to add widgets to the visualization project;
    providing, by the computing device, in the visualization authoring environment a user interface component configured to accept user inputs to modify the properties of one or more widgets;
    providing, by the computing device, in the visualization authoring environment a user interface component configured to display comments made by a second user;
    providing, by the computing device, in the visualization authoring environment a facility to enable the first user to modify one or more of attributes of an instance of a non-native widget, including at least: size and position; and
    enabling the first user to simulate the visualization project for a prospective software application for a smartphone or a prospective modification to an existing software application for a smartphone using the computing device.

2. The method as defined in claim 1, the method further comprising storing computer readable instructions that govern the appearance or behavior, or the appearance and behavior of a first non-native widget as part of the visualization project and not integral to the visualization authoring environment.

3. The method as defined in claim 1, the method further comprising storing computer readable instructions that govern the appearance or behavior, or the appearance and behavior of the first non-native widget are stored as part of the visualization project and not integral to the visualization rendering environment.

4. The method as defined in claim 1, wherein incorporating the first non-native widgets into a visualization authoring environment does not require that the first user incorporating the first non-native widget into a visualization authoring environment to write code.

5. The method as defined in claim 1, the method further comprising encapsulating computer readable instructions for an appearance, or behavior, or an appearance and behavior of one or more non-native widgets into the visualization project at least partly in response to a user action, wherein encapsulating computer readable instructions for an appearance, or behavior, or an appearance and behavior of one or more non-native widgets into a visualization project does not require that the first user incorporating the first non-native widget into a visualization project to write code.

6. The method as defined in claim 1, wherein modifying one or more attributes of the instance of the non-native widget includes specifying which data elements flow from a second widget to the instance of the non-native widget, or from the instance of the non-native widget to the second widget.

7. The method as defined in claim 1, wherein modifying one or more attributes of the instance of the non-native widget includes further specifying processing of events by one or more other widgets.

8. The method as defined in claim 1, wherein modifying one or more attributes of the instance of the non-native widget includes specifying processing of events by the instance of the non-native widget.

9. The method as defined in claim 1, further comprising providing a facility for storage and distribution of non-native widgets over a network using a web site.

10. The method as defined in claim 1, wherein at least a portion of computer readable instructions for an appearance or behavior of the instance of the non-native widget is stored on a world wide web server, referenced from the visualization project, or from a visualization rendering environment, or from the visualization project and the visualization rendering environment and not integral to either the visualization authoring environment or the visualization rendering environment, wherein the visualization rendering environment is configured to produce an interactive simulation of the visualization project for a prospective software application for a smartphone or of a prospective modification to an existing software application for a smartphone using the computing device.

11. The method as defined in claim 1, wherein incorporating the non-native widgets into the visualization authoring environment is automatically performed upon detecting availability of the non-native widgets.

12. A system comprising:
a computing system, including one or more processing devices;
non-transitory memory that stores instruction configured to cause the computing system to perform operations comprising:
   providing a visualization authoring environment configured to enable a first user to define a user interface appearance and behavior of a prospective software application for at least a smartphone or a prospective modification to an existing software application for at least a smartphone at least in part by incorporating native widgets;
   storing such definitions on computer readable media in a format that can be utilized by one or more other instances of the visualization authoring environment or one or more instances of a visualization rendering environment, or both one or more other instances of the visualization authoring environment and one or more instances of a visualization rendering environment;
   providing in the visualization authoring environment a facility to enable a user to incorporate one or more non-native widgets into the visualization authoring environment without requiring acquisition or installation of a new version of the visualization authoring environment;
   enabling the first user to search for native and non-native widgets;
   providing in the visualization authoring environment a facility to enable the first user to incorporate non-native widgets into a visualization project for a prospective software application for a smartphone or a prospective modification to an existing software application for a smartphone;
   providing in the visualization authoring environment a user interface component configured to display icons corresponding to one or more non-native widgets and one or more native widgets and process click and drag operations to add widgets to the visualization project;
   providing in the visualization authoring environment a user interface component configured to accept user inputs to modify the properties of one or more widgets;
   providing in the visualization authoring environment a user interface component configured to display comments made by a second user;
   providing in the visualization authoring environment a facility to enable the first user to modify one or more of attributes of an instance of a non-native widget, including at least: size and position; and
   enabling the first user to simulate the visualization project for a prospective software application for a smartphone or a prospective modification to an existing software application for a smartphone.

13. The system as defined in claim 12, the operations further comprising storing computer readable instructions that govern the appearance or behavior, or the appearance and behavior of a first non-native widget as part of the visualization project and not integral to the visualization authoring environment.

14. The system as defined in claim 12, the operations further comprising storing computer readable instructions that govern the appearance or behavior, or the appearance and behavior of the first non-native widget are stored as part of the visualization project and not integral to the visualization rendering environment.

15. The system as defined in claim 12, wherein incorporating the first non-native widgets into a visualization authoring environment does not require that the first user incorporating the first non-native widget into a visualization authoring environment to write code.

16. The system as defined in claim 12, the operations further comprising encapsulating computer readable instructions for an appearance, or behavior, or an appearance and behavior of one or more non-native widgets into the visualization project at least partly in response to a user action, wherein encapsulating computer readable instructions for an appearance, or behavior, or an appearance and behavior of one or more non-native widgets into a visualization project does not require that the first user incorporating the first non-native widget into a visualization project to write code.

17. The system as defined in claim 12, wherein modifying one or more attributes of the instance of the non-native widget includes specifying which data elements flow from a second widget to the instance of the non-native widget, or from the instance of the non-native widget to the second widget.

18. The system as defined in claim 12, wherein modifying one or more attributes of the instance of the non-native widget includes further specifying processing of events by one or more other widgets.

19. The system as defined in claim 12, wherein modifying one or more attributes of the instance of the non-native widget includes specifying processing of events by the instance of the non-native widget.

20. The system as defined in claim 12, the operations further comprising providing a facility for storage and distribution of non-native widgets over a network using a web site.

21. The system as defined in claim 12, wherein at least a portion of computer readable instructions for an appearance or behavior of the instance of the non-native widget is stored on a world wide web server, referenced from the visualization project, or from a visualization rendering environment, or from the visualization project and the visualization rendering environment and not integral to either the visualization authoring environment or the visualization rendering environment, wherein the visualization rendering environment is configured to produce an interactive simulation of the visualization project for a prospective software application for a smartphone or of a prospective modification to an existing software application for a smartphone using the computing device.

22. The system as defined in claim 12, wherein incorporating the non-native widgets into the visualization authoring environment is automatically performed upon detecting availability of the non-native widgets.

* * * * *

UNITED STATES PATENT AND TRADEMARK OFFICE
CERTIFICATE OF CORRECTION

| | | |
|---|---|---|
| PATENT NO. | : 9,946,518 B2 | Page 1 of 3 |
| APPLICATION NO. | : 15/286878 | |
| DATED | : April 17, 2018 | |
| INVENTOR(S) | : Martin | |

It is certified that error appears in the above-identified patent and that said Letters Patent is hereby corrected as shown below:

On the Title Page

Item (72), (Inventors) at Line 1, Change "Ray," for Maurice Martin to --Rey,--.

In Column 2 (page 4, item (56)) at Line 2, Change "Lu Iea" to --Lu lea--.

In the Drawings

Sheet 14 of 30 (FIG. 13B) at Line 13 (approx.), Change "Gogle" to --Google--.

In the Specification

In Column 6 at Line 66, Change "benefits." to --benefits--.

In Column 8 at Line 15, Change "smart-phone" to --smartphone--.

In Column 8 at Line 63, Change "limited. are The" to --limited. The--.

In Column 16 at Line 26 (approx.), Change "canyasImage" to --canvasImage--.

In Column 17 at Line 47, Change "rewriteURL(e.g.," to --rewriteURL (e.g.,--.

In Column 17 at Line 50, Change "rewriteURL(e.g.," to --rewriteURL (e.g.,--.

In Column 17 at Line 50, Change "myImage.jpg")" to --myImage.jpg")--.

In Column 17 at Line 52, Change "myImage.jpg." to --myImage.jpg.--.

Signed and Sealed this
Seventeenth Day of July, 2018

Andrei Iancu
*Director of the United States Patent and Trademark Office*

CERTIFICATE OF CORRECTION (continued)
U.S. Pat. No. 9,946,518 B2

In Column 26 at Line 22, Change "Nnde" to --Node--.

In Column 26 at Line 61, Change "operator's" to --operator--.

In Column 27 at Line 49, Change "and or" to --and/or--.

In Column 28 at Line 11, Change "embedment," to --embodiment,--.

In Column 28 at Line 64, After "environment" insert --.--.

In Column 29 at Line 3, After "files" insert --.--.

In Column 30 at Line 5, Change "an the" to --the--.

In Columns 29-30 at Line 28 (approx.), Change "aggreggate" to --aggregate--.

In Columns 35-36 at Line 32, Change ""uriType"" to --"urlType"--.

In Columns 35-36 at Line 40, Change ""uriType"" to --"urlType"--.

In Column 38 at Line 50 (approx.), Change ""uriType">" to --"urlType">--.

In Column 41 at Line 5, Change "`.E xceptionType" to --`.ExceptionType--.

In Column 41 at Line 21, Change "They" to --The y--.

In Columns 41-42 at Line 50 (approx.), Change "xsl:" to --xsi:--.

In Columns 43-44 at Line 42, Change "ibloc/<" to --ibloc>/<--.

In Columns 45-46 at Line 22 (approx.), Change "that that" to --that--.

In Column 48 at Line 17, After "elements" insert --.--.

In Column 49 at Line 3, Change "may used" to --may be used--.

In Column 49 at Line 9, Change "may used" to --may be used--.

In Column 49 at Line 22, Change "Directly" to --4. Directly--.

In Column 49 at Line 25, After "Shade=Left" insert --.--.

In Column 50 at Line 39, Change "In" to --2. In--.

In Column 50 at Line 40, After "Value=0" insert --.--.

CERTIFICATE OF CORRECTION (continued)
U.S. Pat. No. 9,946,518 B2

In the Claims

In Column 51 at Line 26, In Claim 1, change "smart-phone" to --smartphone--.